US012301648B1

United States Patent
Donahue et al.

(10) Patent No.: US 12,301,648 B1
(45) Date of Patent: May 13, 2025

(54) AGENTS FOR MONITORING LIVE BROADCASTS FOR POLICY ENFORCEMENT

(71) Applicant: Amazon Technologies, Inc., Seattle, WA (US)

(72) Inventors: Jason Donahue, San Francisco, CA (US); Pratik GuhaRay, Kenmore, WA (US); Rakshit Karnawat, Seattle, WA (US); Sanjeev Kumar, Redmond, WA (US); William Jeffrey Lett, Atlanta, GA (US); Ayman Mahfouz, Culver City, CA (US); Ankit Kumar Yadav, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 17/489,651

(22) Filed: Sep. 29, 2021

(51) Int. Cl.
G06F 15/16 (2006.01)
H04L 65/75 (2022.01)
H04L 67/141 (2022.01)

(52) U.S. Cl.
CPC ............ *H04L 65/75* (2022.05); *H04L 67/141* (2013.01)

(58) Field of Classification Search
CPC .............................. H04L 65/75; H04L 67/141
See application file for complete search history.

(56) References Cited

U.S. PATENT DOCUMENTS

| 5,832,435 A | 11/1998 | Silverman |
| 8,023,800 B2 | 9/2011 | Concotelli |
| 8,112,720 B2 | 2/2012 | Curtis |
| 8,560,683 B2 | 10/2013 | Funk et al. |

(Continued)

FOREIGN PATENT DOCUMENTS

| AU | 2013204532 B2 | 11/2014 |
| CA | 2977959 A1 | 9/2016 |

(Continued)

OTHER PUBLICATIONS

Hoegen, Rens, et al. "An End-to-End Conversational Style Matching Agent." Proceedings of the 19th ACM International Conference on Intelligent Virtual Agents. 2019, pp. 1-8. (Year: 2019).

(Continued)

*Primary Examiner* — Padma Mundur
(74) *Attorney, Agent, or Firm* — Athorus, PLLC

(57) ABSTRACT

As a media program is aired to listeners, agents executed by a control system monitor actions by the creator or by listeners to ensure that the creator or the listeners comply with relevant policies and that the media program is aired as scheduled. The agents are programmed with sets of rules regarding content, language, advertising or other restrictions, and configured to process signals representative of actions taken by the creator or the listeners to determine whether such actions comply with such rules. The signals may represent spoken words, written messages, or interactions by listeners, among other actions. The agents interpret the signals to identify intended actions of creators or listen- (Continued)

ers, and to determine whether the intended actions would comply with each of the rules associated with the media program. The agents are also configured to identify and execute alternative actions as necessary.

20 Claims, 37 Drawing Sheets

(56) References Cited

U.S. PATENT DOCUMENTS

| | | |
|---|---|---|
| 8,572,243 B2 | 10/2013 | Funk et al. |
| 8,768,782 B1 | 7/2014 | Myslinski |
| 8,850,301 B1 | 9/2014 | Rose |
| 9,003,032 B2 | 4/2015 | Funk et al. |
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,015,589 B1 | 7/2018 | Ebenezer |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,422 B1 | 1/2019 | Panchaksharaiah et al. |
| 10,178,442 B2 | 1/2019 | Shkedi |
| 10,264,213 B1 | 4/2019 | Sculley |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,700,648 B2 | 6/2020 | Lesso |
| 10,719,837 B2 | 7/2020 | Kolowich et al. |
| 10,769,678 B2 | 9/2020 | Li |
| 10,846,330 B2 | 11/2020 | Shilo |
| 10,893,329 B1 * | 1/2021 | Trim ................... G06V 20/46 |
| 10,985,853 B2 | 4/2021 | Bretherton |
| 10,986,064 B2 | 4/2021 | Siegel et al. |
| 10,997,240 B1 | 5/2021 | Aschner et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,539,845 B1 | 12/2022 | Fowers et al. |
| 11,580,982 B1 | 2/2023 | Karnawat et al. |
| 11,586,344 B1 | 2/2023 | Balagurunathan et al. |
| 11,605,387 B1 | 3/2023 | Muralitharan et al. |
| 11,900,902 B2 | 2/2024 | Martinez Ramirez et al. |
| 11,916,981 B1 | 2/2024 | Karnawat et al. |
| 2002/0042920 A1 | 4/2002 | Thomas et al. |
| 2002/0056087 A1 | 5/2002 | Berezowski et al. |
| 2003/0117486 A1 | 6/2003 | Ferren et al. |
| 2004/0057586 A1 | 3/2004 | Licht |
| 2005/0201360 A1 | 9/2005 | Redstone |
| 2005/0213726 A1 | 9/2005 | Rodman |
| 2005/0213734 A1 | 9/2005 | Rodman |
| 2005/0213735 A1 | 9/2005 | Rodman et al. |
| 2006/0018457 A1 | 1/2006 | Unno et al. |
| 2006/0018458 A1 | 1/2006 | McCree et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1 | 2/2009 | Lutterbach et al. |
| 2009/0076917 A1 | 3/2009 | Jablokov et al. |
| 2009/0100098 A1 | 4/2009 | Feher et al. |
| 2009/0254934 A1 | 10/2009 | Grammens |
| 2009/0298417 A1 | 12/2009 | Phillips |
| 2010/0088187 A1 | 4/2010 | Courtney et al. |
| 2010/0280641 A1 | 11/2010 | Harkness et al. |
| 2011/0063406 A1 | 3/2011 | Albert et al. |
| 2011/0067044 A1 | 3/2011 | Albo |
| 2011/0267419 A1 | 11/2011 | Quinn et al. |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311444 A1 | 12/2012 | Chaudhri |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1 | 1/2014 | Guminy et al. |
| 2014/0040494 A1 | 2/2014 | Deinhard et al. |
| 2014/0068432 A1 | 3/2014 | Kucharz et al. |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0095014 A1 | 4/2015 | Marimuthu |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0289021 A1 | 10/2015 | Miles |
| 2015/0319472 A1 | 11/2015 | Kotecha et al. |
| 2015/0326922 A1 | 11/2015 | Givon et al. |
| 2016/0027196 A1 | 1/2016 | Schiffer et al. |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0266781 A1 | 9/2016 | Dandu et al. |
| 2016/0291926 A1 | 10/2016 | Hundemer |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0193531 A1 | 7/2017 | Fatourechi et al. |
| 2017/0213248 A1 | 7/2017 | Jing et al. |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0061393 A1 | 3/2018 | Osotio |
| 2018/0184213 A1 | 6/2018 | Lesimple et al. |
| 2018/0205797 A1 | 7/2018 | Faulkner |
| 2018/0227632 A1 | 8/2018 | Rubin et al. |
| 2018/0255114 A1 | 9/2018 | Dharmaji |
| 2018/0293221 A1 | 10/2018 | Finkelstein et al. |
| 2018/0322411 A1 | 11/2018 | Wang et al. |
| 2018/0367229 A1 | 12/2018 | Gibson et al. |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Uke et al. |
| 2019/0273570 A1 | 9/2019 | Bretherton |
| 2019/0327103 A1 | 10/2019 | Niekrasz |
| 2019/0364359 A1 | 11/2019 | Ferguson et al. |
| 2019/0385600 A1 | 12/2019 | Kim |
| 2020/0021888 A1 | 1/2020 | Brandao et al. |
| 2020/0106885 A1 * | 4/2020 | Koster ............. H04M 3/42068 |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2020/0364727 A1 | 11/2020 | Scott-Green et al. |
| 2021/0090224 A1 | 3/2021 | Zhou et al. |
| 2021/0104245 A1 | 4/2021 | Alas et al. |
| 2021/0105149 A1 | 4/2021 | Roedel et al. |
| 2021/0125054 A1 | 4/2021 | Banik et al. |
| 2021/0160588 A1 | 5/2021 | Joseph et al. |
| 2021/0210102 A1 | 7/2021 | Huh et al. |
| 2021/0217413 A1 | 7/2021 | Tushinskiy et al. |

(56) References Cited

U.S. PATENT DOCUMENTS

| | | | |
|---|---|---|---|
| 2021/0224319 A1 | 7/2021 | Ingel et al. | |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2021/0374391 A1 | 12/2021 | Jorasch et al. | |
| 2021/0407520 A1 | 12/2021 | Neckermann et al. | |
| 2022/0038783 A1 | 2/2022 | Wee | |
| 2022/0038790 A1 | 2/2022 | Duan et al. | |
| 2022/0159377 A1 | 5/2022 | Wilberding et al. | |
| 2022/0223286 A1 | 7/2022 | Lach et al. | |
| 2022/0230632 A1 | 7/2022 | Maitra et al. | |
| 2022/0254348 A1 | 8/2022 | Tay et al. | |
| 2022/0286748 A1* | 9/2022 | Dyer | H04N 21/4788 |
| 2022/0369034 A1 | 11/2022 | Kumar et al. | |
| 2022/0415327 A1 | 12/2022 | Fowers et al. | |
| 2022/0417297 A1 | 12/2022 | Daga et al. | |
| 2023/0036192 A1* | 2/2023 | Alakoye | H04H 60/06 |
| 2023/0085683 A1* | 3/2023 | Turner | G06F 40/237 725/32 |
| 2023/0217195 A1 | 7/2023 | Poltorak | |
| 2024/0031489 A1 | 1/2024 | Lundin et al. | |

FOREIGN PATENT DOCUMENTS

| | | | |
|---|---|---|---|
| CN | 104813305 | A | 7/2015 |
| DE | 112020002288 | T5 | 2/2022 |
| KR | 20170079496 | A | 7/2017 |
| WO | 2019089028 | A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

* cited by examiner

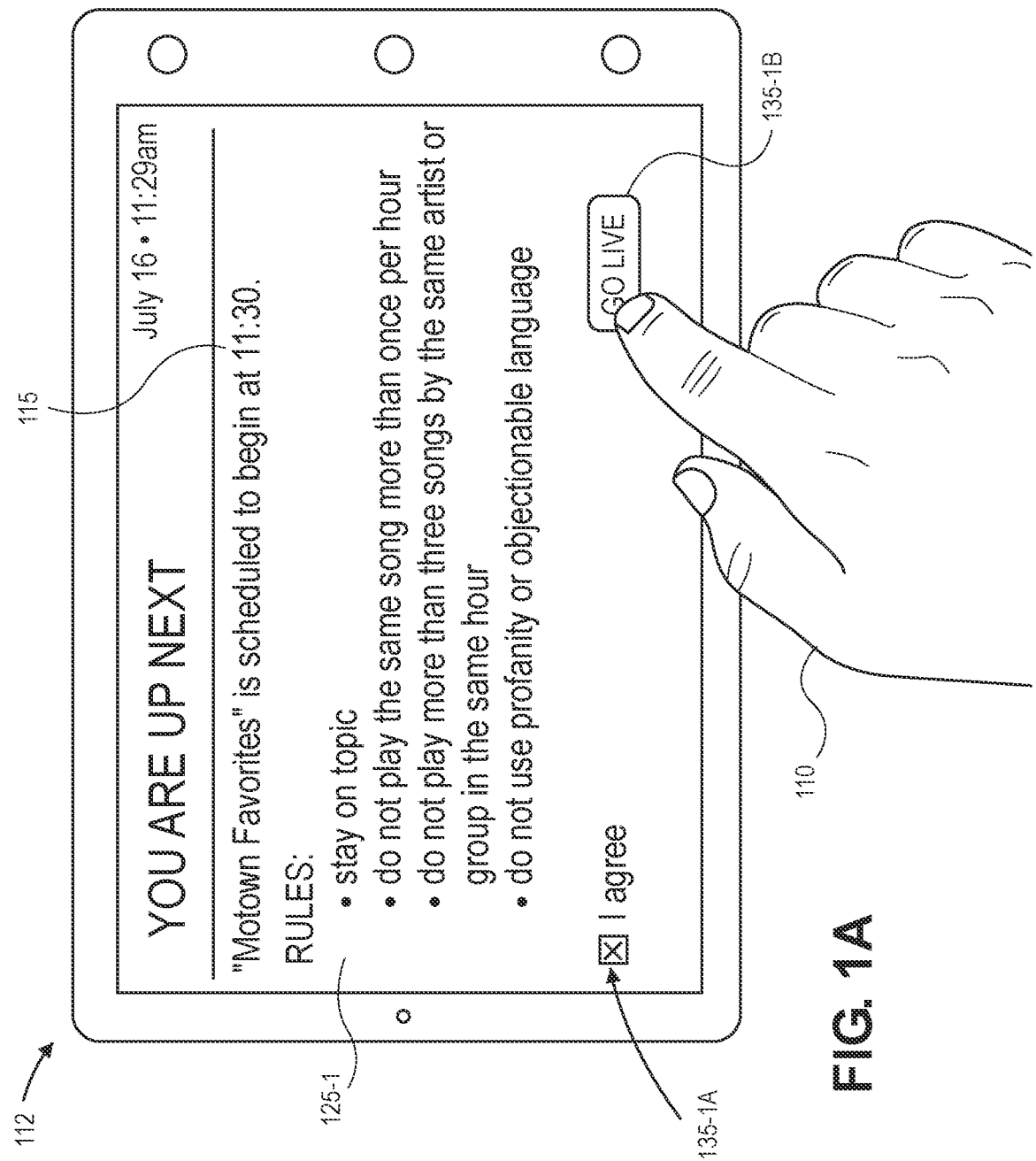

AGENTS FOR MONITORING LIVE BROADCASTS FOR POLICY ENFORCEMENT

BACKGROUND

Traditionally, operating a radio station (e.g., a terrestrial radio station, or a satellite radio station) or producing a radio program have required substantial investments in physical infrastructure and human talent. In addition to hosts, radio stations typically employ dozens of other personnel, including sound engineers, maintenance engineers, production directors, or station managers, as well as producers of advertisements, music, news, sports, weather, or other programming. Such personnel may be assigned a variety of tasks to ensure that various systems of the radio station operate as intended, and that radio programs aired by the radio station meet desired standards of quality and comply with relevant laws, policies, regulations and other requirements.

For example, personnel at a radio station may be trained or instructed to take one or more discrete actions in response to determining that systems of the radio station are not operating as intended, or in response to determining that one or more laws, policies, regulations or other requirements have been violated by a host, a guest, or any other person associated with a radio program.

BRIEF DESCRIPTION OF THE DRAWINGS

FIGS. 1A through 1J are views of aspects of one system for monitoring live broadcasts in accordance with embodiments of the present disclosure.

DETAILED DESCRIPTION

As is set forth in greater detail below, the present disclosure is directed to systems and methods for monitoring live broadcasts for policy enforcement and listener interactivity. More specifically, in some implementations, the systems and methods of the present disclosure include one or more agents (or modules) embodied in hardware or software that are programmed to automate tasks that are traditionally performed by personnel associated with the airing of media programs. Such agents may include, but need not be limited to, agents for ensuring that a media program complies with relevant policies, agents for determining that media content of the media program is broadcast to listeners of the media program as intended, agents for monitoring interactions with the listeners to the media program, or for ensuring that the interactions are received, automatically interpreted, or appropriately addressed.

The systems and methods of the present disclosure enable users of computer devices, or "creators," to construct media programs of their own design that are similar to traditional radio programs, and to transmit data for presenting the media programs to systems or devices of listeners or subscribers over one or more networks. By automating tasks that were traditionally performed by personnel, one or more of the agents disclosed herein permit a creator to single-handedly design and air media programs of his or her choosing, without having to respond to unexpected faults or violations of any laws, policies, regulations or other requirements, or to address any interactions received from listeners.

Accordingly, by utilizing agents to monitor live broadcasts of media programs for policy enforcement or listener interactivity, in one or more back-end processes, the systems and methods of the present disclosure enable any user of any computer device to become a creator of his or her own media program, and to present the media program to listeners in any location, without having to rely on any personnel other than the creator himself or herself. The systems and methods of the present disclosure further ensure that a user (e.g., a creator) and a media program will comply with any number of relevant laws, policies, regulations or other requirements, and be appropriately responsive to listeners, thereby freeing the user from the need to make substantial investments in infrastructure or personnel that have been traditionally utilized by radio stations.

Figure 1B:
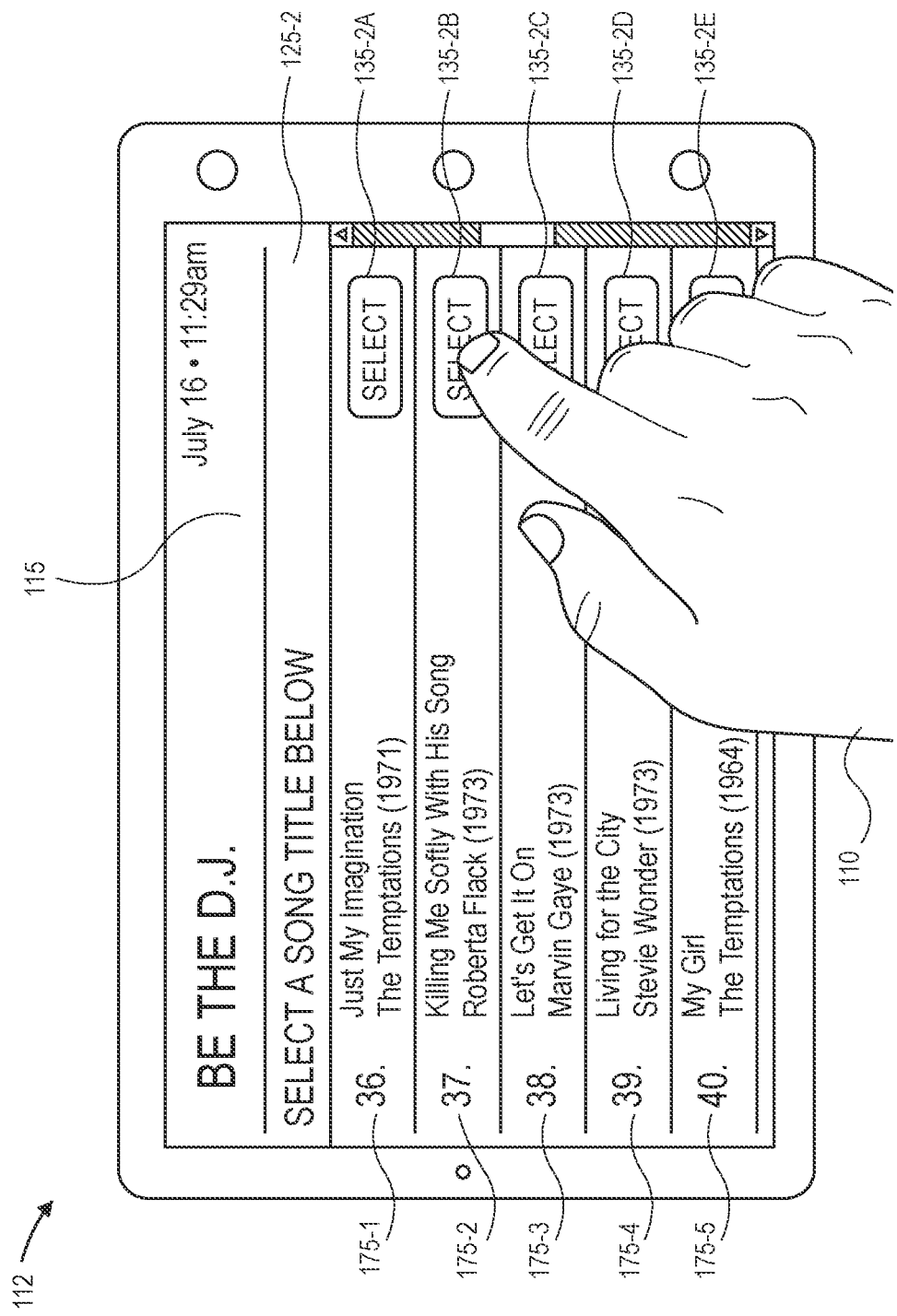

Referring to FIGS. 1A through 1J, views of aspects of one system for monitoring live broadcasts in accordance with embodiments of the present disclosure are shown. As is shown in FIG. 1A, a mobile device 112 (e.g., a smartphone, a tablet computer, a laptop computer, or any other system or device) of a creator 110 (e.g., a user) includes a user interface 125-1 rendered on a display 115 of the mobile device 112. The user interface 125-1 includes information identifying a media program, viz., "Motown Favorites," and a time when the media program is scheduled to begin. In some implementations, the display 115 may be a capacitive touchscreen, a resistive touchscreen, or any other system for receiving interactions by the creator 110.

The user interface 125-1 also depicts a set of rules that must be followed by the creator 110 during the airing of the media program. In particular, and as is shown in FIG. 1A, the creator 110 must limit the scope of the media program to its intended topic, e.g., favorite music associated with Motown, a term that is commonly used to describe a notable record label, the City of Detroit, or a genre of music. As is shown in FIG. 1A, types of media entities that may be played in accordance with a media program are also limited, as the creator 110 must not play the same media entity (e.g., a song) more than once per hour, or play more than three media entities by a single artist or group in the same hour. As is also shown in FIG. 1A, the creator 110 must further avoid using profanity or objectionable language.

As is further shown in FIG. 1A, prior to commencing the media program, the creator 110 must also indicate that he or she agrees to follow the set of rules by executing one or more gestures or other interactions with the user interface 125-1, e.g., by contacting a check box 135-1A or another interactive feature associated with the words "I agree," and by contacting a button 135-1B or another interactive feature to confirm his or her agreement.

Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112 or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form.

As is shown in FIG. 1B, the creator 110 may also select one or more media entities (e.g., songs, podcasts, or other media entities such as news programs, sports programs, weather reports or others), which may be live or previously recorded, to air in accordance with the media program. For example, as is shown in FIG. 1B, a user interface 125-2 rendered on the display 115 of the mobile device 112 includes elements or features identifying media entities 175-1, 175-2, 175-3, 175-4, 175-5, and buttons 135-2A, 135-2B, 135-2C, 135-2D, 135-2E or other interactive features that may be selected to indicate a selection of one of the media entities 175-1, 175-2, 175-3, 175-4, 175-5. As is further shown in FIG. 1B, the creator 110 selects the button 135-2B to select the media entity 175-2, viz., the 1973 song "Killing Me Softly With His Song," by Roberta Flack.

Figure 1C:
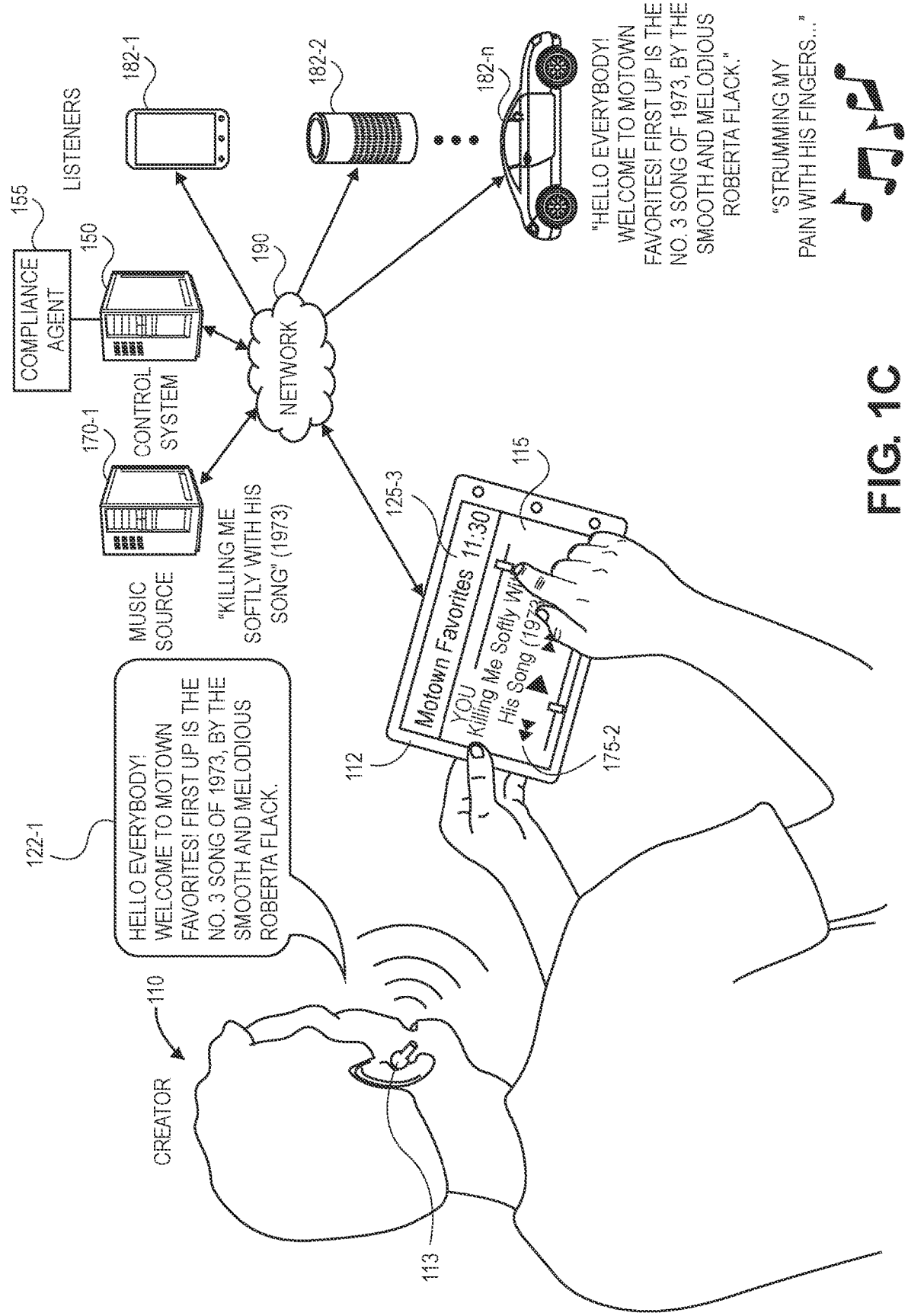

As is shown in FIG. 1C, the mobile device 112, a control system 150 (e.g., one or more servers or other computer systems), a music source 170-1 (or catalog or repository) and a plurality of devices 182-1, 182-2 . . . 182-*n* or other systems of any number n of listeners are connected to one or more networks 190, which may include the Internet in whole or in part. The devices 182-1, 182-2 . . . 182-*n* may be of any type or form, including but not limited to mobile devices (e.g., smartphones, tablets or others), smart speakers, media players, computers (e.g., laptop or desktop computers), wrist watches, earphones or headphones, media streaming devices, or others. The creator 110 wears one or more ear buds 113 (or earphones, or headphones) or other communication systems or devices which may be in communication with the mobile device 112, and may exchange (e.g., transfer or receive data) relating to audio signals or any other data with the mobile device 112.

Additionally, the control system 150 is programmed to execute a compliance agent 155, or one or more other agents, which may be one or more computer programs or other sets of software or hardware components that are configured to capture or interpret signals or other information or data regarding media content transmitted to the devices 182-1, 182-2 . . . 182-*n* of the listeners from any source, e.g., by the control system 150, the music source 170-1 or by any other systems. The compliance agent 155 may be configured to operate in accordance with a set of rules (or laws, policies, regulations or other requirements), such as one or more of the rules shown in FIG. 1B, or any other rules, and to determine whether actions that are planned or being taken by creators, listeners, guests or other participants in a media program, or media content generated or caused to be played by such participants in accordance with the media program, would comply with one or more of the rules. In some implementations, one or more rules of a set may be selected or designated by a control system, e.g., the control system 150, and applied subjectively to one or more media programs associated with the control system, or objectively for all of such media programs, on any basis. In some implementations, one or more rules of a set may be selected or designated by a creator, e.g., the creator 110, and applied subjectively to media programs associated with the creator. Moreover, an agent may be programmed to monitor signals or other information or data regarding media content of a media program synchronously or continuously, including but not limited to signals or other information or data representing the media content itself, in real time or near-real time, or in one or more asynchronous or batch processes.

As is also shown in FIG. 1C, the creator 110 provides an utterance 122-1 of one or more words that are intended to be heard by one or more listeners using the devices 182-1, 182-2 . . . 182-*n*. In particular, the utterance 122-1 describes the topic of the media program and references the media entity 175-2, viz., "Hello everybody! Welcome to Motown Favorites! First up is the no. 3 song of 1973, by the smooth and melodious Roberta Flack." The mobile device 112 and/or the ear buds 113 may capture acoustic data representing the utterance 122-1 of the creator 110, and transmit the data to the control system 150 over the one or more networks 190. The control system 150 may then cause data, e.g., some or all of the data captured by the mobile device 112 and/or the ear buds 113, to be transmitted to one or more computer systems or devices of listeners over one or more networks 190, including but not limited to the devices 182-1, 182-2 . . . 182-*n*.

As is further shown in FIG. 1C, a user interface 125-3 rendered on the display 115 identifies the media entity 175-2 selected by the creator 110, and includes one or more interactive or selectable elements or features for playing, pausing, stopping, rewinding or fast-forwarding media content to be represented in data transmitted to the respective devices 182-1, 182-2 . . . 182-*n*, or to be played by the respective devices 182-1, 182-2 . . . 182-*n*. For example, the creator 110 may initiate the playing of the media entity 175-2 from the music source 170-1 (or catalog or repository), by contact with the user interface 125-3. Alternatively, the media entity 175-2 played from the music source 170-1 may begin playing automatically at a predetermined time in accordance with the media program, or automatically upon completion of a prior playing of media content in accordance with the media program.

Figure 1D:
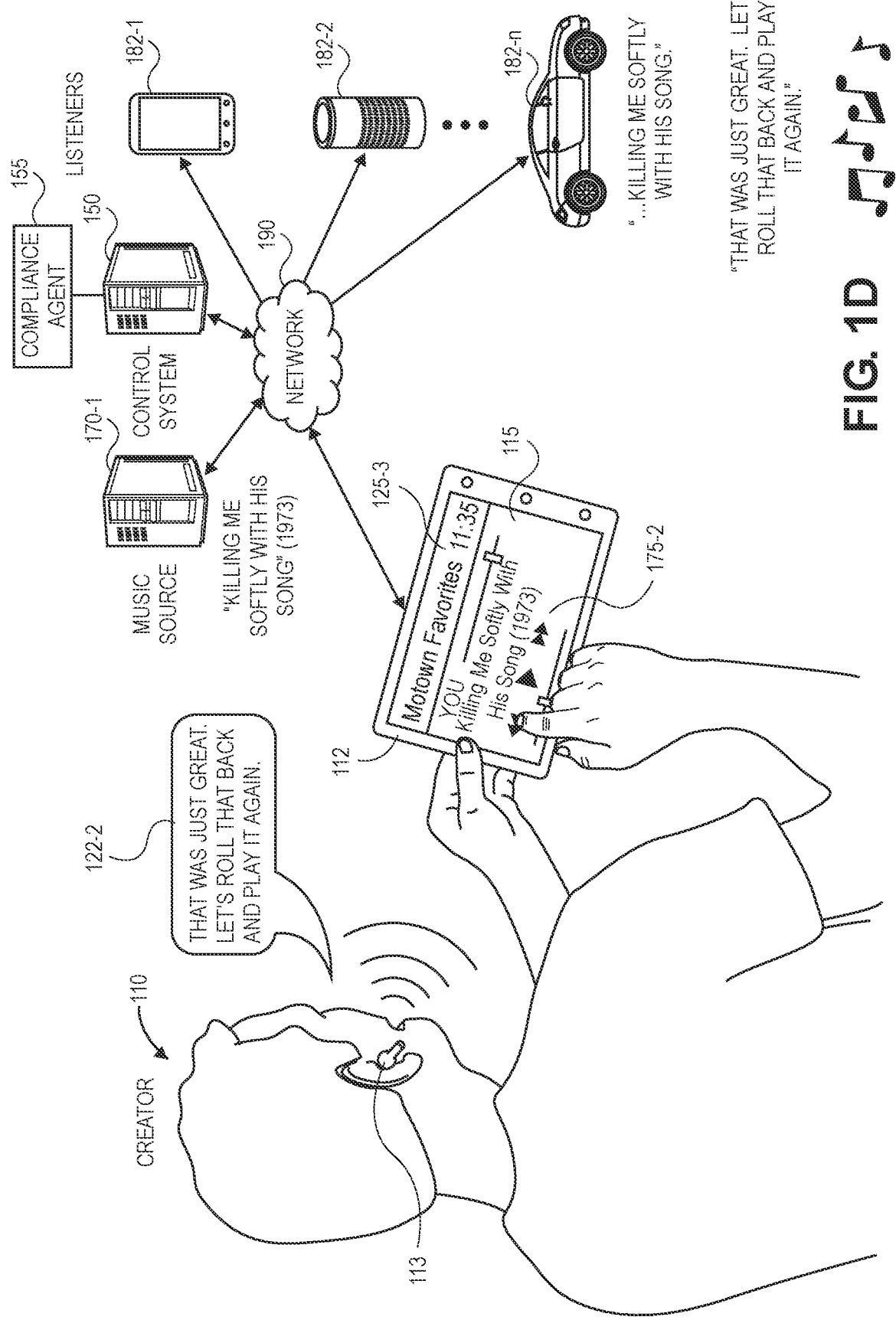

As is shown in FIG. 1D, after the media entity 175-2 has been played in its entirety, the creator 110 provides an utterance 122-2 indicating his or her intent to play the media entity 175-2, viz., "That was just great. Let's roll that back and play it again," and attempts to play the media entity 175-2 by executing one or more gestures with the user interface 125-3.

In accordance with the present disclosure, one or more signals or other information or data representative of actions that are intended or being taken by a creator of a media program, or by one or more listeners, guests or other participants in the media program, may be processed and interpreted by one or more agents to determine whether any of such actions would violate a set of rules, or any number of laws, policies, regulations or other requirements. When an agent determines that any of such actions violates one or more of the rules, or such actions trigger the agent with respect to one or more of the rules, the agent may be programmed or configured to identify, select and execute any number of remedial actions accordingly.

Figure 1E:
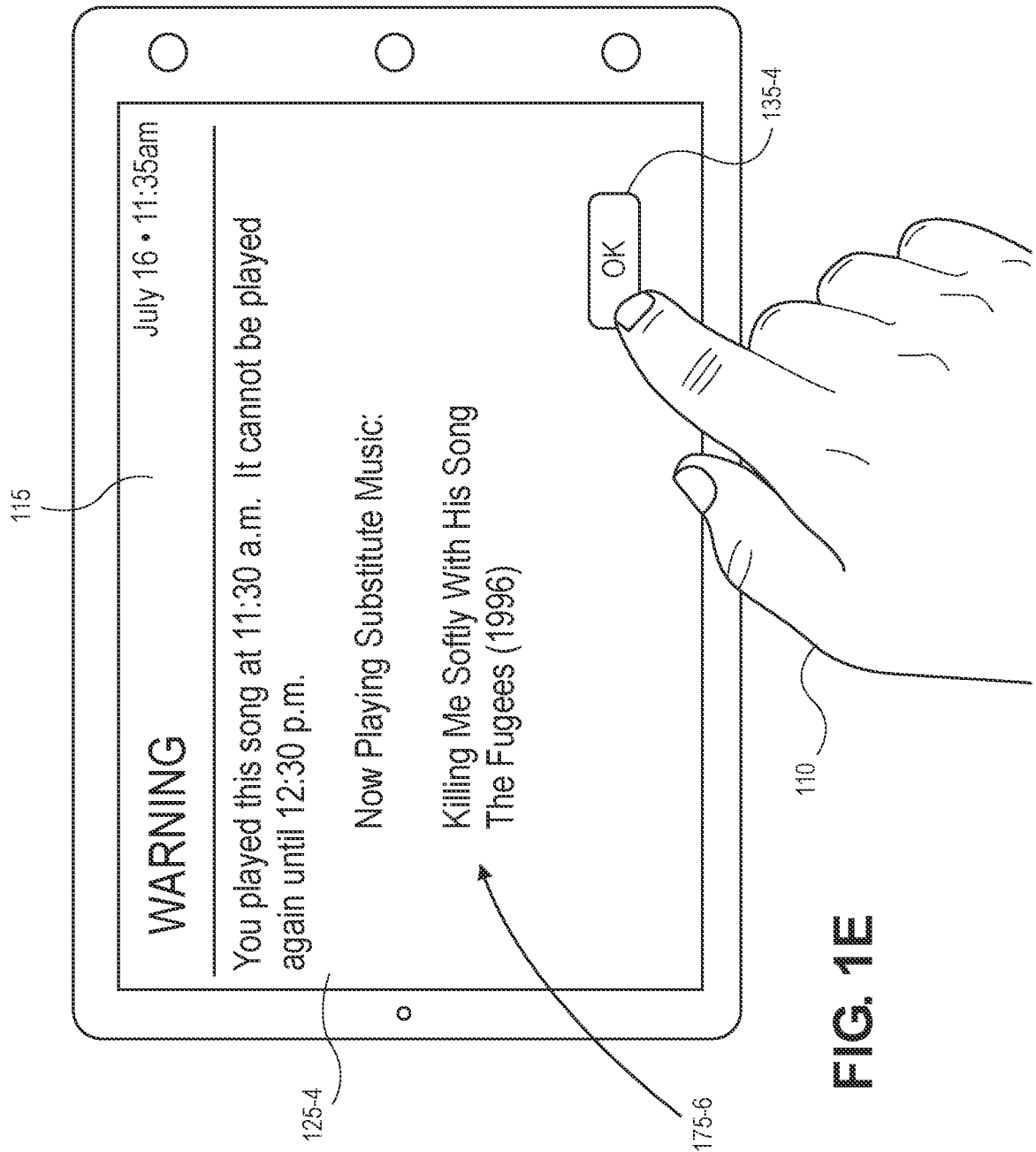

As is shown in FIG. 1E, the compliance agent 155 determines that an intended action of the creator 110, viz., to play the media entity 175-2 twice within the same hour, would violate or invoke one of the rules of the set shown in FIG. 1B. Upon determining that the intended action of the creator 110 would violate or invoke one of the rules, the compliance agent 155 selects a replacement media entity 175-6, viz., the 1996 song "Killing Me Softly With His Song" by The Fugees, and causes user interface 125-4 to be rendered on the display 115 of the mobile device 112. The user interface 125-4 informs the creator 110 that the media entity 175-2 was played at 11:30 a.m., and that the media entity 175-2 cannot be played again until 12:30 p.m., in accordance with the rules. The user interface 125-4 further indicates that the replacement media entity 175-6 has been selected and will be transmitted to the devices 182-1, 182-2 . . . 182-n by the music source 170-1 for playing by such devices.

The compliance agent 155 may determine that the creator 110 intends to play the media entity 175-2 a second time within an hour, to determine that the intended action of the creator 110 would violate or invoke one or more of the set of rules, in any manner and on any basis in accordance with implementations of the present disclosure. For example, audio data captured by the mobile device 112 or the ear buds 113 following the utterance 122-2 may be processed to transcribe the audio data, e.g., in real time or in near-real time, by automated speech recognition or any other techniques, and to identify the words spoken in the utterance 122-2. An intent of the creator 110 to play the media entity 175-2 a second time within an hour may be determined based on one or more of such words. Likewise, data captured by the mobile device 112 regarding interactions with the user interface 125-3 by the creator 110, e.g., in an attempt to play the media entity 175-2 a second time within an hour, may also be interpreted to determine an intent of the creator 110 accordingly.

Likewise, the compliance agent 155 may also determine a remedial action that would comply with the set of rules, e.g., identifying the media entity 175-6 as a replacement for the media entity 175-2, in any manner. For example, the media entity 175-6 may be identified as a replacement for the media entity 175-2 based on any similarities between titles or lyrics of the media entities 175-2, 175-6, as well as any similarities between beats, tempos, rhythms, dynamics, melodies, harmonies, intensities, frequencies, pitches, or any other attributes of the media entities 175-2, 175-6. The compliance agent 155 may determine an intent of the creator 110 or identify a remedial action based on any signals or other information or data, and in any manner, in accordance with implementations of the present disclosure.

Figure 1F:
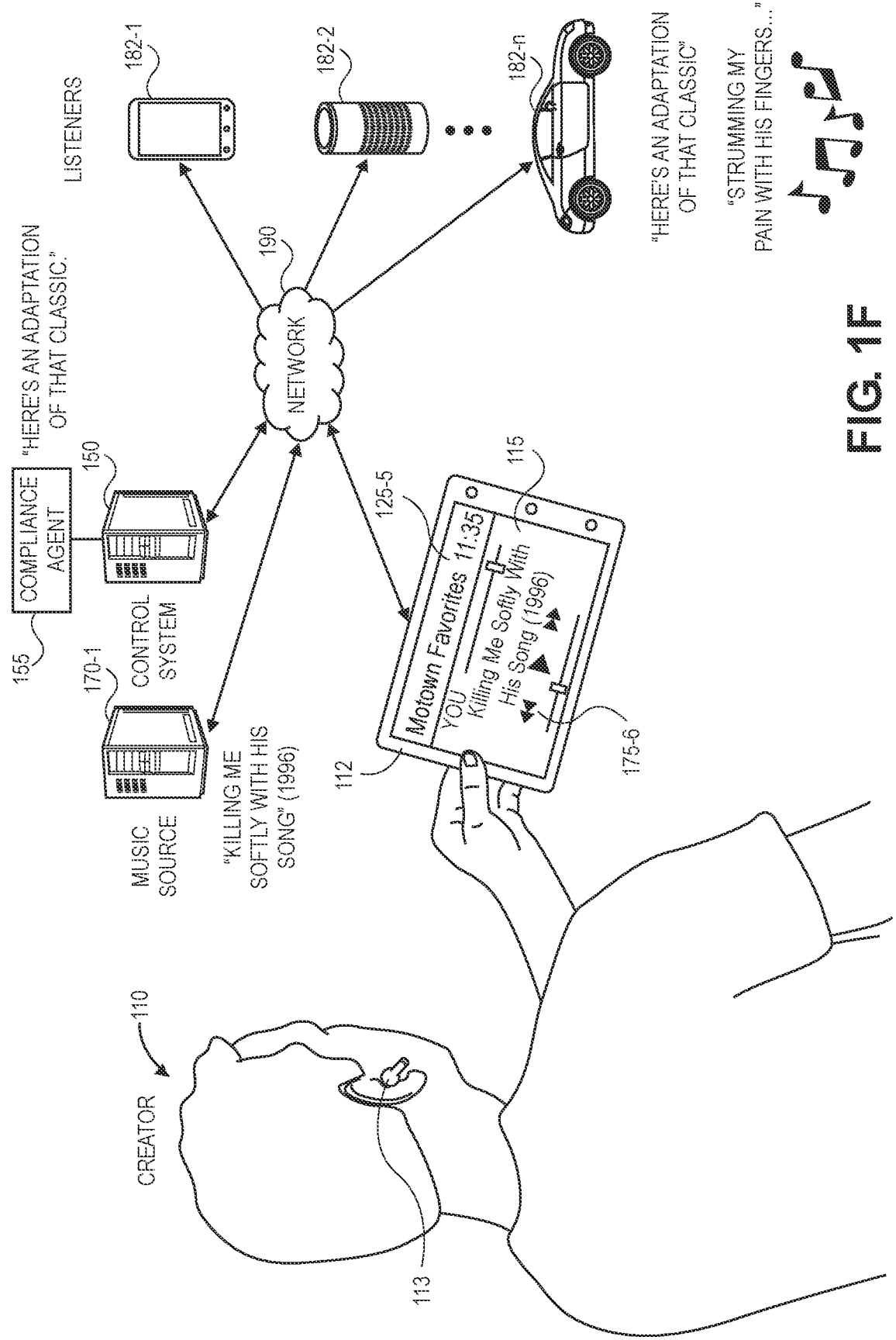

As is shown in FIG. 1F, a user interface 125-5 rendered on the display 115 identifies the media entity 175-6, and includes one or more interactive or selectable elements or features for playing, pausing, stopping, rewinding or fast-forwarding media content to be represented in data transmitted to the devices 182-1, 182-2 . . . 182-n, or to be played by the devices 182-1, 182-2 . . . 182-n. Furthermore, and as is also shown in FIG. 1F, the compliance agent 155 also causes the control system 150 to transmit data for presenting media content in the form of words announcing the playing of the media entity 175-6, viz., "Here's an adaptation of that classic," to the devices 182-1, 182-2 . . . 182-n prior to or concurrent with the playing of the media entity 175-6. The compliance agent 155 may select words or other media content to be transmitted along with the media entity 175-6 in any manner, such as based on the one or more rules that has been violated or invoked, based on a degree or an extent of the violation or invocation, or on any other basis.

Figure 1G:
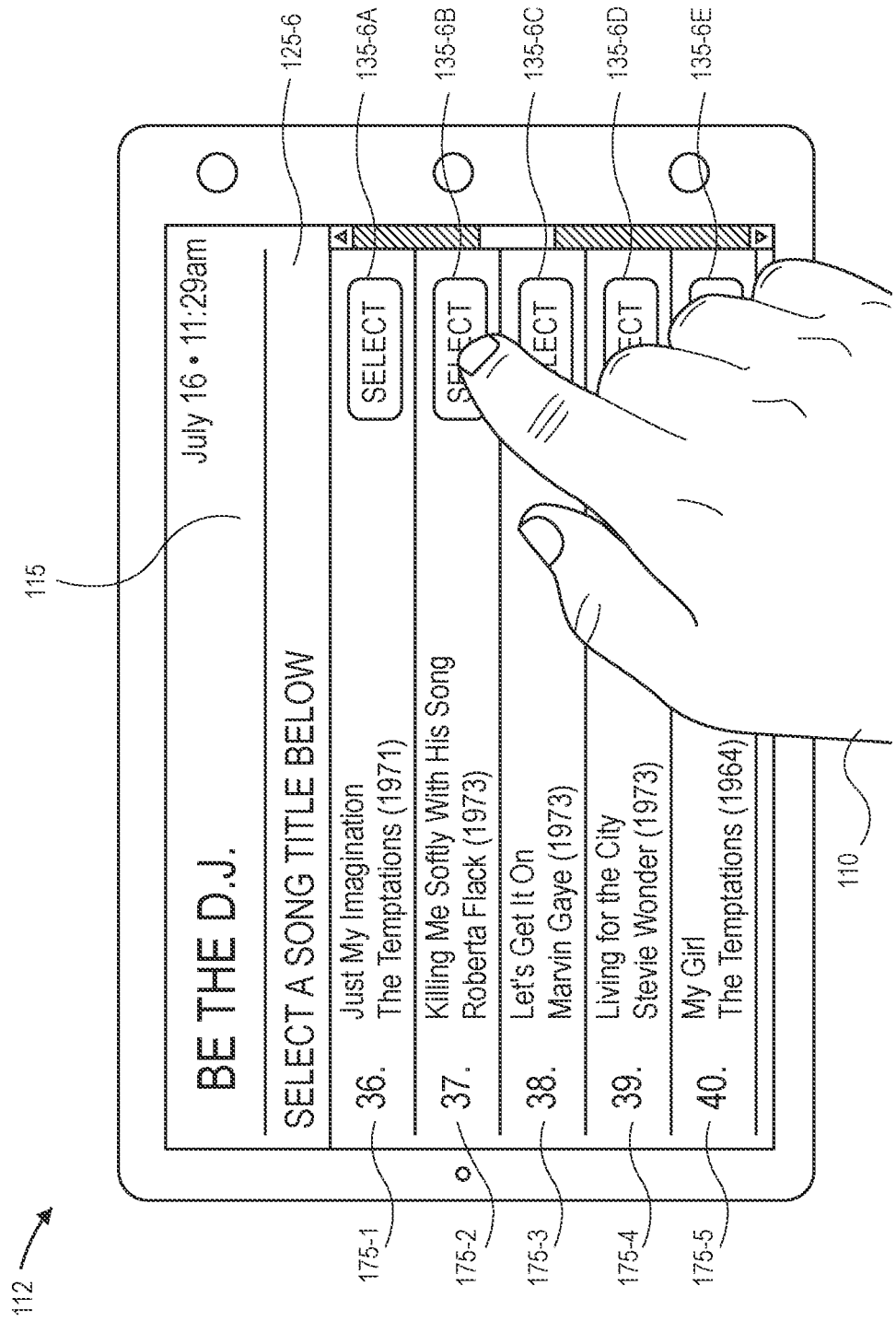

As is shown in FIG. 1G, within the same hour as the initial playing of the media entity 175-2, the creator 110 again selects the media entity 175-2 via one or more gestures or other interactions with a user interface 125-6 rendered on the mobile device 112. The user interface 125-6 includes elements or features identifying the media entities 175-1, 175-2, 175-3, 175-4, 175-5, and buttons 135-6A, 135-6B, 135-6C, 135-6D, 135-6E or other interactive features for selecting the media entities 175-1, 175-2, 175-3, 175-4, 175-5.

Figure 1H:
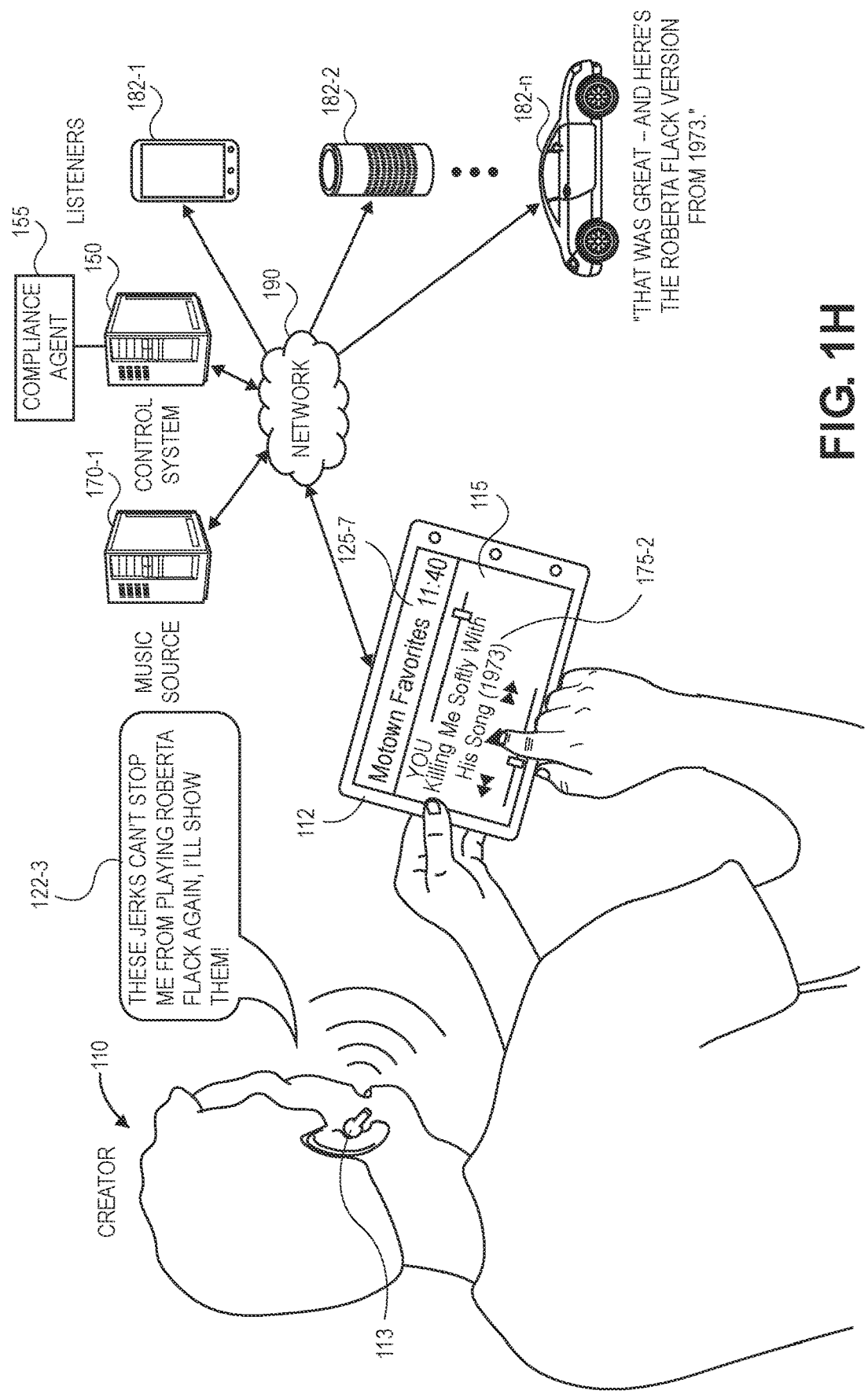

As is shown in FIG. 1H, after the playing of the replacement media entity 175-6 has concluded, and also within the same hour of the initial playing of the media entity 175-2, the creator 110 provides an utterance 122-3 expressing frustration with one or more rules, and indicating his intent to play the media entity 175-2, viz., "These jerks can't stop me from playing Roberta Flack again, I'll show them!" The creator 110 then attempts to play the media entity 175-2 by one or more interactions with one or more interactive or selectable elements or features for playing, pausing, stopping, rewinding or fast-forwarding media content to be represented in data transmitted to the devices 182-1, 182-2 . . . 182-n, or to be played by the devices 182-1, 182-2 . . . 182-n, in a user interface 125-7 rendered on the mobile device 112.

Figure 1I:
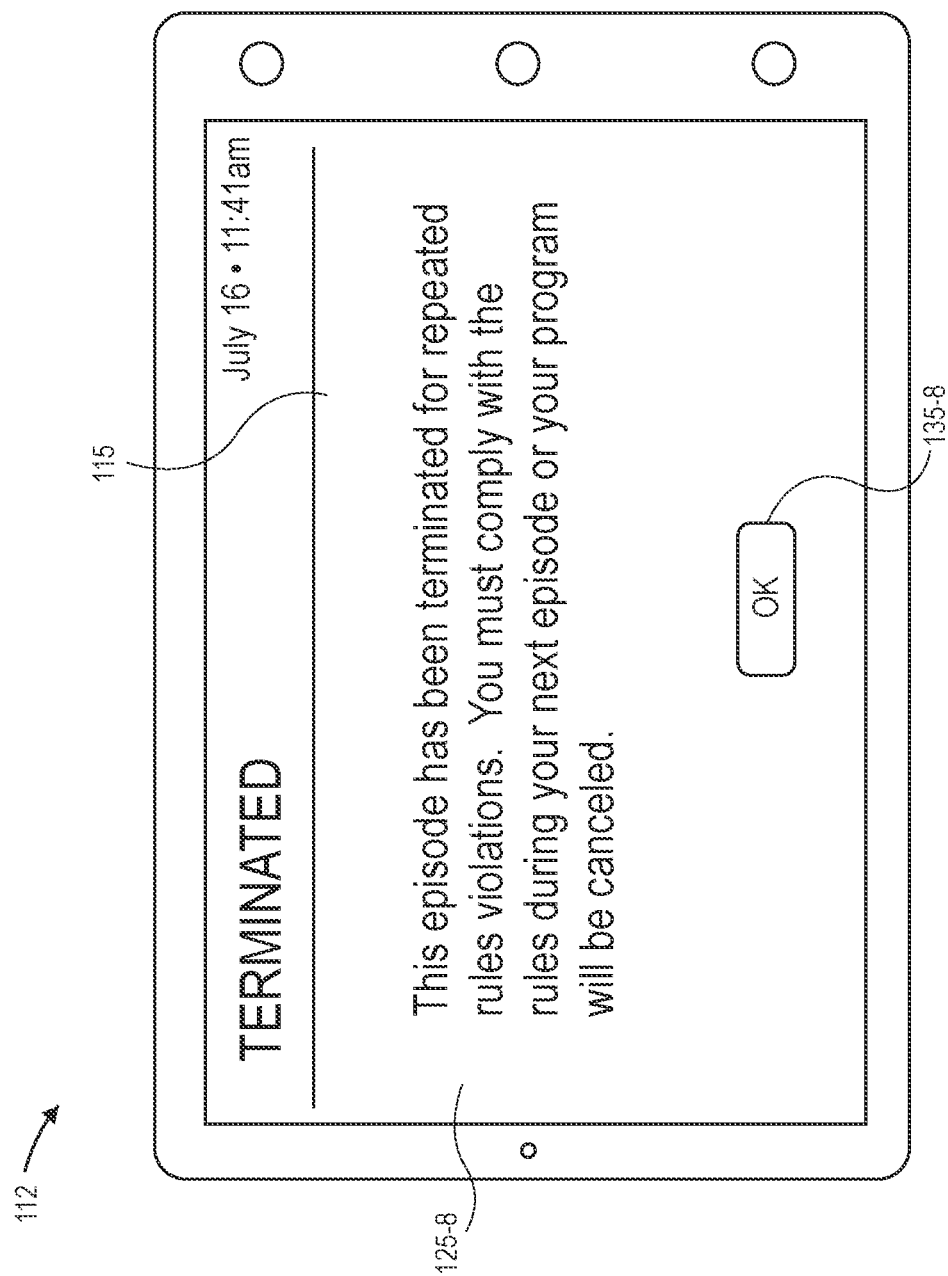

As is shown in FIG. 1I, following the utterance 122-3 of the creator 110 and/or the interactions with the user interface 125-7 shown in FIG. 1H by the creator 110, the compliance agent 155 causes a user interface 125-8 to be rendered on the display 115 of the mobile device 112. For example, in some implementations, the compliance agent 155 may determine that the creator 110 intends to violate or invoke one or more of the rules shown in FIG. 1B based on interactions received from the device 112, such as is shown in FIGS. 1G and 1H, or by transcribing audio data captured by the device 112 representing the utterance 122-3 to identify the words spoken by the creator 110, and determining that such interactions or such words are consistent with an intent to violate or invoke one or more of the rules. The user interface 125-8 informs the creator 110 that the media program has been terminated for the repeated attempts by the creator 110 to violate or invoke one or more of the set of rules.

Figure 1J:
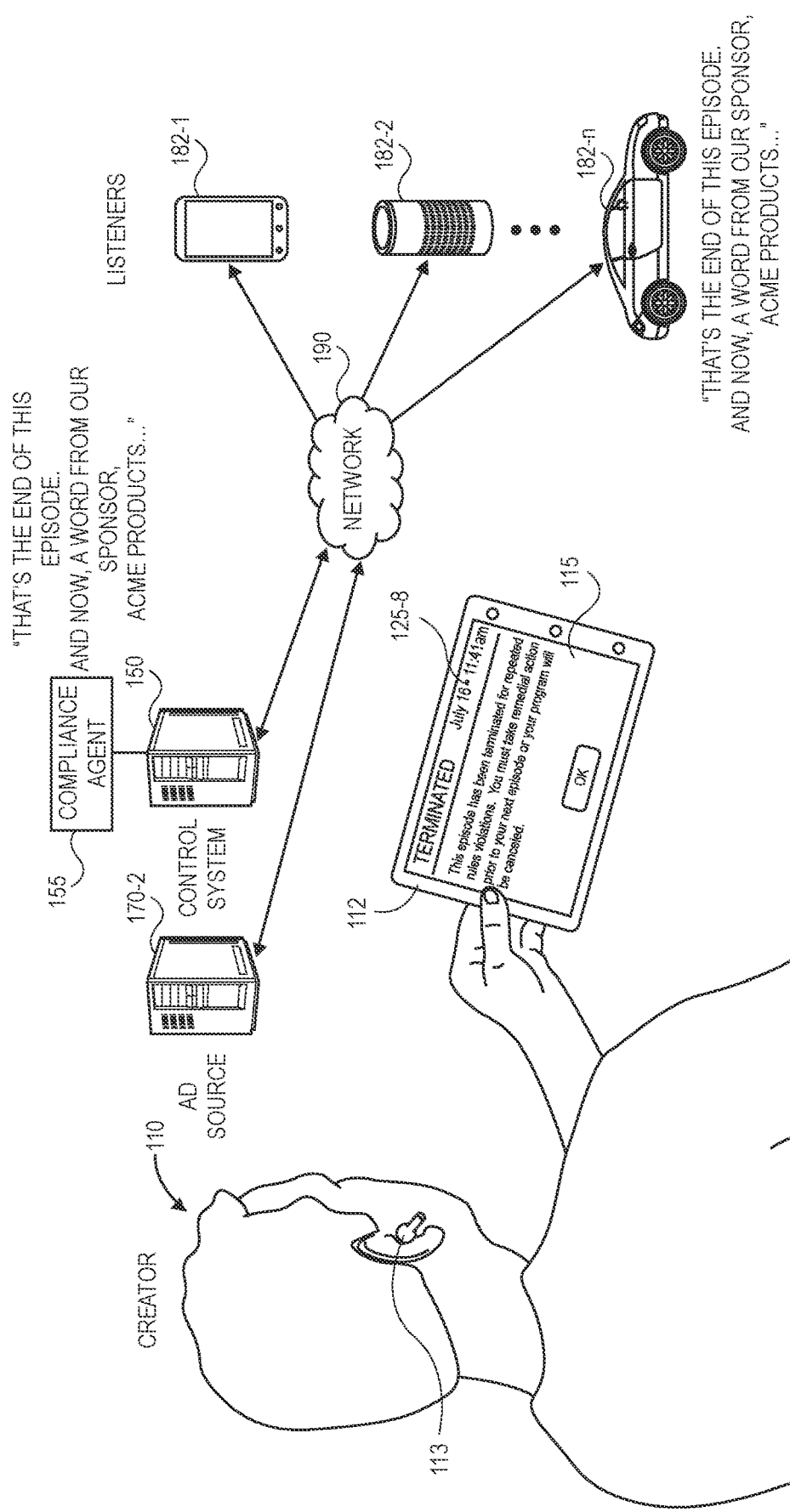

As is shown in FIG. 1J, upon confirming that actions of the creator 110 have violated or invoked one or more of the rules, the compliance agent 155 transmits data for presenting media content in the form of words announcing the end of the media program, viz., "That's the end of this episode. And now, a word from our sponsor, Acme Products," to the devices 182-1, 182-2 . . . 182-n, and establishes a communication channel with an advertisement source 170-2, to cause data for presenting media content in the form of one or more advertisements to be transmitted to the devices 182-1, 182-2 . . . 182-n. The compliance agent 155 may select words announcing the termination of the media program or the presentation of the advertisement in any manner and on any basis, such as based on the one of the set of rules that was violated or invoked, degrees or extents of one or more of the violations or invocations, a number of violations or invocations, or on any other basis.

Accordingly, the systems and methods of the present disclosure execute one or more agents to monitor live broadcasts for policy enforcement and listener interactivity.

The agents of the present disclosure may be programmed or configured to receive signals or other information or data from devices of a creator of a media program, or from devices of listeners, guests or other participants on the media program, and interpret the information or data to determine or identify an intent (or an intended action) associated with such information or data. The agents may also be programmed or configured to determine whether the intent (or the intended action) complies with a set of rules associated with the media program, or to identify, select and execute any number of actions in response to the intent (or the intended action), as necessary.

Media content that may be included in a media program includes, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
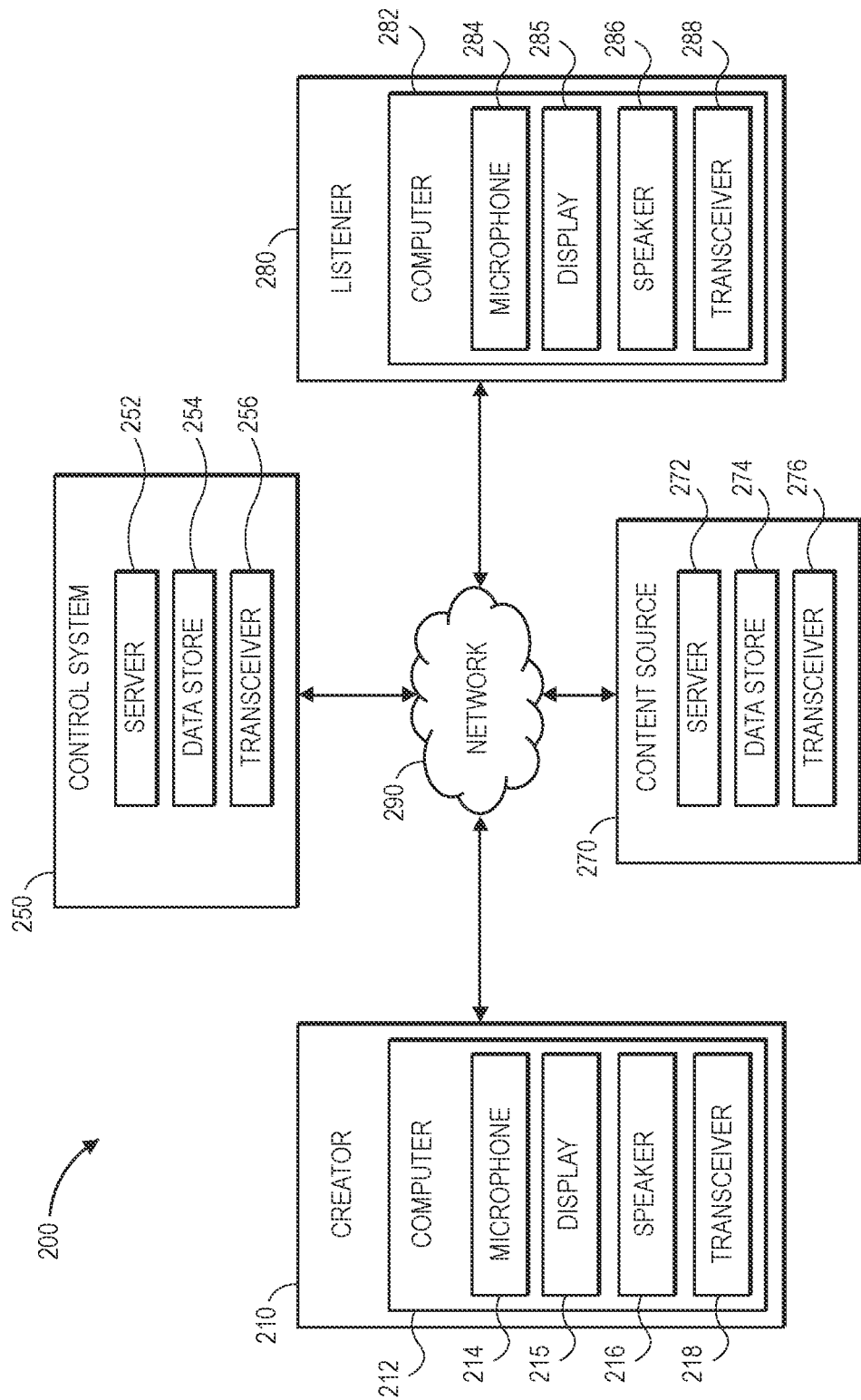
FIGS. 2A and 2B are block diagrams of components of one system for monitoring live broadcasts in accordance with embodiments of the present disclosure.
Figure 2B:
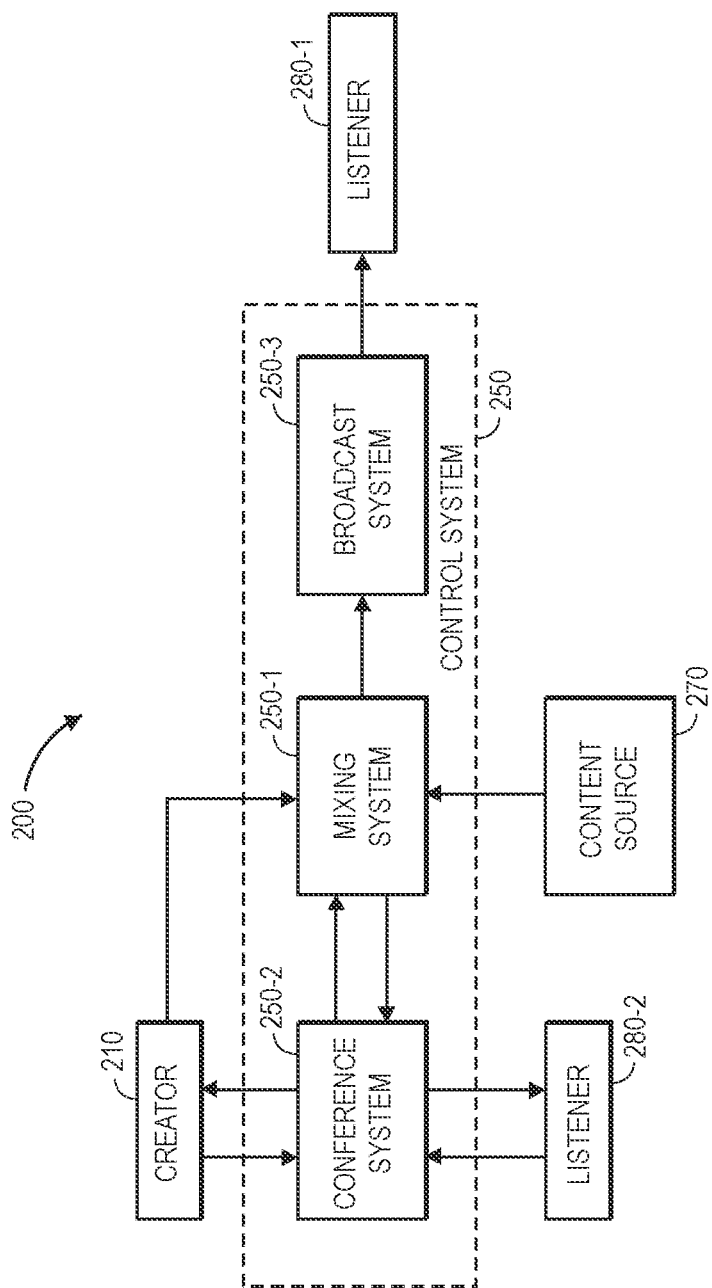

Referring to FIGS. 2A and 2B, block diagrams of components of one system 200 for monitoring live broadcasts in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1J.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
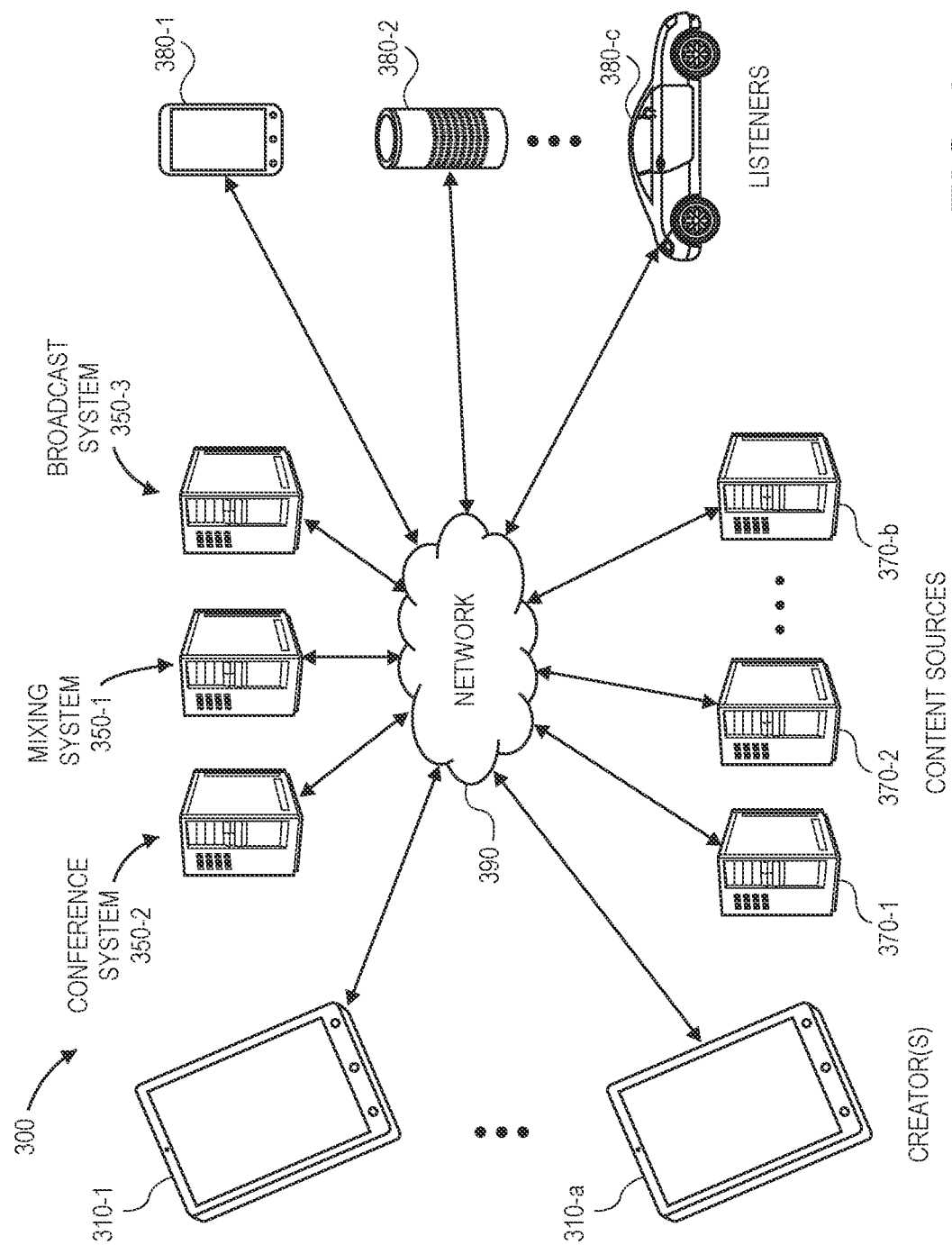
FIG. 3 is a view of aspects of one system for monitoring live broadcasts in accordance with embodiments of the present disclosure.

Referring to FIG. 3, a view of aspects of one system for monitoring live broadcasts in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1J. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a* may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmit or receive information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
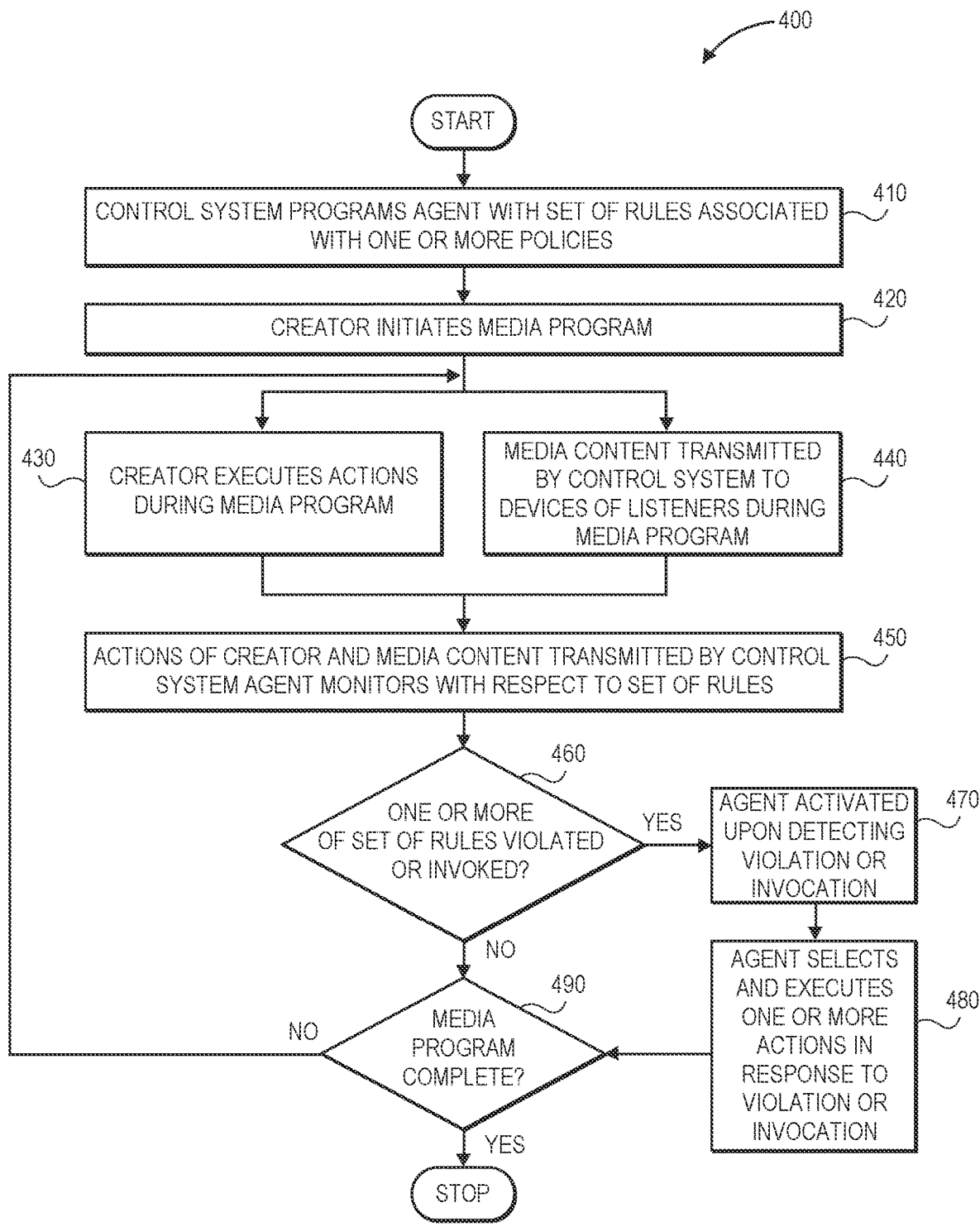
FIG. 4 is a flow chart of one process for monitoring live broadcasts in accordance with embodiments of the present disclosure.

Referring to FIG. 4, a flow chart of one process for monitoring live broadcasts in accordance with embodiments of the present disclosure is shown.

At box 410, a control system programs an agent with a set of rules associated with one or more policies (or laws, regulations or other requirements). For example, in some implementations, one or more of the rules may relate to conduct of a creator, or any guests, listeners or other participants on the program, including but not limited to restrictions on language used by such participants (e.g., whether such participants may use profanity or objectionable language), content that may be included in a media program (e.g., media entities or types of media entities that may be transmitted to devices of listeners in accordance with a media program), advertisements to be included in the media program (e.g., time limits or requirements for the playing of one or more advertisements, or identifications of specific advertisements that may or may not be aired in accordance with a media program), system performance or network connectivity during the media program (e.g., operational standards that must be met by devices of the creator or any listeners, or by the control system, a conference system, a mixing system or a broadcast system, or any other system), or any other factors.

In some implementations, the agent may be configured to determine whether one or more rules of the set are violated or invoked based on any available information or data during a media program. For example, in some implementations, the control system may program the agent to monitor signals or other information or data that is to be transmitted to devices of listeners from any source, e.g., audio data representing advertisements, music, news, sports, weather, or other programming, as well as words that are spoken or sung by a creator, a guest, a listener, or any participant in the media program. Alternatively, or additionally, the agent may monitor signals or other information or data representative of instructions or other actions taken by the creator, or by any guests, listeners or participants, in order to determine an intent of the creator, the guests, the listeners or the participants. For example, in some implementations, where a creator, a guest, a listener or another participant executes one or more interactions with a computer device associated with a media program, such as in an effort to take one or more actions associated with the media program, or to express an opinion regarding the media program, the agent may capture or interpret signals or other information or data regarding such interactions, and determine whether the intent of the creator, a guest, a listener or another participant would violate or invoke any of the set of rules.

In some implementations, one or more of the rules may have a binary construct, and may be framed or defined in absolute terms, e.g., as either violated (or invoked), or not violated (or not invoked), by any actions taken by a creator, a guest, a listener, or another participant in a media program, or media content transmitted in accordance with the media program. In some other implementations, one or more of the rules may be interpreted in a qualitative manner, or as a matter of degree, to determine an extent of a violation by such actions or such content, or an extent to which one or more of the rules is invoked by such actions or such content.

In some implementations, the agent may also be programmed to identify, select and execute any number of remedial actions or operate in accordance with one or more contingency plans in the event that one or more of the set of rules is violated or invoked. Such remedial actions or contingency plans may range from providing a warning to the creator and/or any other offending participants, establishing or disestablishing connections between any number of systems, transmitting data between any of such systems via such connections, or executing any other remedial actions or implementing any other contingency plans. Moreover, one or more rules of the set may objectively apply to all media programs, while one or more other rules of the set may subjectively apply only to specific media programs. Alternatively, or additionally, one or more rules of the set may be selected or designated by a creator of a media program.

At box 420, a creator initiates a media program. For example, in some implementations, the creator may initiate the media program by one or more gestures or other interactions with user interfaces rendered on a display of a computer device of the creator, which may be associated with a network page (e.g., a web page) rendered by a browser, or a dedicated application for constructing media programs operating on the computer device of the creator. The user interfaces may include one or more of any number of buttons, text boxes, checkboxes, drop-down menus, list boxes, toggles, pickers, search fields, tags, sliders, icons, carousels, or any other interactive or selectable elements or features that enable the creator to construct or modify a broadcast plan (or other schedule) of the media program, define one or more attributes or parameters of the media program such as media content to be played at specific times or from specific sources, initiate the playing of specific types or forms of media content, e.g., advertisements, music, news, sports, weather, or other programming, or take any other actions. Alternatively, the creator may initiate the media program in any other manner, e.g., by one or more spoken commands or instructions that may be captured and interpreted by the computer device, and executed to initiate the media program. Once the media program is initiated, connections may be established between devices of listeners and sources of media content or any other systems, and data for playing designated media content may be received from a source and transmitted to devices of the listeners, e.g., from a source of the designated media content to a mixing system or a control system, and then from a broadcast system or the control system to the devices of the listeners, and also to the computer device of the creator, by way of a conference system or directly.

At box 430, the creator executes one or more actions during the media program. In parallel, at box 440, media content is transmitted by the control system to devices of listeners during the media program. For example, the creator may provide one or more utterances that are captured and transmitted as media content to devices of listeners, either during the playing of other media content (e.g., songs, podcasts, or other media files such as news programs, sports programs, weather reports or others) or independently. The creator may also execute any number of gestures or other interactions with user interfaces of a computer device to identify, select or play media content. The creator may further provide chat messages or other feedback to listeners, or take any other actions associated with the media program. For example, the creator may walk, travel or otherwise move during the media program, e.g., on foot or by vehicle. Alternatively, or additionally, guests or other participants in the media program may also execute one or more actions during the media program, e.g., gestures or other interactions with user interfaces, or provide chat messages or take any other actions associated with the media program. Likewise, media content transmitted by a control system (or by a conference system, a mixing system or a broadcast system) to devices of listeners may include or represent words spoken by the creator or other participants in the media program, as well as any advertisements, music, news, sports, weather, or other programming.

At box 450, the agent monitors the actions executed by the creator and the media content transmitted by the control system with respect to the set of rules by which the agent was programmed at box 410. For example, the agent may identify and process signals or other information or data representative of actions executed by a creator or any other participants to determine an intent of the creator or such participants by such actions, or to identify any other information regarding such actions, and to determine whether the intent or the actions would violate or invoke one or more of the set of rules. Similarly, signals or other information or data representative of the media content may be identified and processed to determine whether the transmission of the media content to devices of listeners or the playing of the media content by such devices violates or invokes one or more of the set of rules.

At box 460, whether a violation of any of the set of rules is detected is determined. For example, whether an action or media content violates or invokes any of the set of rules may be determined with respect to any metrics and subject to any level of confidence, which may be calculated or determined in any manner. Furthermore, whether actions or media content violate or invoke any of the rules of the set may be determined within a context of the media program. For example, where the media program has a designation or rating that indicates or suggests that the media program will include profanity or objectionable language, e.g., a media program intended for adults, or a media program having a basis or a requirement to include profanity or objectionable language, the use of such language in the context of that media program may not be deemed a violation of a rule barring such language, or may not invoke such a rule.

If a violation of one or more of the set of rules has been detected based on the actions executed by the creator or the media content transmitted by the control system to the devices of listeners, or if one or more of the set of rules is invoked by the actions or the media content, then the process advances to box 470, where the agent is activated upon detecting the violation, or upon the invocation of the one or more of the set of rules. At box 480, the agent selects and executes one or more actions in response to the violation or the invocation of one or more of the rules. For example, in some implementations, an action (e.g., a remedial action) to be taken upon determining that a rule has been violated or invoked during a media program may be specified by the rule, and may involve termination of the media program by the agent, a temporary or permanent cession of control over the media program to the agent or to the control system, or a transmission of information or data of any type or form, such as data representing media content, or one or more signals or other information or data to any number of computer devices of a creator, or of a guest, a listener or another participant in the media program. Alternatively, or additionally, one or more actions other than termination or a temporary or permanent cession of control may be identified and executed, such as where a rule is violated or invoked by a creator for a first time or during a media program for a first time, where a violation or an invocation of a rule is minor in nature, or where the creator or the media program has an established record of compliance with a set of rules. Conversely, one or more actions in addition to termination or a temporary or permanent cession of control may be identified and executed where a rule is violated or invoked by a creator or during a media program on multiple occasions, where the violation or invocation is serious in nature, or where the creator or the media program has an established record of noncompliance with one or more rules of a set.

If none of the rules have been violated or invoked, or after the agent has selected and executed one or more actions in response to the violation or invocation, the process advances to box 490, where whether the media program is complete is determined. If the media program is complete, then the process ends. Whether a media program is complete may be determined when all of the media content designated in accordance with a broadcast plan or another record associated with the media program has been transmitted to devices of listeners, or at a predetermined time or after a predetermined duration. Alternatively, the media program may be deemed complete when the media program has been terminated by the creator or any other participant, e.g., manually by one or more gestures or interactions with the one or more user interfaces, or by a control system. If the media program is not complete, however, then the process returns to box 430, where the creator executes one or more actions during the media program, and to box 440, where media content is transmitted by the control system to devices of listeners during the media program.

As is discussed above, the systems and methods of the present disclosure may rely on agents to enforce policies relating to the airing of advertisements. In some implementations, where a creator neglects to play an advertisement as scheduled, or in accordance with one or more rules, an agent may select an advertisement, identify an appropriate point in time during which a media program may be temporarily paused, and cause the advertisement to be played during the media program. Referring to FIGS. 5A through 5E, views of aspects of one system for monitoring live broadcasts in accordance with embodiments of the present disclosure are shown. Except where otherwise noted, reference numerals preceded by the number "5" shown in FIGS. 5A through 5E indicate components or features that are similar to components or features having reference numerals preceded by the number "3" shown in FIG. 3, by the number "2" shown in FIG. 2A or FIG. 2B or by the number "1" shown in FIGS. 1A through 1J.

Figure 5A:
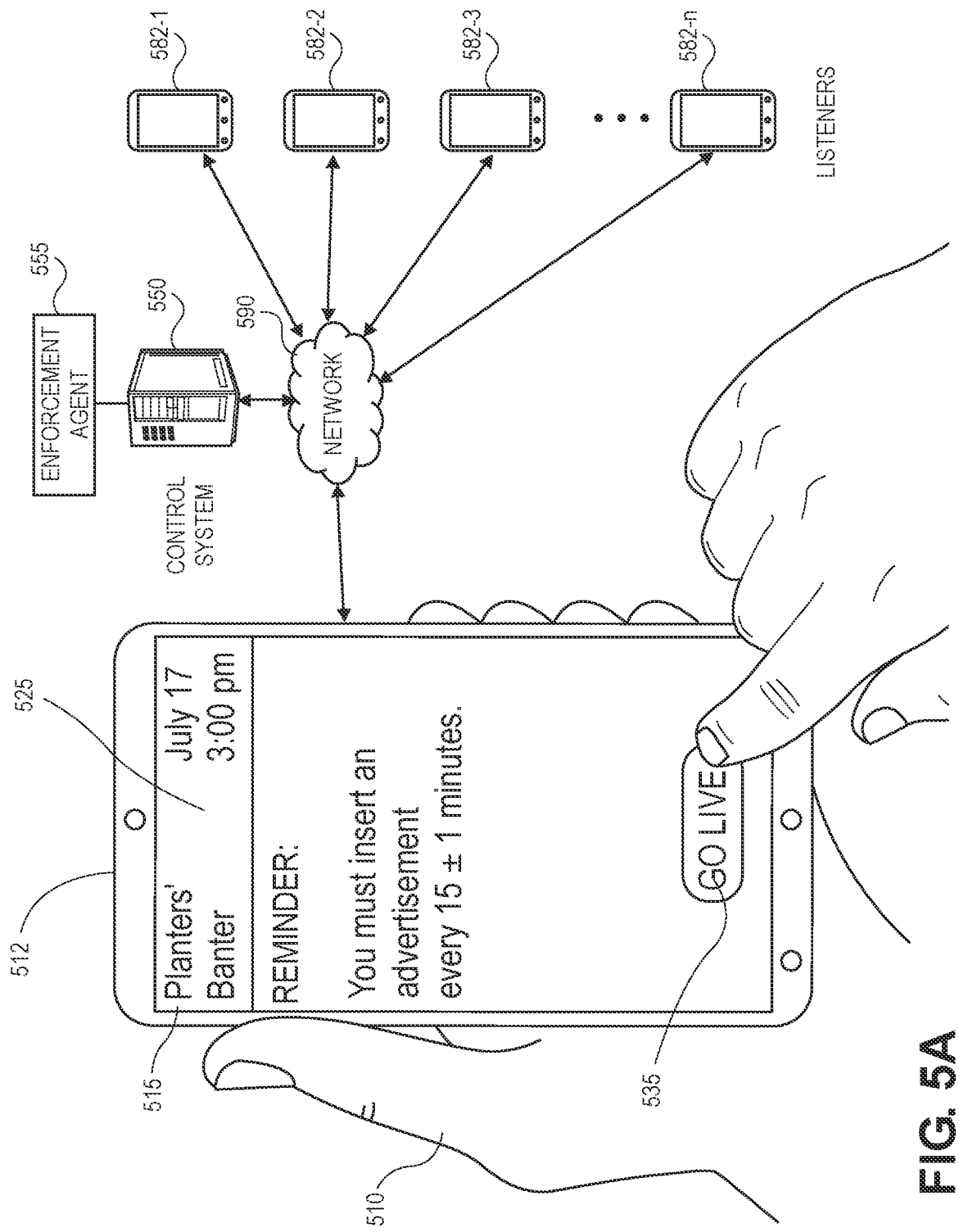
FIGS. 5A through 5E are views of aspects of one system for monitoring live broadcasts in accordance with embodiments of the present disclosure.

As is shown in FIG. 5A, a mobile device 512 of a creator 510, a control system 550, and a plurality of devices 582-1, 582-2, 582-3 . . . 582-n or other systems of any number of listeners are connected to one or more networks 590, which may include the Internet in whole or in part. The control system 550 is configured to execute an enforcement agent 555, or one or more other agents, which may be one or more computer programs or other sets of software or hardware components that are configured to capture or interpret signals or other information or data regarding media content transmitted to the devices 582-1, 582-2, 582-3 ... 582-*n* of the listeners from any source, and to enforce any number of a set of rules (or laws, policies, regulations or other requirements), that may be violated or invoked by such information or data, or by any actions that are planned or being taken by creators, listeners, guests or other participants in the media program. In some implementations, the enforcement agent 555 may be programmed with one or more rules of a set that are selected or designated by a control system, by a creator of a media program, or by any other agent or entity.

The mobile device 512 includes an interactive display 515 having a user interface 525 rendered thereon. The user interface 525 displays a rule regarding the playing of advertisements during a media program that is scheduled to begin at 3 o'clock p.m., viz., "REMINDER: You must insert an advertisement every 15±1 minutes," and includes a button 535 or another interactive feature that may be selected to initiate the media program. The devices 582-1, 582-2, 582-3 ... 582-*n* may be of any type or form.

Figure 5B:
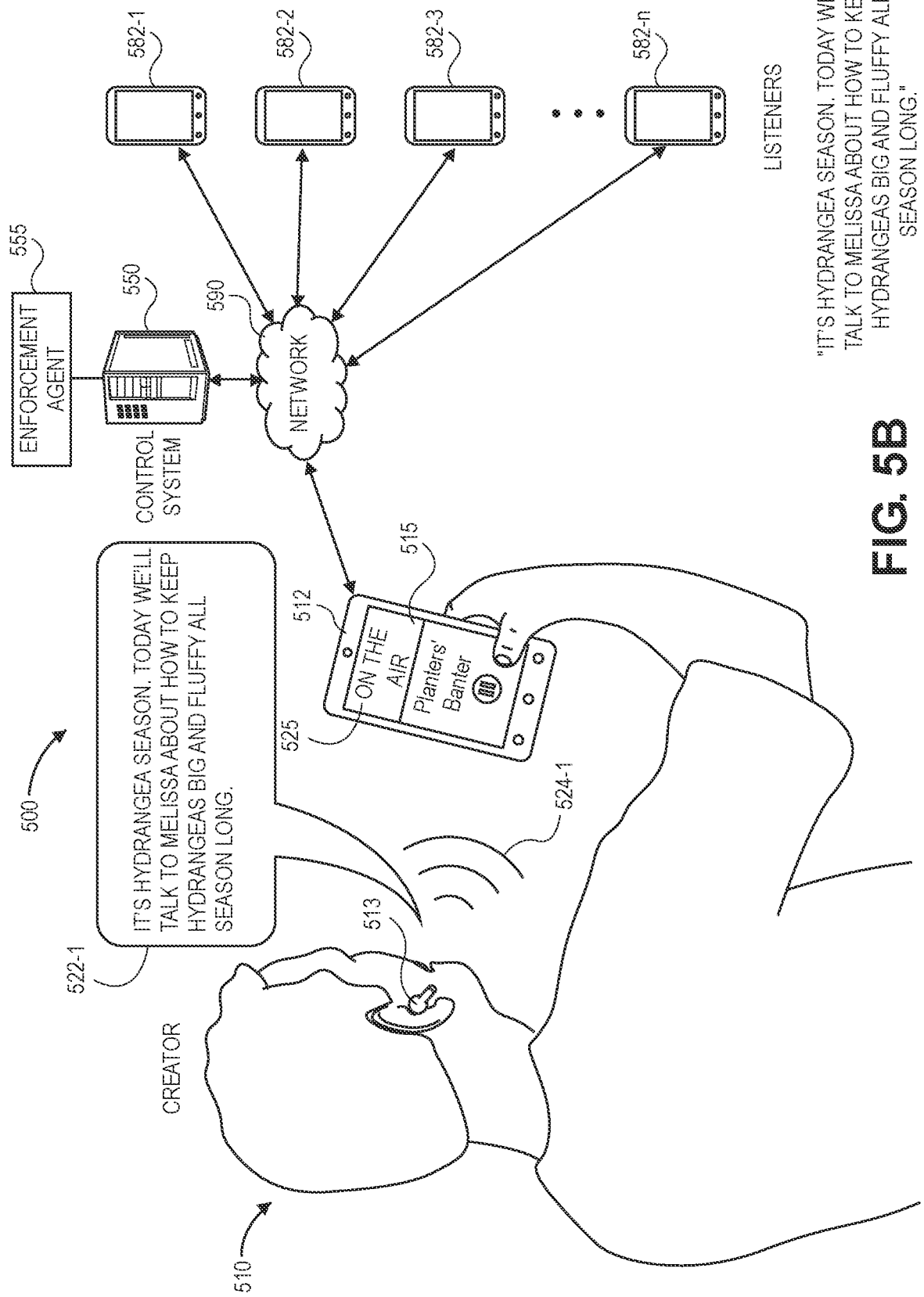

As is shown in FIG. 5B, the creator 510 provides an initial utterance 522-1 to the mobile device 512. Data representing the utterance 522-1 that is captured by the mobile device 512 may be transmitted to a control system 550 or to the devices 582-1, 582-2, 582-3 ... 582-*n* over the one or more networks 590. As is shown in FIG. 5B, the utterance 522-1 welcomes the listeners to the media program, and describes a broadcast plan or a theme of at least a portion of the media program, viz., "It's hydrangea season. Today we'll talk to Melissa about how to keep hydrangeas big and fluffy all season long." Upon receiving the data 524-1, the devices 582-1, 582-2, 582-3 ... 582-*n* may cause one or more words of the utterance 522-1 to be played, e.g., to listeners within a vicinity of the devices 582-1, 582-2, 582-3 ... 582-*n*.

Figure 5C:
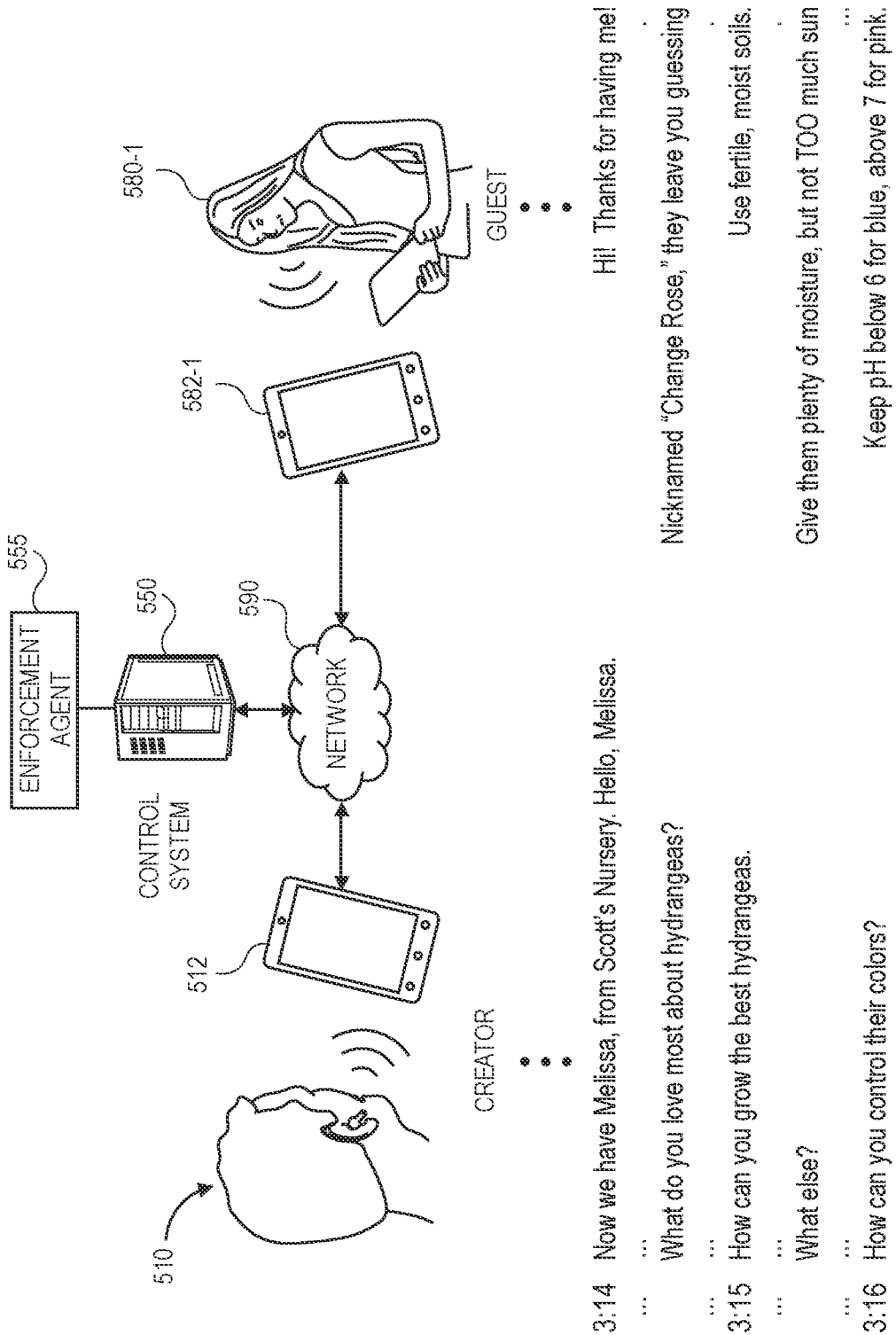

As is shown in FIG. 5C, the creator 510 engages in conversation with one of the listeners 580-1 (e.g., a guest or another participant) by way of one of the devices 582-1. Media content including data representing words spoken by the creator 510 and the listener 580-1 captured by the mobile device 512 and the device 582-1, respectively, is received by the control system 550 and transmitted to devices of listeners, e.g., the devices 582-1, 582-2, 582-3 ... 582-*n*, in accordance with the media program.

For example, as is shown in FIG. 5C, at 3:14 p.m., or fourteen minutes after the start of the media program, the creator 510 states, "now we have Melissa, from Scott's Nursery. Hello, Melissa," and the listener 580-1 replies, "hi! Thanks for having me." The creator 510 asks, "what do you love most about hydrangeas?" and the listener 580-1 replies, "nicknamed 'Change Rose,' they leave you guessing." At 3:15 p.m., or fifteen minutes after the start of the media program, the creator 510 asks, "how can you grow the best hydrangeas?" and the listener 580-1 replies, "use fertile, moist soils." The creator 510 adds, "what else?" and the listener 580-1 replies, "give them plenty of moisture, but not TOO much sun." At 3:16 p.m., or sixteen minutes after the start of the media program, the creator 510 asks, "how can you control their colors?" and the listener 580-1 replies, "keep pH below 6 for blue, above 7 for pink."

Figure 5D:
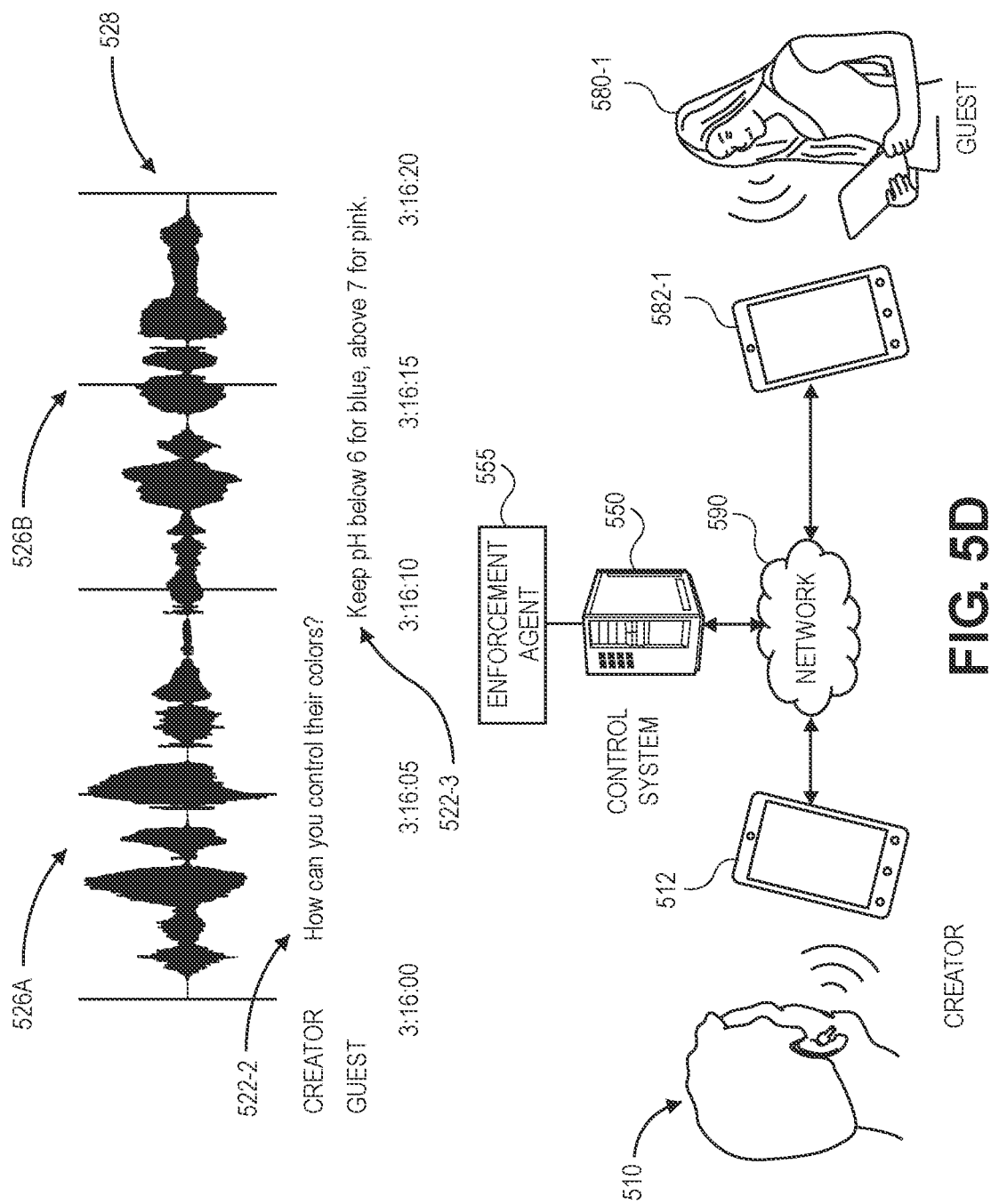

As is shown in FIG. 5D, the enforcement agent 555 executed by the control system 550 monitors the conversation between the creator 510 and the listener 580-1, based on data captured by the mobile device 512 and the device 582-1. For example, the enforcement agent 555 may, on a rolling basis, monitor amplitudes (e.g., sound pressure levels or any other measures of intensity, and to any scale) of acoustic signals received from the mobile device 512 or the device 582-1, or any other systems, which may include or represent words that are spoken or sung by one or more participants in the media program, or any other sounds. As is shown in FIG. 5D, the enforcement agent 555 identifies a portion 526A of the acoustic signals corresponding to utterances 522-2 of the creator 510 and a portion 526B of the acoustic signals corresponding to utterances 522-3 of the listener 580-1, e.g., by speaker diarization. The enforcement agent 555 further detects a time 528 at which neither the creator 510 nor the listener 580-1 is speaking, at approximately 3:16 p.m., or after a time by which the creator 510 was required to have aired an advertisement in accordance with the rule shown in FIG. 5A.

Figure 5E:
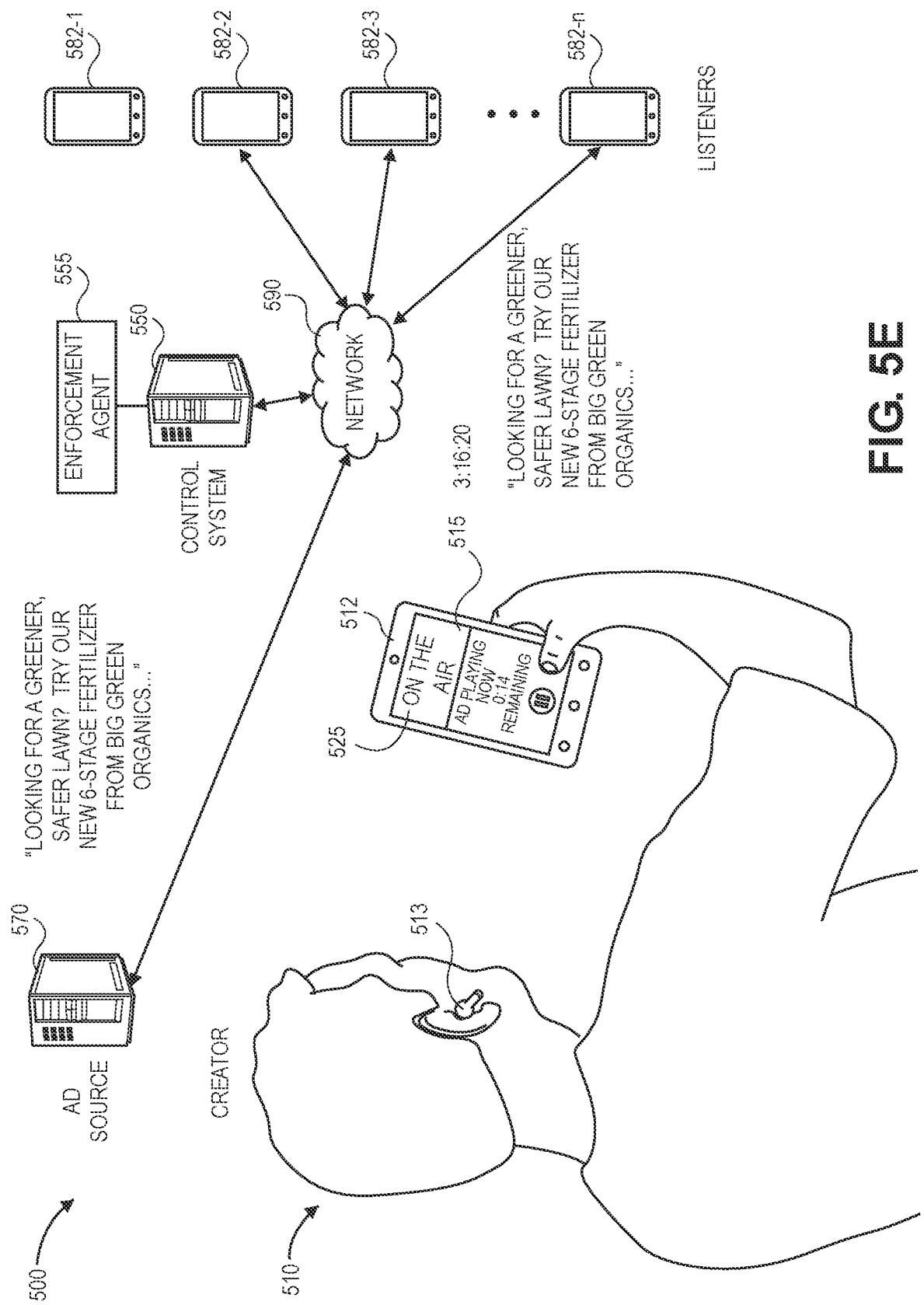

As is shown in FIG. 5E, upon determining that neither the creator 510 nor the listener 580-1 is speaking at the time 528 shown in FIG. 5D, based on the portions 526A, 526B of the acoustic signals, the enforcement agent 555 establishes one or more connections with an advertising source 570, and causes data representing an advertisement to be transmitted to the devices 582-1, 582-2, 582-3 ... 582-*n*. In some implementations, the enforcement agent 555 may cause the transmission of the data representing the advertisement to override the transmission of any other data by the creator 510 or by any other source. In some other implementations, the enforcement agent 555 may cause one or more connections between the creator 510 or the listener 580-1 and the control system 550 to be temporarily disestablished or converted, e.g., from a two-way communication channel to a one-way communication channel, as the data representing the advertisement is transmitted to the devices 582-1, 582-2, 582-3 ... 582-*n*. After the data representing the advertisement has been transmitted to the devices 582-1, 582-2, 582-3 ... 582-*n*, the enforcement agent 555 may return control over the transmission of data in accordance with the media program to the creator 510.

As is discussed above, the systems and methods of the present disclosure may also rely on agents to enforce policies relating to system performance or network connectivity. In some implementations, where a connection between a device of a creator and a control system (or any other system) is lost, for any reason, the control system (or one or more other systems) may be configured to detect the loss of the connection and execute one or more actions in response to the loss. Referring to FIGS. 6A through 6D, views of aspects of one system for monitoring live broadcasts in accordance with embodiments of the present disclosure are shown. Except where otherwise noted, reference numerals preceded by the number "6" shown in FIGS. 6A through 6D indicate components or features that are similar to components or features having reference numerals preceded by the number "5" shown in FIGS. 5A through 5E, by the number "3" shown in FIG. 3, by the number "2" shown in FIG. 2A or FIG. 2B or by the number "1" shown in FIGS. 1A through 1J.

Figure 6A:
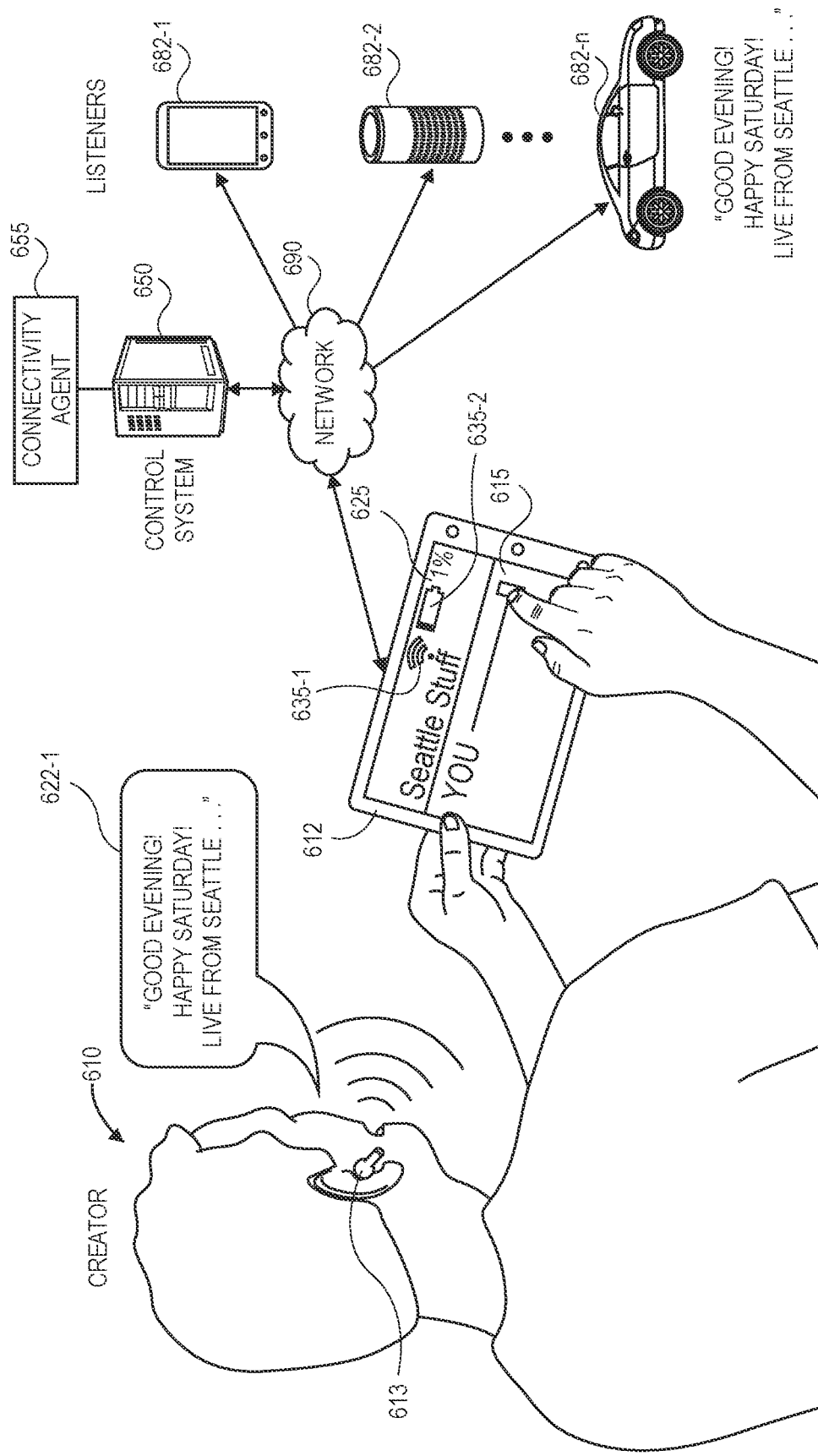
FIGS. 6A through 6D are views of aspects of one system for monitoring live broadcasts in accordance with embodiments of the present disclosure.

As is shown in FIG. 6A, a mobile device 612 of a creator 610, a control system 650, and a plurality of devices 682-1, 682-2 ... 682-*n* of any number of listeners are connected to one or more networks 690, which may include the Internet in whole or in part. The control system 650 is configured to execute a connectivity agent 655, or one or more other agents, which may be one or more computer programs or other sets of software or hardware components that are configured to monitor connectivity between the mobile device 612 of the creator 610 or any other source of media content and the control system 650, or between the control system 650 and any of the devices 682-1, 682-2 ... 682-*n* of listeners, or the performance of any of such devices, and to identify, select and execute any actions upon determining that connectivity between such devices or performance of any of such devices is insufficient or unreliable.

The mobile device 612 includes an interactive display 615 having a user interface 625 rendered thereon. The user interface 625 includes a title or other descriptor of a media program, viz., "Seattle Stuff," as well as a visual indicator 635-1 of a strength or quality of a connection between the mobile device 612 and the network 690, and a visual indicator 635-2 of a level of charge of a battery or other available power source of the mobile device 612.

As is shown in FIG. 6A, the creator 610 provides an utterance 622-1 to the mobile device 612. Data representing the utterance 622-1 that is captured by the mobile device 612 may be transmitted to the control system 650 or to the devices 682-1, 682-2 . . . 682-n over the one or more networks 690. As is shown in FIG. 6A, the utterance 622-1 welcomes the listeners to the media program, and describes a broadcast plan or a theme of at least a portion of the media program, viz., "Good evening! Happy Saturday, live from Seattle." Upon receiving the data, the devices 682-1, 682-2 . . . 682-n may cause one or more words of the utterance 622-1 to be played, e.g., to listeners within a vicinity of the devices 682-1, 682-2 . . . 682-n.

Figure 6B:
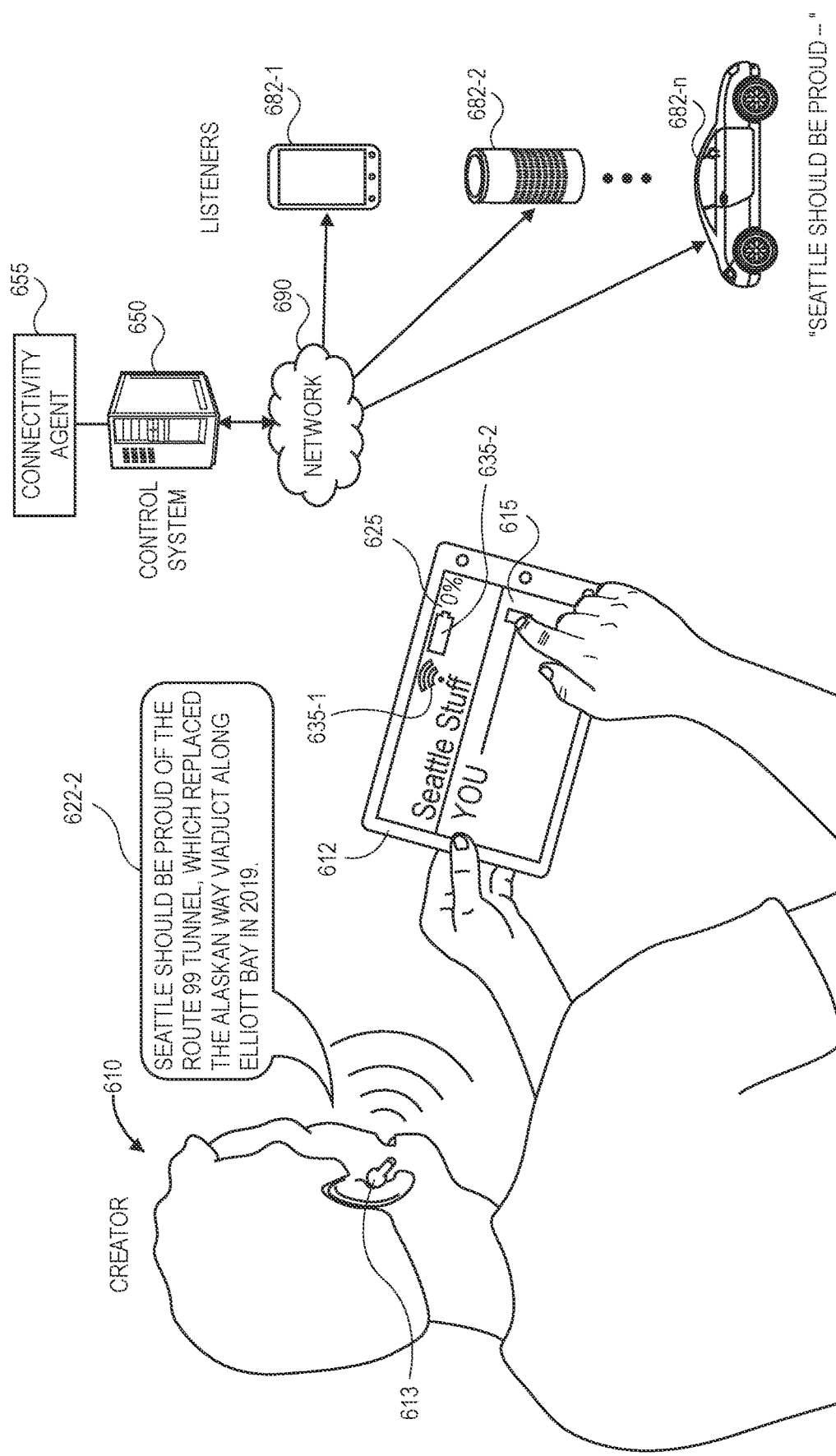

As is shown in FIG. 6B, the creator 610 provides another utterance 622-2, viz., "Seattle should be proud of the Route 99 tunnel, which replaced the Alaskan Way Viaduct along Elliott Bay in 2019," to the mobile device 612. As data representing the utterance 622-2 that is captured by the mobile device 612 is being transmitted to the control system 650, the visual indicator 635-1 indicates that a connection between the mobile device 612 and the network 690 has been lost (or is weak or of insufficient quality), and the visual indicator 635-2 indicates that the battery or other power source of the mobile device 612 is fully discharged. As is further shown in FIG. 6B, the transmission of data is terminated before the utterance 622-2 was played in its entirety to listeners within a vicinity of the devices 682-1, 682-2 . . . 682-n.

Figure 6C:
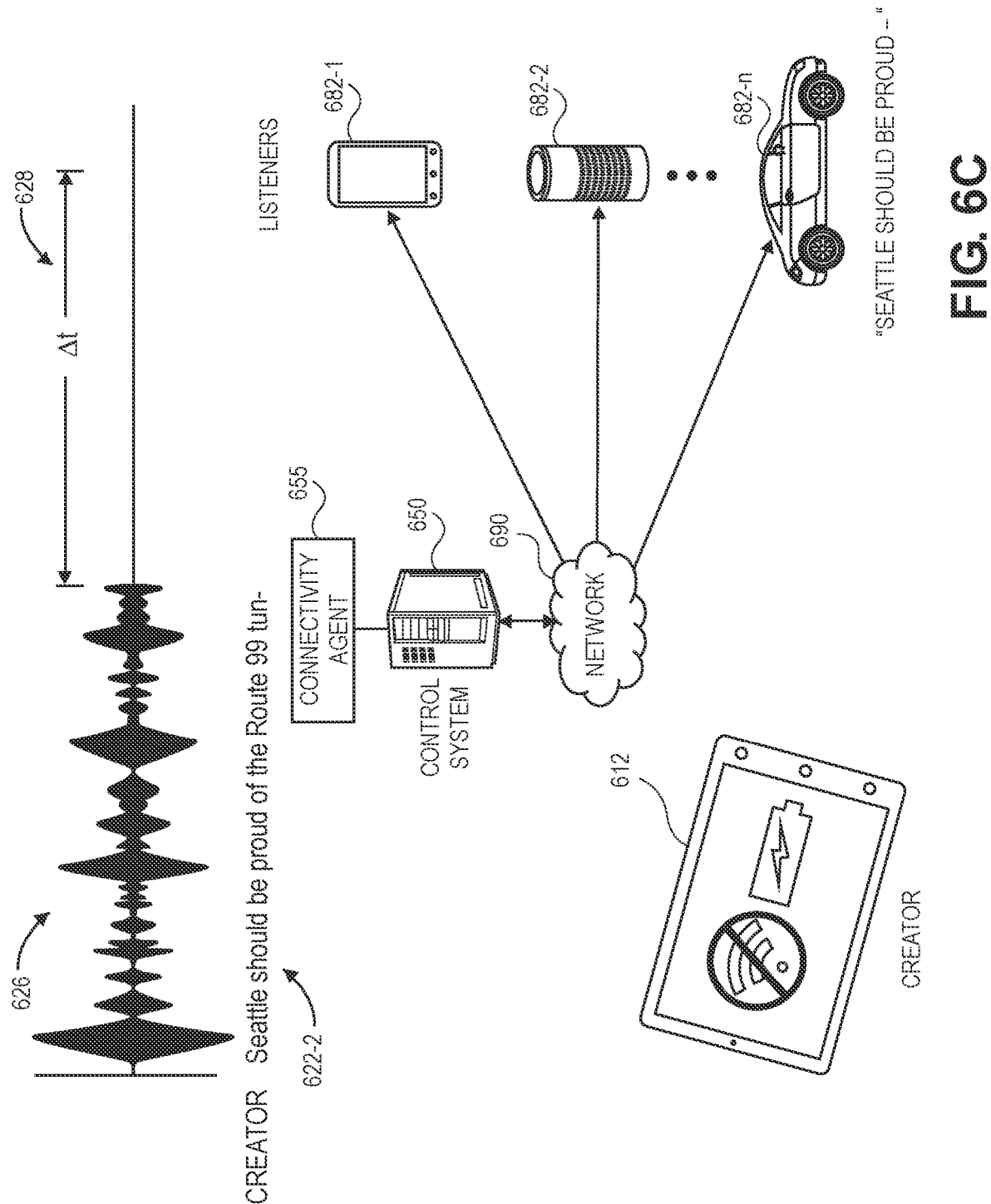

As is shown in FIG. 6C, the connectivity agent 655 monitors the transmission of data captured by the mobile device 612 to the devices 682-1, 682-2 . . . 682-n of listeners. For example, the connectivity agent 655 may, on a rolling basis, monitor amplitudes of acoustic signals received from the mobile device 612, or any other systems, which may include or represent words that are spoken or sung by one or more participants in the media program, or any other sounds. As is shown in FIG. 6C, the connectivity agent 655 determines that connectivity with the mobile device 612 is lost where amplitudes of a portion 626 of the acoustic signals are insignificant or non-existent. After the acoustic signals have been insignificant or non-existent for a predetermined period 628 of time, and connectivity with the mobile device 612 is not regained, the connectivity agent 655 (or one or more systems) may execute one or more actions to compensate for the loss of connectivity with the mobile device 612. Alternatively, or additionally, the connectivity agent 655 may monitor data transfer rates (e.g., bit rates) or any other attributes of data received from the mobile device 612, or from any other source.

Figure 6D:
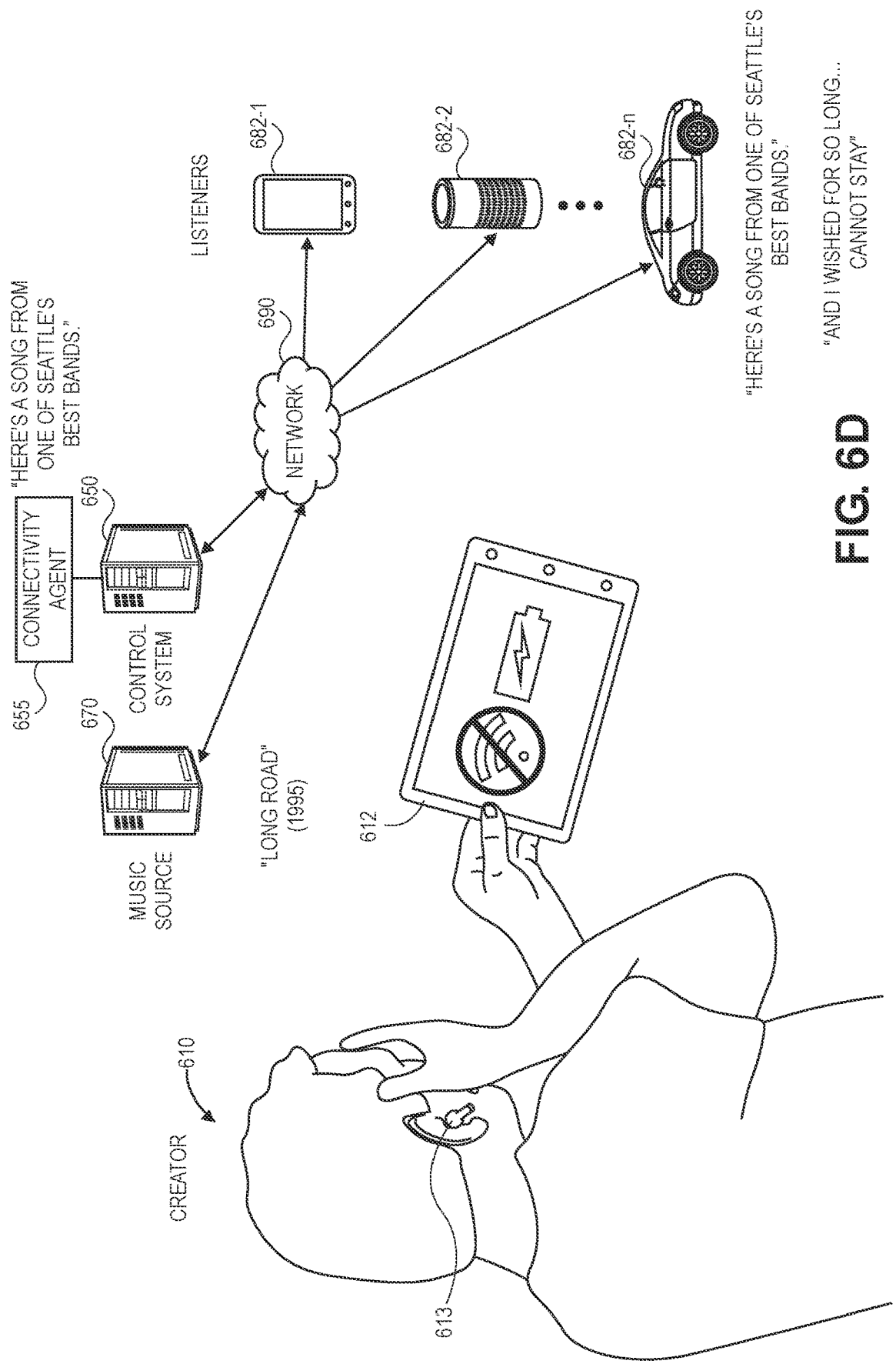

As is shown in FIG. 6D, upon determining that a connection with the mobile device 612 has been lost, or that no data is being transmitted to the devices 682-1, 682-2 . . . 682-n, the connectivity agent 655 may identify a media entity associated with the media program, e.g., the 1995 song "Long Road," by Pearl Jam, a Seattle-based band, and establish a connection with a music system 670 or another system having the media entity stored thereon. The connectivity agent 655 may then cause data representing an audible message regarding the media entity, viz., "Here's a song from one of Seattle's best bands," to the devices 682-1, 682-2 . . . 682-n, along with data representing the media entity, to be transmitted from the music system 670 to the devices 682-1, 682-2 . . . 682-n. Alternatively, or additionally, the connectivity agent 655 may continue to cause any number of other media entities to be played by the devices 682-1, 682-2 . . . 682-n, for any period or duration, such as until the media program has ended as scheduled, until the media program has been terminated, or until a connection between the mobile device 612 and the control system 650 has been restored.

In some implementations, an agent or another system may identify or select a media entity or an accompanying audible message to be transmitted in response to a loss of connectivity with a device of a creator on any basis. Moreover, an agent or another system may determine that a connection is lost or that one or more remedial actions are required for any reason, and need not limit such a determination to network connectivity or system performance. Furthermore, in some implementations, an application or another program operating on devices of listeners or playing media may be programmed with data (e.g., one or more media entities, including but not limited to audible messages of spoken words) and configured to play such data upon detecting a loss of connectivity with a control system or another system.

Figure 7:
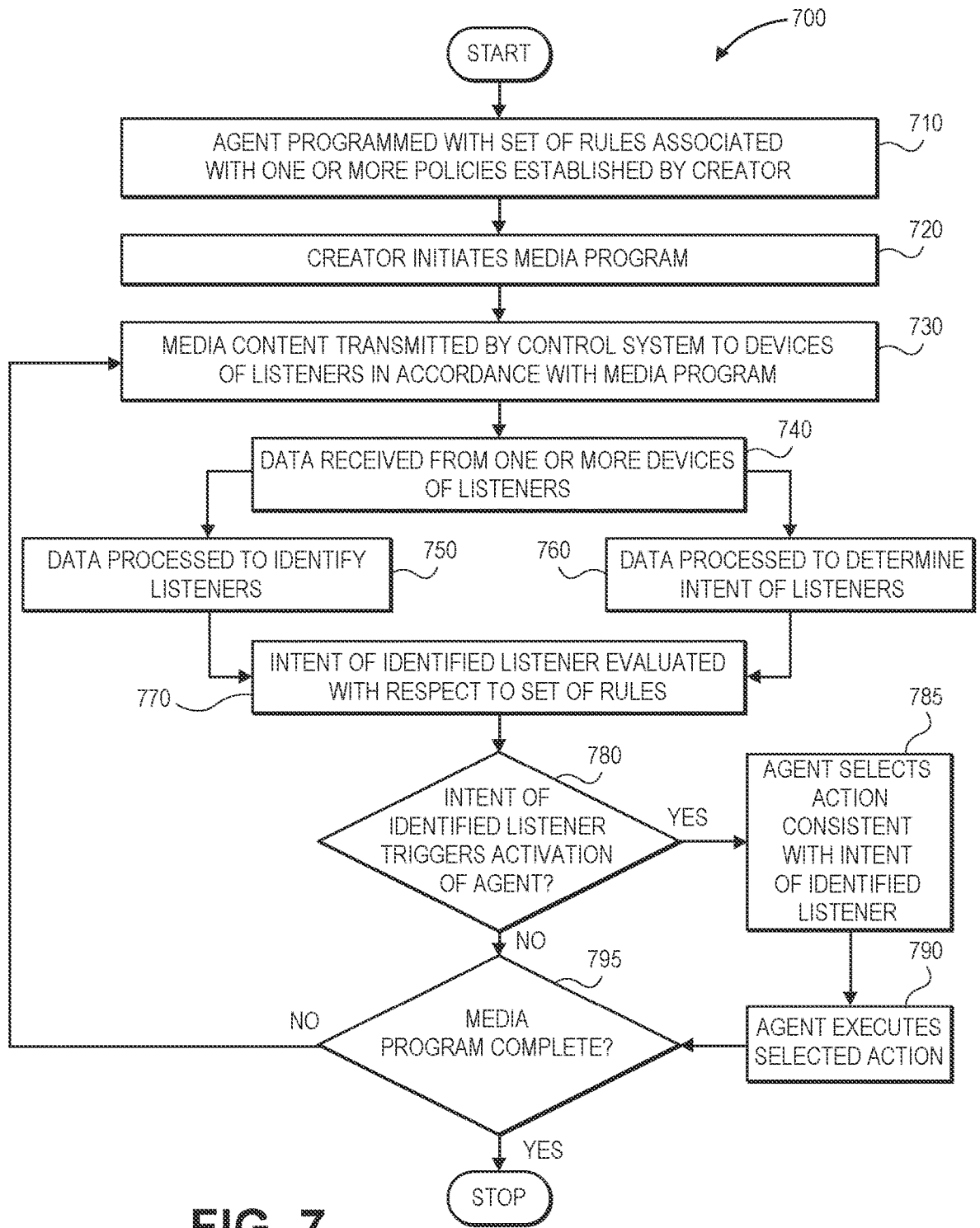
FIG. 7 is a flow chart of one process for monitoring live broadcasts in accordance with embodiments of the present disclosure.

As is discussed above, the systems and methods of the present disclosure may also rely on agents to monitor interactions received from listeners, or to provide a creator or other personnel with any relevant information or data regarding such interactions, or identify and execute any relevant action in response to such interactions. Referring to FIG. 7, a flow chart of one process for monitoring live broadcasts in accordance with embodiments of the present disclosure is shown.

At box 710, an agent is programmed with a set of rules associated with one or more policies established by a creator. The agent may be programmed to be activated upon determining that one or more actions by a creator or any guests, listeners or other participants violates or invokes any of the rules. In some implementations, the rules may relate to conduct of a creator, or any guests, listeners or other participants on the program, and may include restrictions on language used by such participants, content that may be included in a media program, advertisements to be included in the media program, system performance or network connectivity during the media program, or others. One or more of the set of rules may also include or specify remedial actions or contingency plans to be executed in the event that one or more of the set of rules is violated or invoked, and may objectively apply to all media programs, while one or more other rules of the set may subjectively apply only to specific media programs. Alternatively, or additionally, one or more of the rules may be established by an entity associated with a control system, or any other entity.

At box 720, the creator initiates a media program, e.g., by one or more gestures or other interactions with user interfaces rendered on a display of a computer device. In accordance with the media program, the creator may direct, or the control system or another system may control, the establishment of connections between any number of devices or systems. At box 730, media content is transmitted by the control system to devices of listeners in accordance with the media program. The media content transmitted by the control system (or by a conference system, a mixing system or a broadcast system) to the devices of listeners may include or represent words spoken by the creator or other participants in the media program, as well as any advertisements, music, news, sports, weather, or other programming.

At box 740, data is received from one or more of the devices of the listeners. In some implementations, the data may include or represent one or more words spoken by the listeners (e.g., audio data), one or more chat messages generated and transmitted by the listeners (e.g., text data), one or more images captured or transmitted by the listeners, or any other data that may be sent from devices of the listeners to the control system (or to another systems) over one or more one-way or two-way channels. In some implementations, data may be received from the creator, from guests, or from any other participants in the media program in a similar manner, e.g., from devices of such participants. The data received from such devices may have been provided by way of any I/O devices, including but not limited to a mouse, a stylus, a touchscreen, a keyboard, a trackball, or a trackpad, as well as any voice-controlled devices or software.

At box 750, the data is processed to identify the listeners that provided the data received at box 740. For example, a listener may expressly identify his or her name or another identifier in audio data or text data received from a device of the listener, such as by stating or typing words or numbers such as, "hello, this is Karen from Burlington," or "I am listener no. 7774," and the listener may be identified by interpreting the data. Alternatively, or additionally, where the data received from the listeners is accompanied by metadata or other information or data that may be associated with a device, a listener, or a media account, the listeners may be identified based on such metadata, information or data. In some implementations, when data is received from an entity other than a listener, e.g., a guest or another participant, or any other source, the data may be processed to identify the entity accordingly.

In parallel, at box 760, the data is processed to determine an intent of each of the listeners that provided the data received at box 740. For example, where the data represents words spoken by a listener (or another participant), such as audio data, the data may be transcribed, e.g., in real time or in near-real time, by automated speech recognition or any other techniques, to identify the one or more words represented therein. Words identified from audio data, or words expressed in text data, may then be parsed or otherwise evaluated to determine an intent of a listener that may correspond to an action desired by the listener, such as by comparing the words to one or more rules or templates, which may be associated with specific intents. The listener may, for example, intend or request to join and participate in the media program, have one or more media entities played on the media program, or express his or her opinion regarding any aspect of the media program, or intend to take any other action. Alternatively, an intent of a listener may be determined from the data received at box 740 in any other manner.

A listener that provides the data received at box 740 may do so for any reason and with any intent. For example, the listener may request to participate in a media program, e.g., by one or more utterances of words or text-based messages. Alternatively, the listener may indicate his or her approval or disapproval of the media program, or any of the media content of the media program, by one or more words or other interactions that may be identified from the data, including but not limited to entries of text or other actions by way of a user interface or an I/O device.

At box 770, the agent evaluates the intents determined at box 740 of the listeners identified at box 750 with respect to the set of rules. For example, the agent may determine whether a listener intends or requests to join the media program, or to indicate his or her approval or disapproval of the media program or any media content, and associate the intent of the listener with the identities of the listeners. In some implementations, one or more of the rules may specify which of the listeners (e.g., a specific one of such listeners) may be permitted to join a media program in progress, or how many of such listeners, may be permitted to join a media program in progress. The agent may then determine whether an identified listener is one of the listeners who is permitted to join the media program, or whether a limit on a number of listeners that may join the media program has been reached, and permit a listener to join the media program or prohibit the listener from joining the media program accordingly. Alternatively, one or more of the rules may define or limit content of words or text-based messages that may be received from listeners, e.g., for relevance, for profanity, or for objectionable language, or any other definitions or limitations. The agent may determine whether lengths of any messages received from listeners exceed a number of words designated in a rule, whether any messages include profanity or objectionable language as defined by a rule, or whether any messages are relevant or irrelevant to a topic of a media program as set forth in a rule, for example. In some other implementations, one or more of the rules may track or tabulate songs or other media content requested by listeners, and determine which songs or media content have been requested by listeners, or by how many listeners. The agent may be programmed with any type or form of rules, and configured to be triggered, or to take any actions, upon determining that one or more of such rules is violated or invoked. Moreover, in some implementations, the agent may evaluate the intents determined at box 760 of the listeners identified at box 750 with respect to the set of rules, either individually for a single listener or collectively for multiple listeners.

At box 780, whether the intent of any identified listener would trigger an activation of the agent with respect to the rules of the set is determined. If the intent of the identified listener would trigger the activation of the agent, e.g., with respect to any of the rules of the set, then the process advances to box 785, where the agent selects an action consistent with the set of rules based on the intent of the listener. For example, if an identified listener or another guest is participating in a media program, e.g., via a two-way communications channel, and it is determined that the identified listener intends to express profanity during the media program, the agent may identify a communications channel between a device of the listener and the control system or another system, and execute one or more actions associated with opening or disestablishing the communications channel. Where a text-based message received from the listener includes profanity or other objectionable language, the agent may identify and sequester or delete the text-based message, and report the listener for his or her violation of one or more of the set of rules. Where a media entity requested by the listener cannot be timely played for any reason, the agent may identify another media entity that is similar to the media entity requested by the listener, or consistent with a request or a preference of the listener, and which may be played without violating any rules of the set, and cause the media entity to be transmitted to devices of one or more of the listeners in lieu of the media entity that was selected. Upon being triggered by an intent of a listener, an agent may identify or select any action consistent with the intent of the listener, and in accordance with the set of rules.

Alternatively, where the activation of the agent is not triggered by the intent of any listener, such as where an intended action of the listener would not violate or invoke any rules, the transmission of data in accordance with the media program may continue. For example, where a listener requests to join and participate in a media program, and such joining or participation would not violate or invoke any of the rules of the set, such as where the media program is able to accommodate the listener and the creator approves, the agent may establish any number of connections that are required to permit the listener to join and participate in the media program. Where the listener requests that a media entity (e.g., a specific song, or a song by an artist or group) be played, or that a guest be invited to participate, and the playing of the media entity or the participation of the guest would not violate or invoke any of the rules of the set, the agent may identify a source of the media entity or a device of the guest, and establish any number of connections between the source of the media entity and a control system or the device of the guest. Where the listener provides a chat message or other text-based feedback, or a response to a poll, and the content of the chat message or the response would not violate or invoke any of the rules of the set, the agent may receive the message or other feedback and properly store or consider the chat message or other feedback.

At box 790, the selected action is executed by the agent, e.g., by the control system or by any associated system, such as a conference system, a mixing system or a broadcast system.

At box 795, whether the media program is complete is determined. If the media program is not complete, then the process returns to box 730, where media content (e.g., data representing advertisements, music, news, sports, weather, or other programming, or words spoken or sung by one or more participants) is transmitted by the control system to devices of listeners in accordance with the media program. If the media program is complete, however, the process ends.

As is discussed above, the systems and methods of the present disclosure may rely on agents to monitor interactions received from one or more listeners, and determine the intents of such listeners based on such interactions. Where an intent of one or more listeners complies with one or more rules of a set, a control system or another system may execute one or more actions consistent with the intents of the listeners. Where the intents of the listeners would violate one or more rules of a set, the control system may execute one or more actions that comply with the rules of the set, along with any other actions that may be deemed necessary based on the intents of the listeners.

Referring to FIGS. 8A through 8F, views of aspects of one system for monitoring live broadcasts in accordance with embodiments of the present disclosure are shown. Except where otherwise noted, reference numerals preceded by the number "8" shown in FIGS. 8A through 8F indicate components or features that are similar to components or features having reference numerals preceded by the number "6" shown in FIGS. 6A through 6D, by the number "5" shown in FIGS. 5A through 5E, by the number "3" shown in FIG. 3, by the number "2" shown in FIG. 2A or FIG. 2B or by the number "1" shown in FIGS. 1A through 1J.

Figure 8A:
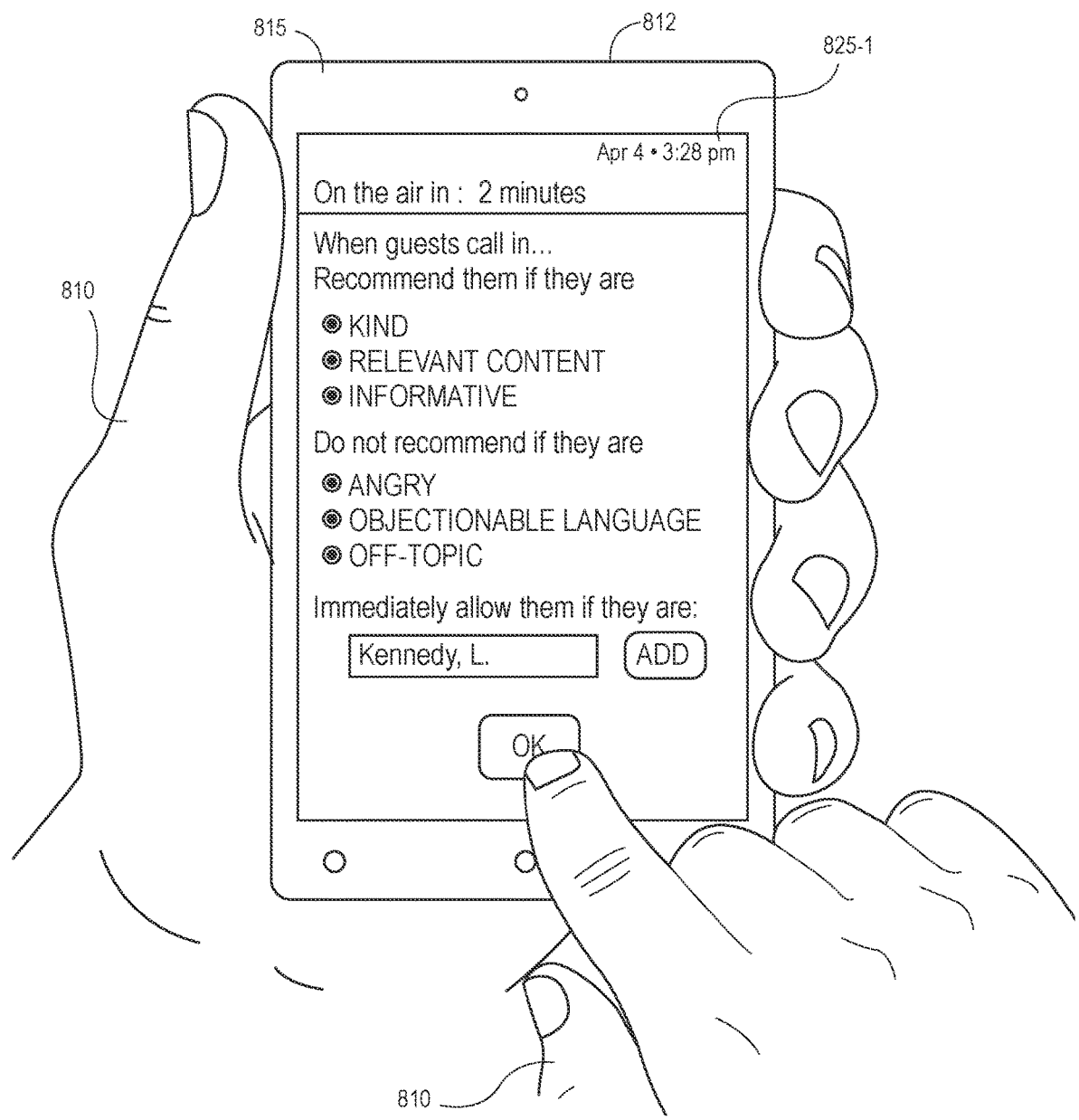
FIGS. 8A through 8F are views of aspects of one system for monitoring live broadcasts in accordance with embodiments of the present disclosure.

As is shown in FIG. 8A, a mobile device 812 of a creator 810 includes an interactive display 815 having a user interface 825-1 rendered thereon. The user interface 825-1 includes one or more interactive elements or features that the creator 810 may select or interact with, in order to establish one or more rules or define one or more parameters by which guests may join and participate in a media program of the creator 810. For example, as is shown in FIG. 8A, the user interface 825-1 enables the creator 810 to specify one or more attributes of guests, listeners or other participants that may be recommended to join and participate in a media program, or not recommended to join or participate in the media program. The user interface 825-1 also includes one or more interactive elements or features that the creator 810 may select or interact with in order to identify one or more guests, listeners or other participants that may be immediately authorized to join and participate in the media program, e.g., by names or other identifiers of such guests, listeners or other participants. Alternatively, or additionally, the user interface 825-1 may include any number of other buttons, text boxes, checkboxes, drop-down menus, list boxes, toggles, pickers, search fields, tags, sliders, icons, carousels, or any other interactive or selectable elements or features, for defining or establishing one or more rules or other parameters. In some implementations, one or more of the rules may be defined or established by a control system or any other entity. Moreover, rules that are defined or established by the creator 810 or a control system may relate to any aspect of a media program, and need not be limited to determining whether a guest, a listener or another participant should be recommended to join and participate in a media program or not, or automatically permitted to join and participate in the media program.

Figure 8B:
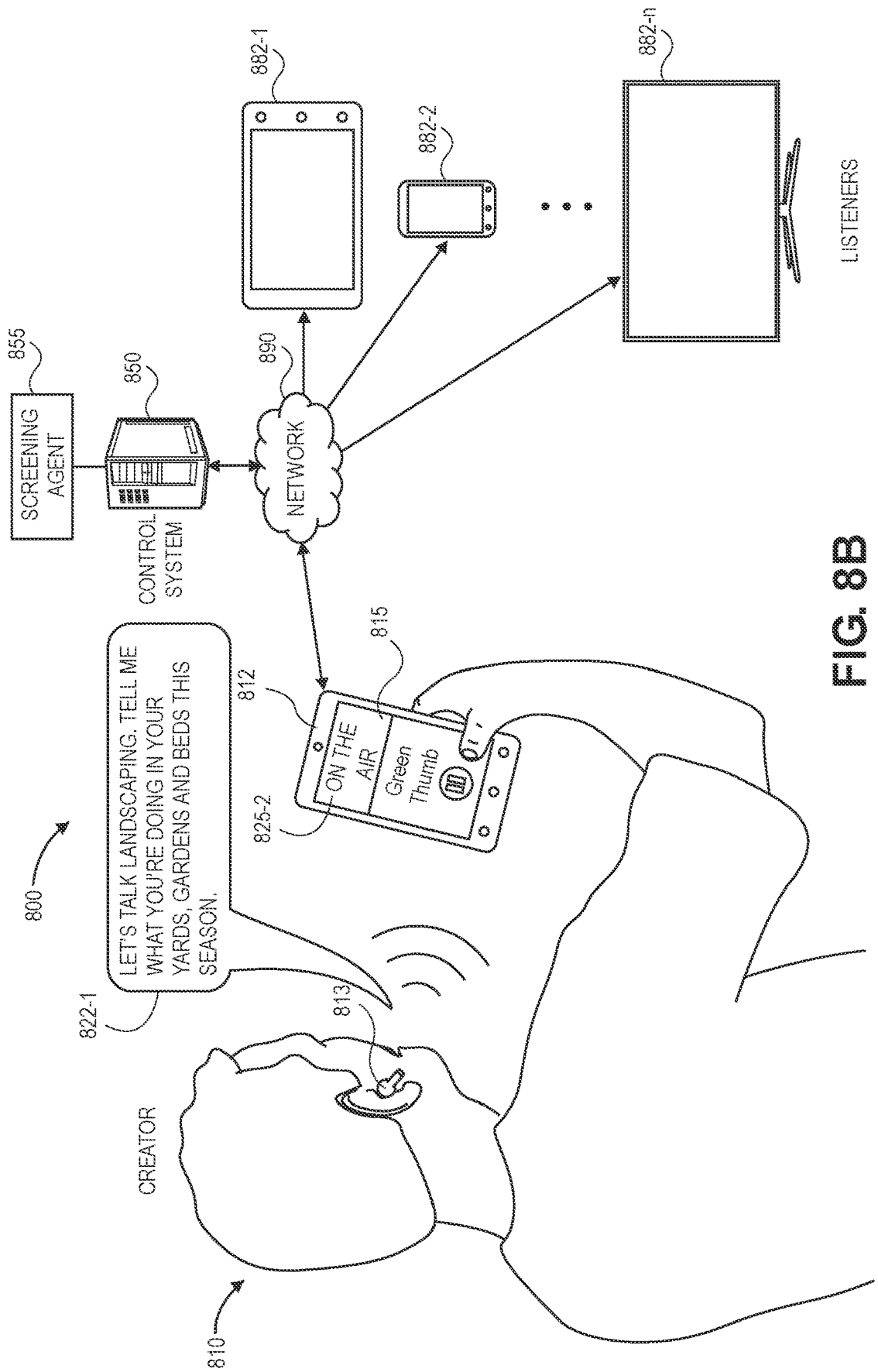

As is shown in FIG. 8B, the mobile device 812 of the creator 810 is connected to a control system 850, and a plurality of devices 882-1, 882-2 . . . 882-n of any number of listeners are connected to one or more networks 890, which may include the Internet in whole or in part. Additionally, the control system 850 is programmed to execute a screening agent 855, or one or more other agents, which may be one or more computer programs or other sets of software or hardware components that are configured to capture or interpret signals or other information or data regarding media content transmitted to the devices 882-1, 882-2 . . . 882-n of the listeners from any source, e.g., by the control system 850, or by any other systems. The screening agent 855 may be configured to operate in accordance with a set of rules (or laws, policies, regulations or other requirements), including but not limited to one or more rules defined or established by the creator 810 as shown in FIG. 8A or any other entity, and to determine whether any listeners or other individuals or entities that attempt to contact the creator 810 regarding a media program may be recommended or permitted to join and participate in the media program, or not recommended or permitted to join and participate in the media program.

The interactive display 815 of the mobile device 812 has a user interface 825-2 rendered thereon. The user interface 825-2 includes a title or other descriptor of a media program, viz., "Green Thumb." As is shown in FIG. 8B, the creator 810 provides an utterance 822-1 to the mobile device 812. Data representing the utterance 822-1 that is captured by the mobile device 812 may be transmitted to a control system 850 or to the devices 882-1, 882-2. 882-n over the one or more networks 890. As is shown in FIG. 8B, the utterance 822-1 welcomes the listeners to the media program, and describes a broadcast plan or a theme of at least a portion of the media program, viz., "Let's talk landscaping. Tell me what you're doing in your yards, gardens and beds this season." Upon receiving the data, the devices 882-1, 882-2

... 882-*n* may cause one or more words of the utterance 822-1 to be played, e.g., to listeners within a vicinity of the devices 882-1, 882-2 ... 882-*n*.

Figure 8C:
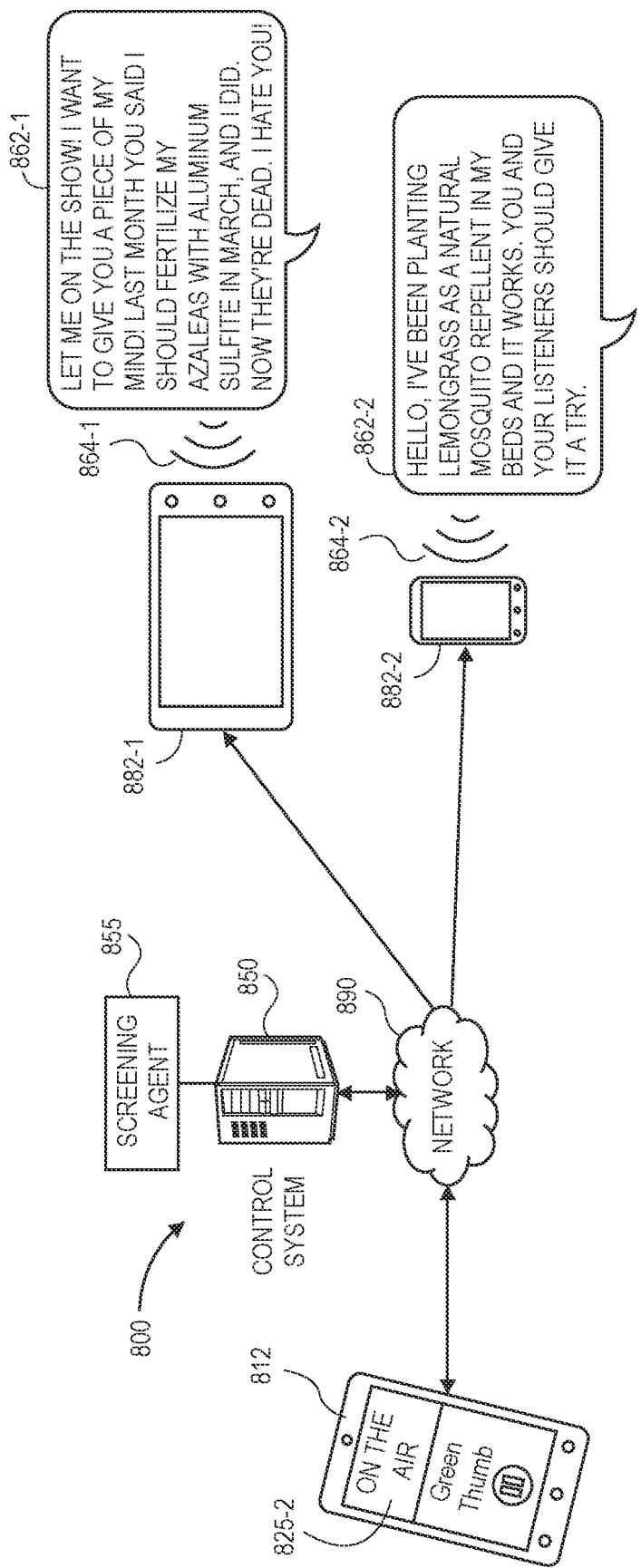

During the media program, listeners provide feedback to the creator 810 in the form of spoken words, text-based messages, or any other feedback. In particular, as is shown in FIG. 8C, one listener associated with the device 882-1 responds with an utterance (e.g., a voice sample) 862-1, "'Let me on the show! I want to give you a piece of my mind! Last month you said I should fertilize my azaleas with aluminum sulfate in March, and I did. Now they're dead. I hate you!" The device 882-1 captures data 864-1 representing the utterance 862-1, and transmits the data 864-1 and any other metadata, e.g., a date or a time at which the data 864-1 was captured, to the mobile device 812 or the control system 850 over the one or more networks 890. Likewise, another listener associated with the device 882-2 responds with an utterance 862-2, "Hello, I've been planting lemongrass as a natural mosquito repellent in my beds and it works. You and your listeners should give it a try." The device 882-2 captures data 864-2 representing the utterance 862-2, and transmits the data 864-2 and any other metadata to the mobile device 812 or the control system 850 over the one or more networks 890.

Figure 8D:
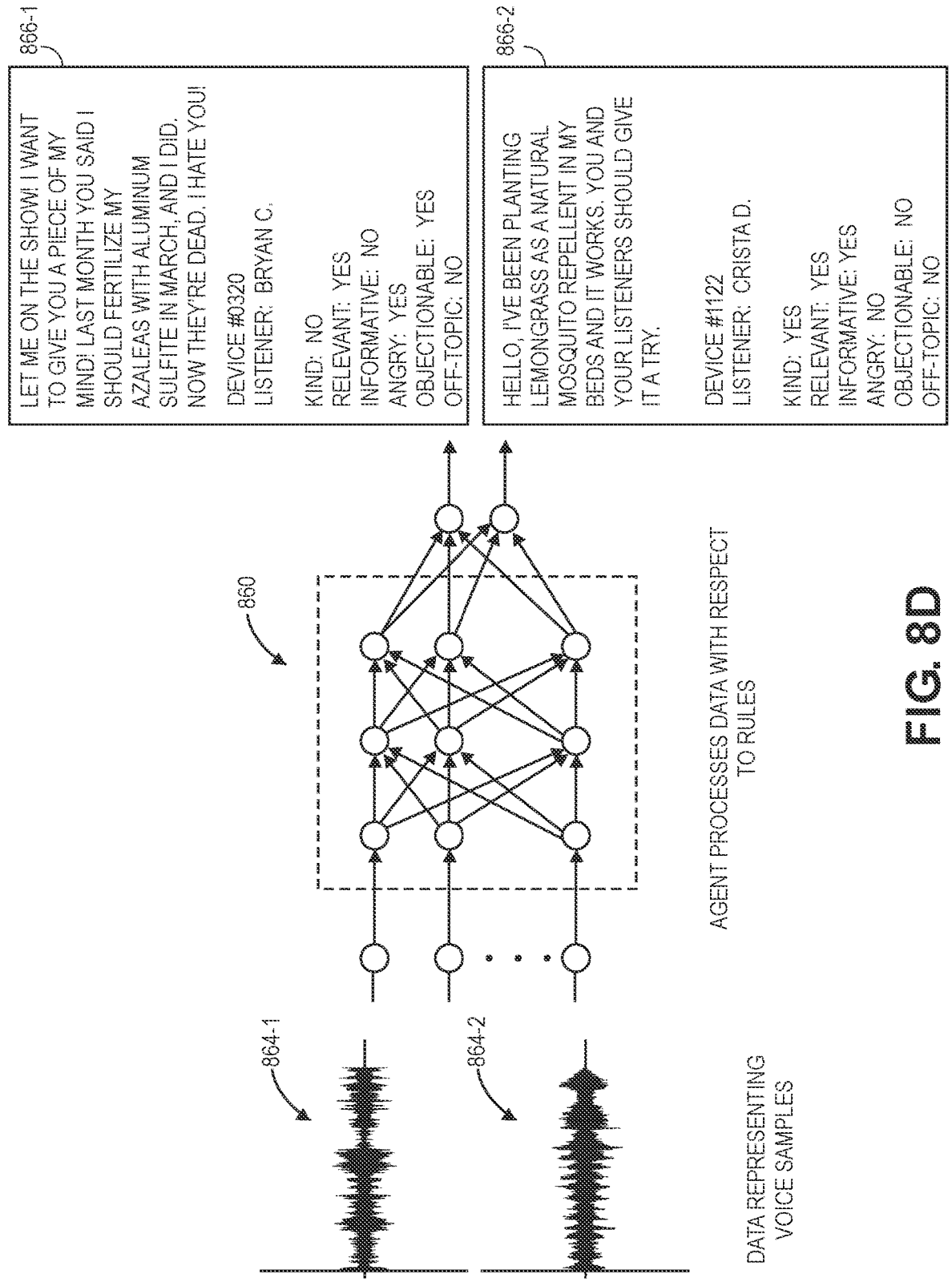

As is shown in FIG. 8D, the screening agent 855 processes the data 864-1, 864-2 representing the utterances 862-1, 862-2 ... 862-*n* shown in FIG. 8B by providing the data 864-1, 864-2 as inputs to a machine learning algorithm 860 (e.g., an artificial neural network) that is trained to identify any words represented in the data 864-1, 864-2, or to determine whether any of such words include or constitute profane or objectionable (e.g., obscene, indecent, or divisive) content. In some implementations, the screening agent 855 may process the data 864-1, 864-2 to determine any sentiments of the listeners or the utterances, or to determine any other attributes of the voice samples or utterances. Alternatively, or additionally, the screening agent 855 may operate any other types of machine learning algorithms, systems or techniques, or multiple machine learning algorithms, systems or techniques, to transcribe voice samples (or utterances), evaluate voice samples for objectionable content, or determine sentiments or any other attributes of the voice samples.

As is further shown in FIG. 8D, the screening agent 855 generates information (or data) 866-1, 866-2 including text represented in the utterances 862-1, 862-2 as well as indications as to whether any of the utterances 862-1, 862-2 invokes one or more of the rules based on outputs received from the machine learning algorithm 860. For example, as is shown in FIG. 8D, the information 866-1 indicates that the utterance 862-1 does not include language that may be characterized as kind, but is relevant to the media program, and is not informative. The information 866-1 further indicates that the utterance 862-1 includes language that may be characterized as both angry and objectionable, but is not off-topic. Likewise, the information 866-2 indicates that the utterance 862-2 includes language that may be characterized as kind, relevant and informative, but not as angry, objectionable or off-topic. As is further shown in FIG. 8D, the information 866-1, 866-2 also includes identifiers of devices from which the data 864-1, 864-2 was received, and of listeners that provided the utterances 862-1, 862-2.

The screening agent 855 may process the transcripts or any other information, data or metadata associated with the utterances 862-1, 862-2 to determine intents (e.g., intended actions) of the listeners that provided the utterances 862-1, 862-2, and recommend or not recommend that that one or both of such listeners be permitted to join or participate in the media program. For example, the screening agent 855 may determine that the listener that provided the utterance 862-1 should not be recommended to join and participate in the media program, and that the listener that provided the utterance 862-2 should be recommended to join and participate in the media program, based on the information 866-1, 866-2.

Figure 8E:
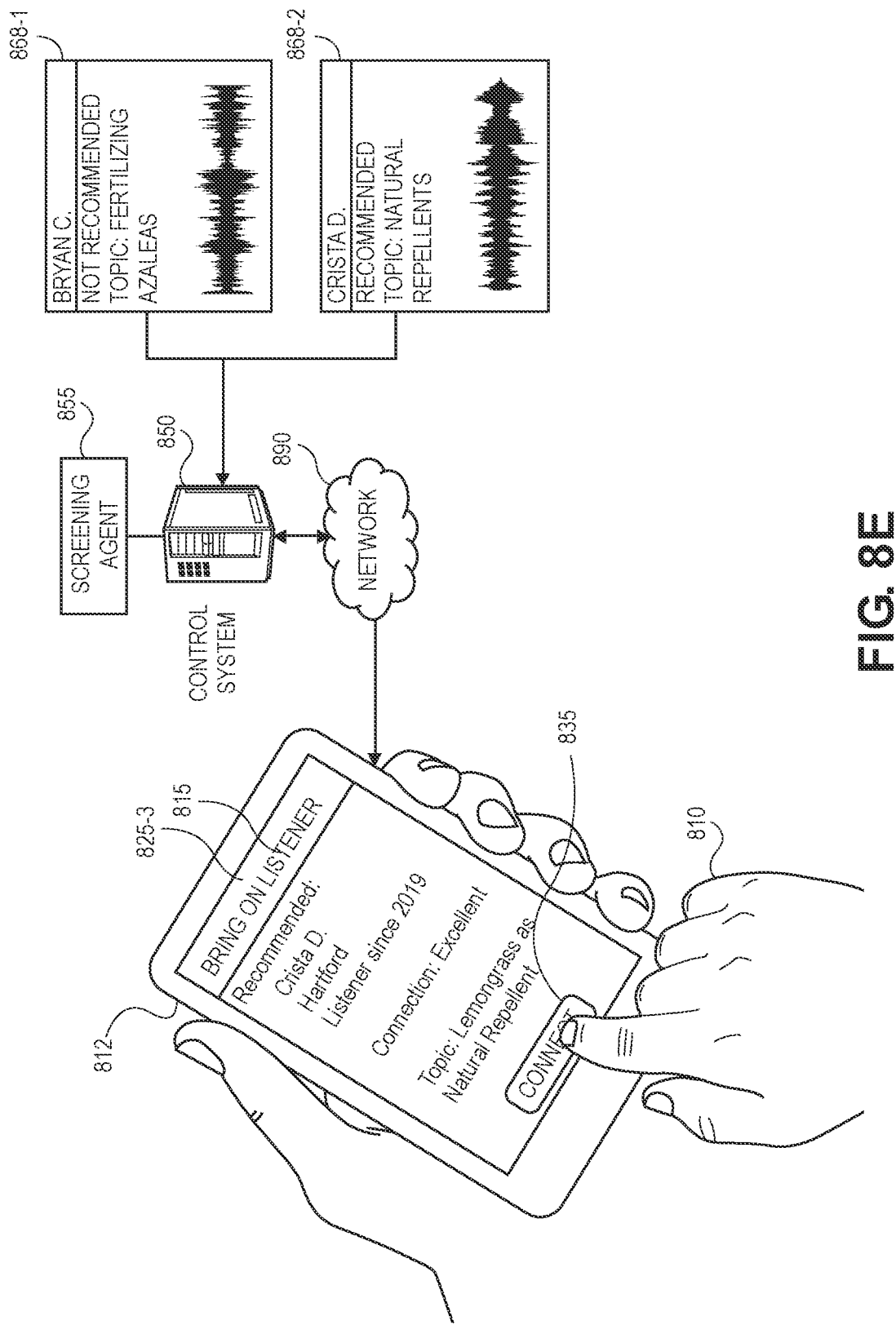

As is shown in FIG. 8E, the screening agent 855 provides information 868-1, 868-2 regarding the utterances 862-1, 862-2 to the mobile device 812 of the creator 810. The information 868-1, 868-2 may include some or all of the information 866-1, 866-2, as well as any of the data 864-1, 864-2, or any other information or data. Additionally, the screening agent 855 causes a user interface 825-3 to be rendered on the display 815. The user interface 825-3 includes information regarding the listener that provided the utterance 862-2, including a name and a location and other information regarding the listener, and an indication that the listener is recommended to join and participate in the media program, as well as a rating or description of a connection between the mobile device 882-2 of that listener and the network 890 or the control system 850, and a summary of the topic that the listener intends to discuss if he or she is invited to participate in the media program, as determined by the screening agent 855. The user interface 825-3 also includes a button 835 or another interactive feature that, when selected, enables the listener that provided the utterance 862-2 to join and participate in the media program.

Figure 8F:
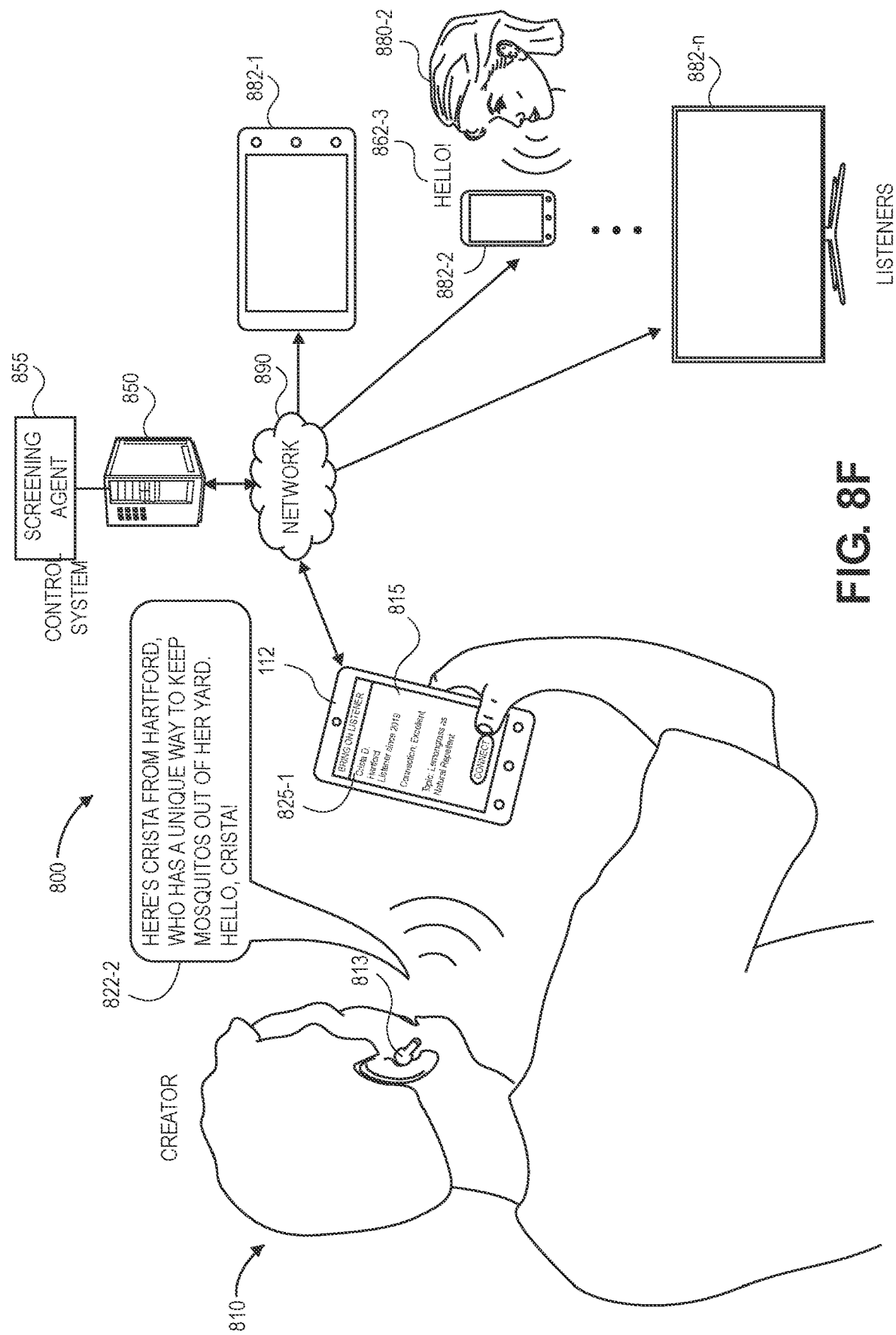

As is shown in FIG. 8F, after receiving a selection of the button 835 from the mobile device 812, the screening agent 855 establishes a two-directional channel between the control system 850 and the device 882-2. The creator 810 provides an utterance 822-2 welcoming a listener 880-2 that provided the utterance 862-2 to the media program, viz., "here's *Crista* from Hartford, who has a unique way to keep mosquitos out of her yard. Hello, *Crista*!" The listener 880-2 replies with an utterance 862-3, "Hello!" Data representing the utterances 822-2, 822-3 that is captured by the mobile device 812 and the device 882-2 may be transmitted to a control system 850 or to the devices 882-1, 882-2 ... 882-*n* over the one or more networks 890.

Alternatively, or additionally, a control system (or another system) may take any other action in response to determining an intent (or an intended action) of a listener, based on information or data received from a device of the listener. For example, the listener that provided the utterance 822-1 may be contacted outside of the context of the media program to address his or her concerns.

The systems and methods of the present disclosure may also monitor interactions received from listeners and present information regarding such interactions to the creator, e.g., in real time or near-real time, such as during the media program, or transmit data consistent with such interactions to devices of listeners. Referring to FIGS. 9A through 9G, views of aspects of one system for monitoring live broadcasts in accordance with embodiments of the present disclosure are shown. Except where otherwise noted, reference numerals preceded by the number "9" shown in FIGS. 9A through 9G indicate components or features that are similar to components or features having reference numerals preceded by the number "8" shown in FIGS. 8A through 8F, by the number "6" shown in FIGS. 6A through 6D, by the number "5" shown in FIGS. 5A through 5E, by the number "3" shown in FIG. 3, by the number "2" shown in FIG. 2A or FIG. 2B or by the number "1" shown in FIGS. 1A through 1J.

Figure 9A:
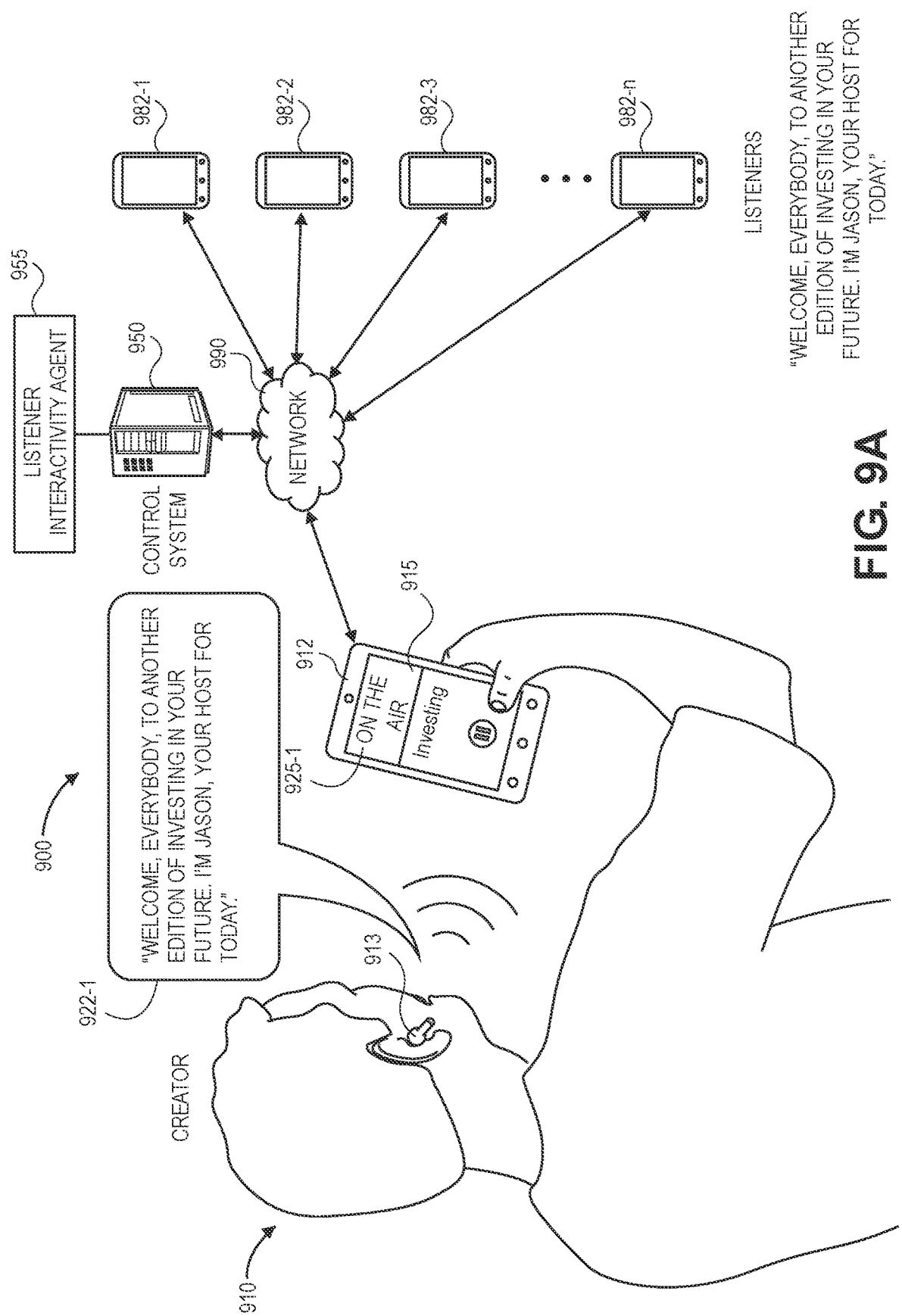
FIGS. 9A through 9G are views of aspects of one system for monitoring live broadcasts in accordance with embodiments of the present disclosure.

As is shown in FIG. 9A, a mobile device 912 of a creator 910, a control system 950, and a plurality of devices 982-1, 982-2, 982-3 . . . 982-*n* of any number of listeners are connected to one or more networks 990, which may include the Internet in whole or in part. Additionally, the control system 950 is programmed to execute a listener interactivity agent 955, or one or more other agents, which may be one or more computer programs or other sets of software or hardware components that are configured to capture or interpret signals or other information or data received from the devices 982-1, 982-2, 982-3 . . . 982-*n* of the listeners. The listener interactivity agent 955 may be configured to operate in accordance with a set of rules (or laws, policies, regulations or other requirements), and to determine whether any interactions received from one or more listeners violate or invoke any of a set of rules.

The mobile device 912 includes an interactive display 915 having a user interface 925-1 rendered thereon. The user interface 925-1 includes a portion of a title or other descriptor of a media program, viz., "Investing." As is shown in FIG. 9A, the creator 910 provides an utterance 922-1 to the mobile device 912. Data representing the utterance 922-1 that is captured by the mobile device 912 may be transmitted to a control system 950 or to the devices 982-1, 982-2, 982-3 . . . 982-*n* over the one or more networks 990. As is shown in FIG. 9A, the utterance 922-1 welcomes the listeners to the media program, and describes a broadcast plan or a theme of at least a portion of the media program, viz., "Welcome, everybody, to another edition of Investing in Your Future. I'm Jason, your host for today." Upon receiving the data, the devices 982-1, 982-2, 982-3 . . . 982-*n* may cause one or more words of the utterance 922-1 to be played, e.g., to listeners within a vicinity of the devices 982-1, 982-2, 982-3 . . . 982-*n*.

Figure 9B:
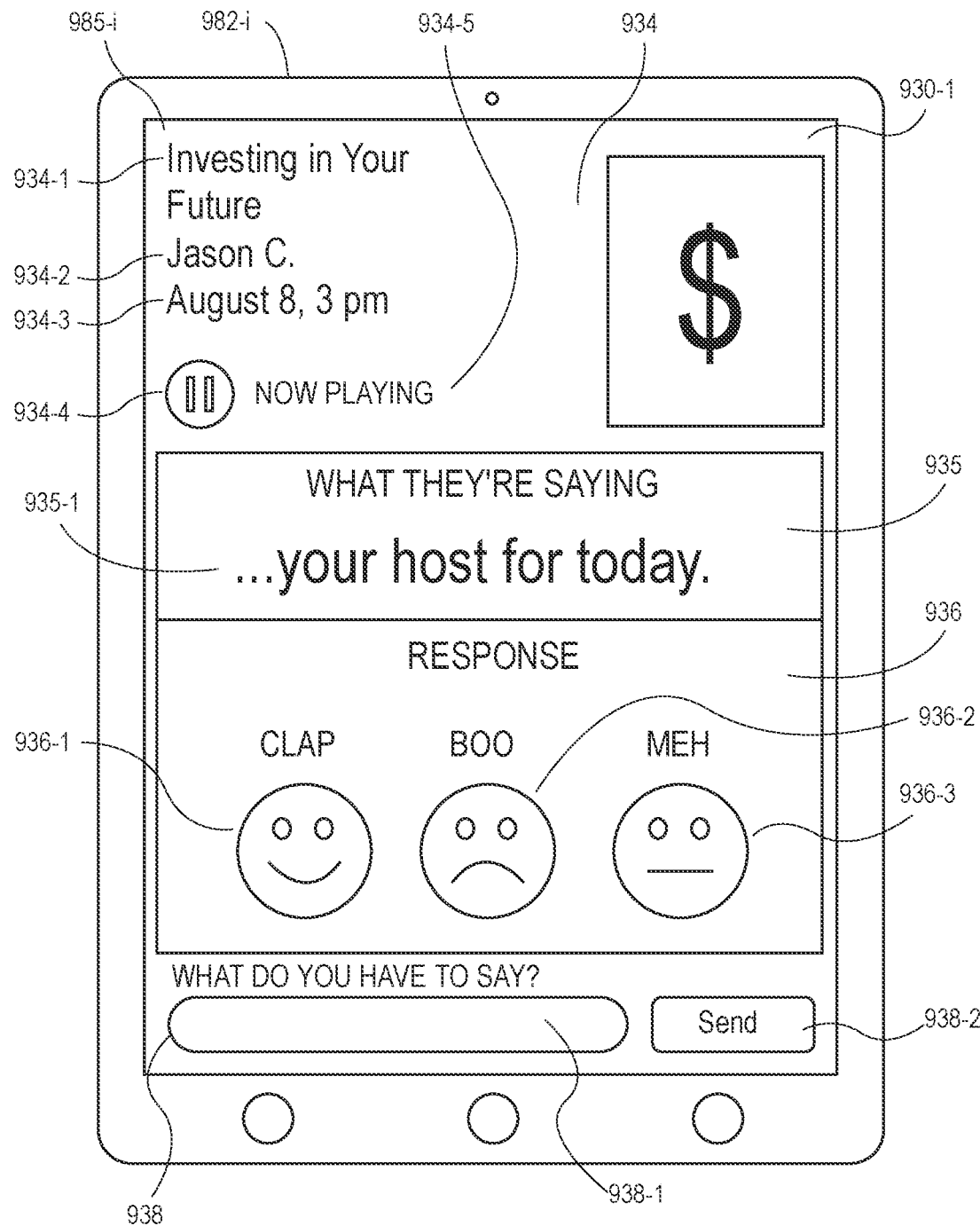

During the media program, one or more listeners may provide feedback via the devices 982-1, 982-2, 982-3 . . . 982-*n*, such as via one or more user interfaces rendered by such devices 982-1, 982-2, 982-3 . . . 982-*n*. As is shown in FIG. 9B, a user interface 930-1 that may be displayed on a display 985-*i* representative device 982-*i* of the devices 982-1, 982-2, 982-3 . . . 982-*n* is shown.

The user interface 930-1 includes a plurality of sections 934, 935, 936, 938. For example, the section 934 of the user interface 930-1 is provided at an upper edge or area of the display 985-*i*, and includes one or more identifiers or information regarding the media program, including but not limited to a title 934-1 of the media program, and a name 934-2 of the creator 910 of the media program. The section 934 further includes a date and time 934-3 of the media program, along with an indicator that the media program is being aired live, as well as one or more elements (or features) 934-4 for playing, pausing, stopping, rewinding or fast-forwarding media content.

The section 935 is provided in a substantially central area of the display 985-*i* below the section 934, and includes a transcript 935-1 of a portion of the media program, e.g., a most recently aired portion of the media program.

The section 936 is provided between the section 935 and the section 938, and includes a plurality of interactive features 936-1, 936-2, 936-3 for expressing an emotion or an opinion regarding the media program in general, or a portion of the media program in particular, by one or more interactions with the user interface 930-1. For example, as is shown in FIG. 9B, each of the interactive features 936-1, 936-2, 936-3 includes a set of text and an "emoji" or a digital icon, image or symbol representative of an emotion or an opinion, and may be selected in association with the media program or any portion of the media program in order to associate the representative emotion or opinion with the media program or portion thereof.

The interactive feature 936-1 is a smiling face, and includes the label "Clap." The interactive feature 936-1 may be selected to express a generally pleasant, cheery or humorous emotion or opinion with the media program or a portion thereof, or to indicate that a listener believes that the media program or the portion thereof is worthy of applause. The interactive feature 936-2 is a frowning face, and includes the label "Boo." The interactive feature 936-2 may be selected to express a generally concerned, disappointed or sad emotion or opinion with the media program or a portion thereof, or to indicate that a listener believes that the media program or the portion thereof is deserving of boos, hisses or jeers. The interactive feature 936-3 is a face with a closed and substantially horizontally aligned mouth, and includes the label "Meh." The interactive feature 936-3 may be selected to express a mildly concerned, disappointed or sad emotion or opinion, or an emotion or opinion that is neutral (e.g., neither positive nor negative), regarding the media program or a portion thereof, or to indicate that a listener believes that the media program or the portion thereof is boring, disinteresting, or lacking in energy.

The section 938 is provided at a lower edge or area of the display 985-*i*, and includes a text box 938-1 or a like feature that enables a listener or any other user of the device 982-*i* to provide a chat message to the creator 910 or other listeners, e.g., by executing one or more gestures or other interactions with a virtual keyboard rendered on the display 985-*i*, and a button 938-2 or another selectable feature for transmitting the chat message provided within the text box 938-1 to the control system 950 or the creator 910. Alternatively, a listener may provide a chat message or other information to the device 982-*i* for transmission to the creator 910 or the control system 950 in any other manner, e.g., by one or more voice commands or utterances, or by gestures or interactions with a drop-down menu.

The user interface 930-1 may be rendered in any manner. For example, code for rendering the user interface 930-1 may be transmitted to the device 982-*i* by the control system 950 or from any other source, and the device 982-*i* may render the user interface 930-1 and any of the sections 934, 935, 936, 938 within the user interface 930-1 or on the display 985-*i* accordingly. The code may be programmed in HTML or any other language, e.g., Java or JavaScript, and may be executed by a widget, an application programming interface (or "API"), or any other application or feature of the device 982-*i*. Moreover, the user interface 930 may include the features of the sections 934, 935, 936, 938 in any locations on the user interface 930, and may be aligned in any orientation (e.g., portrait or landscape) with respect to the display 985-*i*.

Figure 9C:
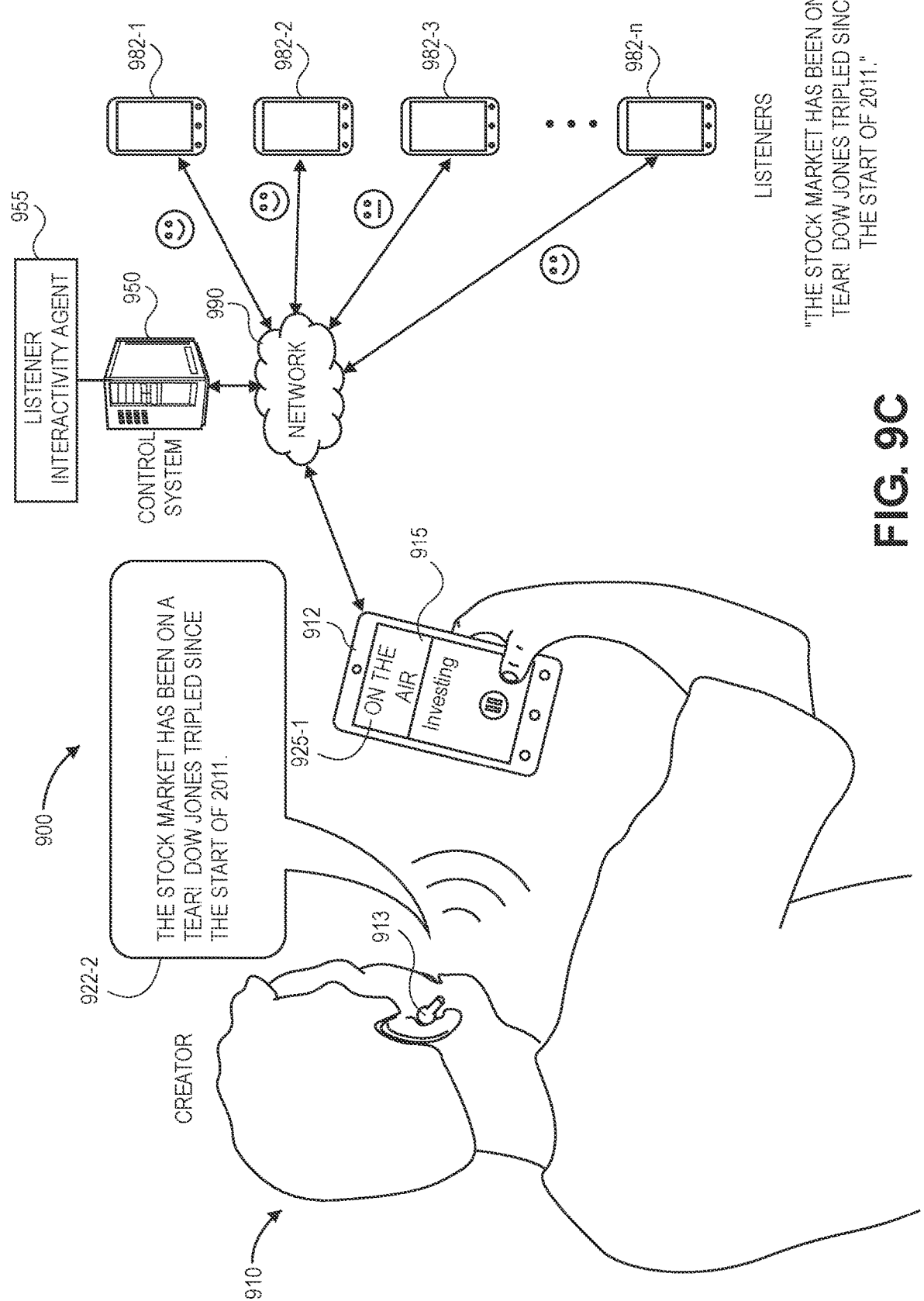

The listeners may provide feedback during the media program by gestures or other interactions with the user interface 930-1, or any other user interfaces. As is shown in FIG. 9C, the creator 910 provides another utterance 922-2 to the mobile device 912. Data representing the utterance 922-2 that is captured by the mobile device 912 may be transmitted to a control system 950 or to the devices 982-1, 982-2, 982-3 . . . 982-*n* over the one or more networks 990. As is shown in FIG. 9C, the utterance 922-2 is consistent with the broadcast plan or the theme of the media program, viz., "The stock market has been on a tear! Dow Jones tripled since the start of 2011." Upon receiving the data, the devices 982-1, 982-2, 982-3 . . . 982-*n* may cause one or more words of the utterance 922-2 to be played, e.g., to listeners within a vicinity of the devices 982-1, 982-2, 982-3 . . . 982-*n*. As is also shown in FIG. 9C, in response to the playing of the utterance 922-2, the listeners may provide feedback, such as by interactions with one or more of the interactive features 936-1, 936-2, 936-3.

Figure 9D:
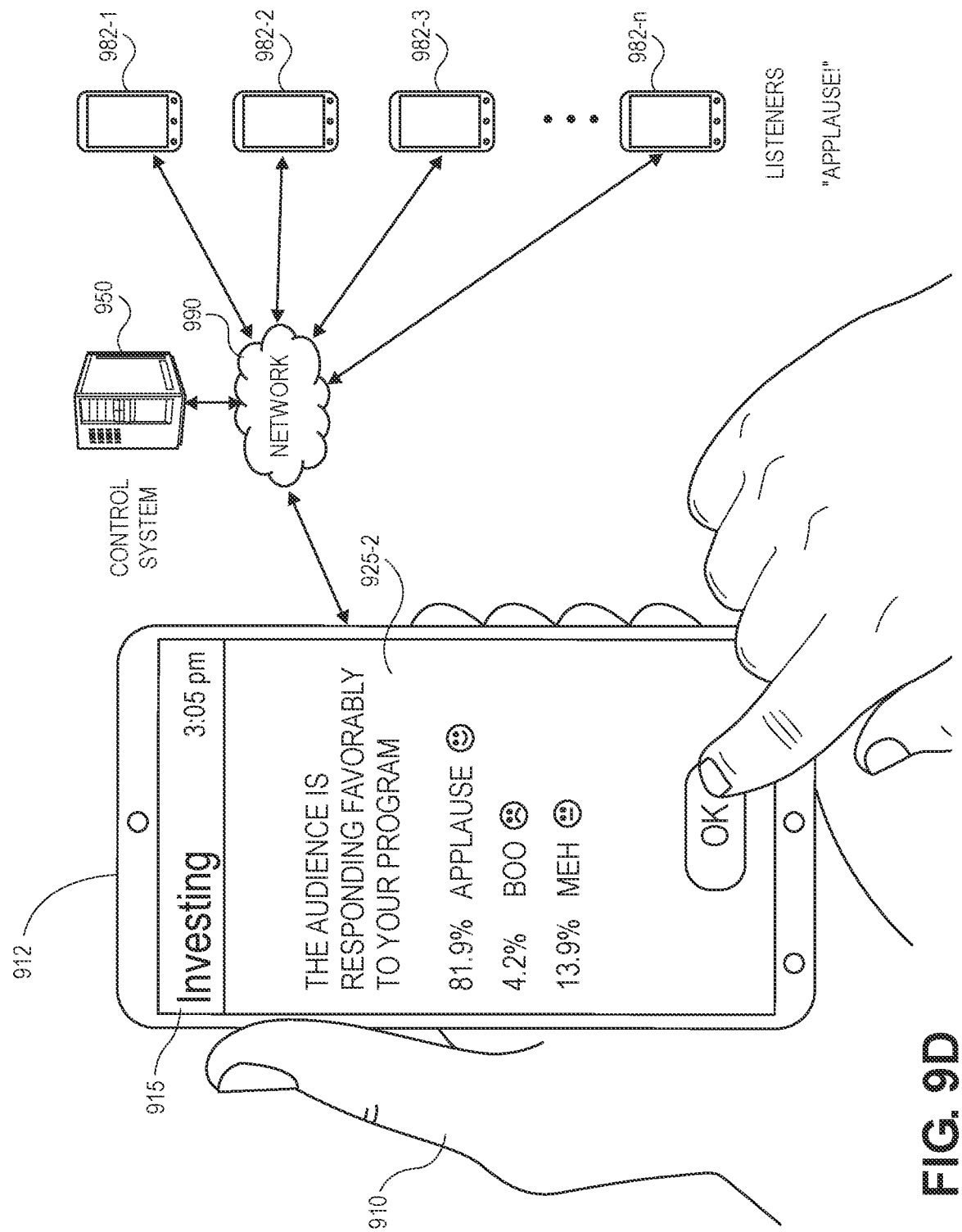

The listener interactivity agent 955 may process feedback received from listeners during a media program and provide the feedback to a creator of the media program or interpret the feedback to enhance the media program, such as by transmitting additional data to devices of the listeners. As is shown in FIG. 9D, the listener interactivity agent 955 causes a user interface 925-2 to be rendered on the display 915 of the device 912. The user interface 925-2 includes information regarding the feedback received from the listeners in response to the utterance 922-2, including a text-based summary of the feedback, viz., "the audience is responding favorably to your program," and statistics representing the feedback, such as numbers (or percents) of interactions with each of the interactive features 936-1, 936-2, 936-3 received from devices of the listeners. Additionally, the listener interactivity agent 955 may further cause data representing audible signals or sound effects (e.g., sounds of applause) to be transmitted to the devices 982-1, 982-2, 982-3 . . . 982-*n*, along with data representing the utterance 922-2 or other utterances, and such audible signals or sound effects may be played by the devices 982-1, 982-2, 982-3 . . . 982-*n* along with the utterance 922-2 or separately.

Figure 9E:
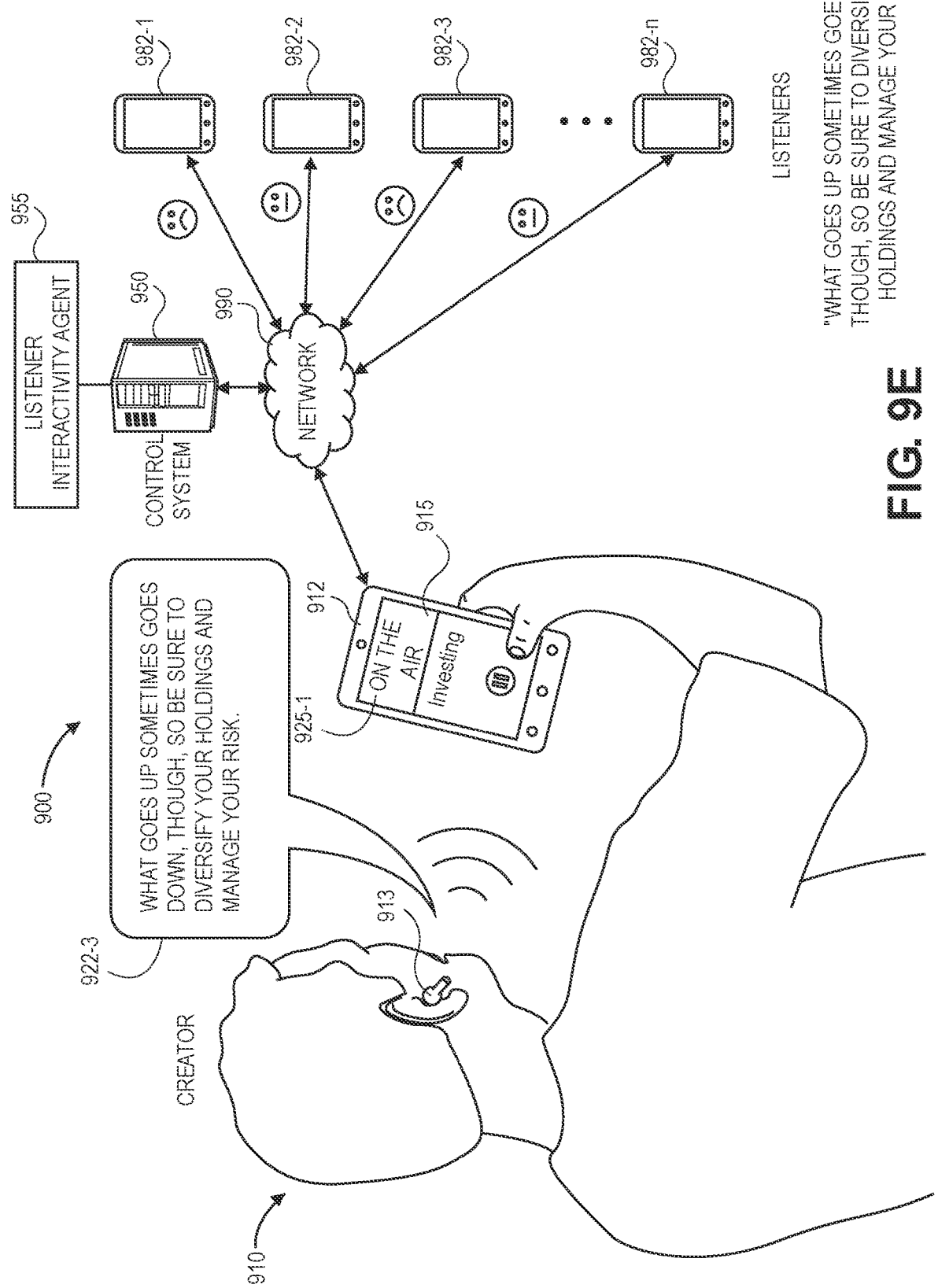

Similarly, as is shown in FIG. 9E, the creator 910 provides another utterance 922-3 to the mobile device 912. Data representing the utterance 922-3 that is captured by the mobile device 912 may be transmitted to a control system 950 or to the devices 982-1, 982-2, 982-3 . . . 982-*n* over the one or more networks 990. As is shown in FIG. 9E, the utterance 922-3 is consistent with the broadcast plan or the theme of the media program, viz., "What goes up sometimes goes down, though, so be sure to diversify your holdings and manage your risk." Upon receiving the data, the devices 982-1, 982-2, 982-3 . . . 982-*n* may cause one or more words of the utterance 922-3 to be played, e.g., to listeners within a vicinity of the devices 982-1, 982-2, 982-3 . . . 982-*n*. As is also shown in FIG. 9E, in response to the playing of the utterance 922-3, the listeners may provide feedback, such as by interactions with one or more of the interactive features 936-1, 936-2, 936-3.

Figure 9F:
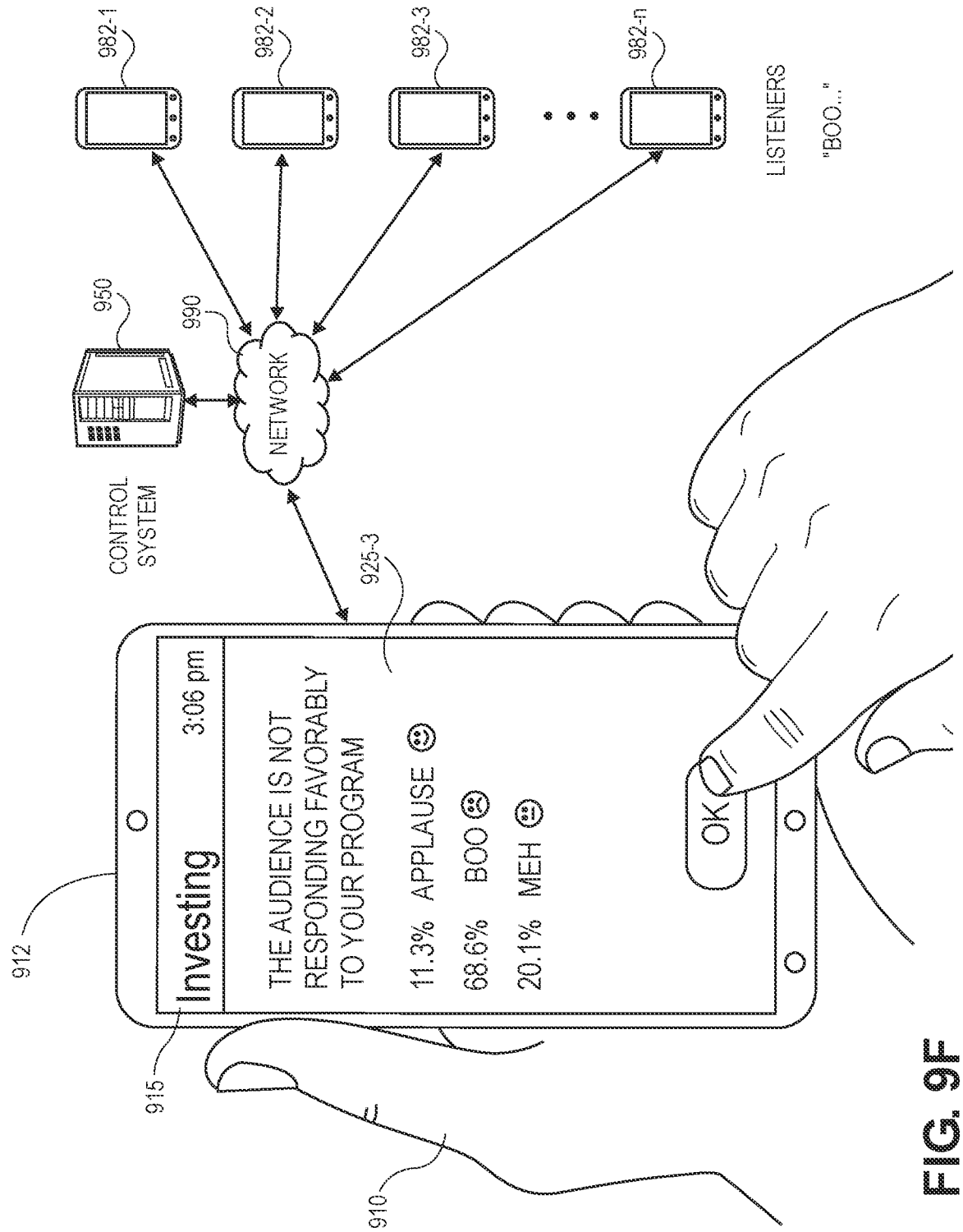

As is shown in FIG. 9F, the listener interactivity agent 955 causes a user interface 925-3 to be rendered on the display 915 of the device 912. The user interface 925-3 includes information regarding the feedback received from the listeners in response to the utterance 922-3, including a text-based summary of the feedback, viz., "the audience is not responding favorably to your program," and statistics representing the feedback, such as numbers (or percents) of interactions with each of the interactive features 936-1, 936-2, 936-3 received from devices of the listeners. Additionally, the listener interactivity agent 955 may cause data representing audible signals or sound effects (e.g., sounds of boos) to be transmitted to the devices 982-1, 982-2, 982-3 . . . 982-*n*, along with data representing the utterance 922-3 or other utterances, and such audible signals or sound effects may be played by the devices 982-1, 982-2, 982-3 . . . 982-*n* along with the utterance 922-3 or separately.

Figure 9G:
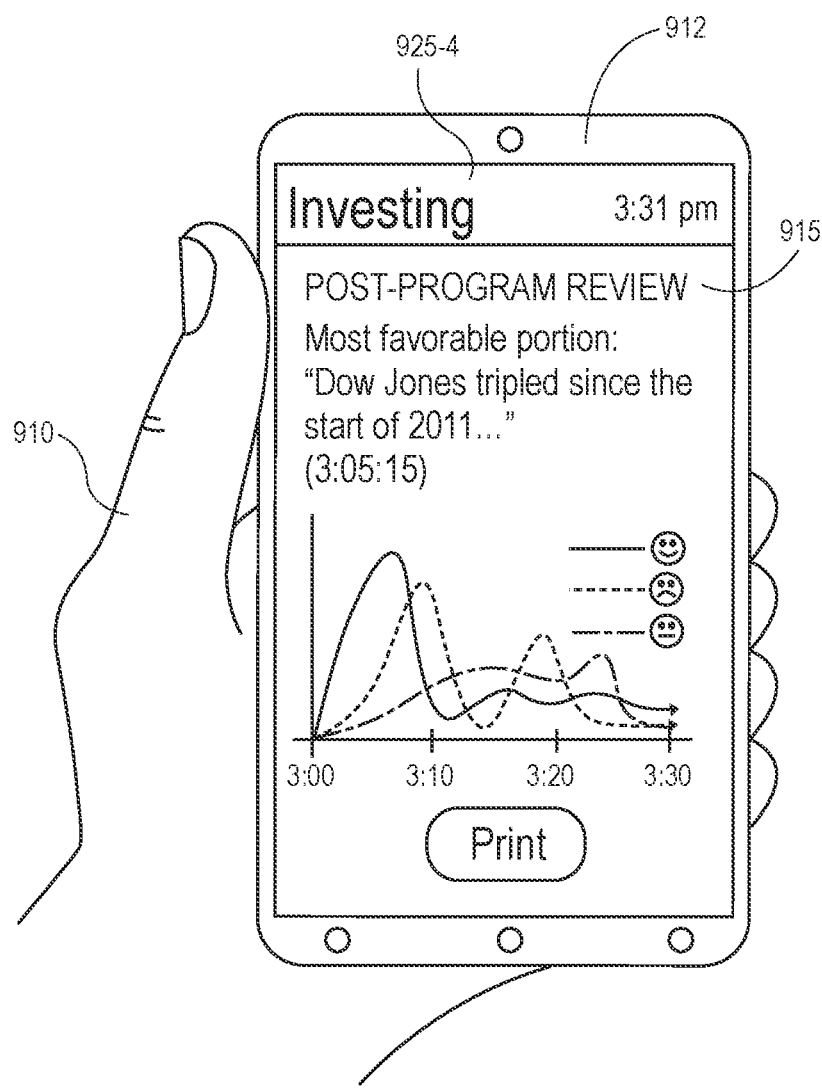

As is shown in FIG. 9G, the listener interactivity agent 955 causes a user interface 925-4 to be rendered on the display 915 of the device 912. The user interface 925-4 includes a summary of the feedback received from listeners during the media program, prepared by the listener interactivity agent 955, including an identifier of a portion of the media program that was most favorably received by the listeners, as well as a time associated with the portion, and types of feedback received at specific times during the media program. The user interface 925-4 also includes a button or another interactive feature that, when selected, enables the creator to print the summary of the media program prepared by the listener interactivity agent 955, or any other information or data.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 7, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
    wherein the first computer system is connected to one or more networks,
    wherein the at least one data store has one or more sets of instructions stored thereon that, when executed by the at least one computer processor, cause the first computer system to perform a method comprising:
        causing a two-directional communication channel to be established between the first computer system and a second computer system associated with a creator of a media program;
        causing one-directional communication channels to be established between the first computer system and each of a plurality of computer systems associated with listeners to the media program;
        programming at least a first agent with a set of rules associated with at least the media program;
        receiving at least a first signal from the second computer system at a first time by way of the two-directional communication channel, wherein the first signal comprises an instruction by the creator to cause audio data representing a first media entity of a first type to be transmitted by the first computer system to at least the plurality of computer systems by way of the one-directional communication channels during the media program;
        determining, by the first agent, that the first computer system caused audio data representing at least one of the first media entity or a second media entity of the first type to be transmitted to at least the plurality of computer systems by way of the one-directional communication channels at a second time during the media program, wherein the second time preceded the first time;
        determining, by the first agent based at least in part on the first signal, that the creator has committed at least a first violation of at least a first rule of the set of rules, wherein the first rule is one of:
            a requirement to play one or more media entities of a second type at the second time;
            a restriction on playing a common media entity on multiple occasions within a period of time, wherein the period of time includes the second time; or
            a restriction on playing multiple media entities of a common type within the period of time; and
        in response to determining that the creator has committed at least the first violation,
            selecting, by the first agent, a first remedial action based at least in part on at least one of the first signal, the first media entity or the first rule, wherein the first remedial action comprises:
                identifying a third media entity, wherein the third media entity is not the first media entity and wherein the third media entity is not of the first type; and
                causing audio data representing the third media entity to be transmitted by the first computer system to the plurality of computer systems by way of the one-directional communication channels; and
            executing at least the first remedial action.

2. The first computer system of claim 1, wherein the first remedial action further comprises causing, by the first agent, a display of a warning message on a display of the second computer system, and
    wherein the method further comprises:
        receiving, by the first agent, at least a second signal from the second computer system at a third time, wherein the second signal comprises an instruction by the creator to cause audio data representing the first media entity to be transmitted by the first computer system to at least the plurality of computer systems by way of the one-directional communication channels during the media program;

determining, by the first agent based at least in part on the second signal, that the creator has committed at least a second violation of at least the first rule; and in response to determining that the creator has committed at least the second violation, executing at least a second remedial action, wherein the second remedial action comprises:

terminating, by the first agent, the media program.

3. The first computer system of claim 1, wherein the first type comprises a song, and wherein the second type comprises an advertisement.

4. The first computer system of claim 1, wherein the common type comprises media entities on a common album, on a common playlist or by a common artist.

5. A method comprising:

establishing, by at least a first computer system, a first communication channel with a second computer system associated with a creator of a media program;

establishing, by at least the first computer system, a second communication channel with at least a third computer system associated with a first listener to the media program;

causing, by at least the first computer system, first media content associated with the media program to be transmitted to at least the third computer system at a first time, wherein the first media content comprises a first media entity of a first type;

programming, by the first computer system, a first agent executed by at least the first computer system with a set of rules associated with at least one of the first computer system, the creator or the media program;

determining, by the first agent based at least in part on the first media content, that at least a first rule of the set of rules is invoked based at least in part on the first media entity or a set of words expressed in the first media content, wherein the first rule comprises one of:

a requirement to play one or more media entities of a predetermined type within a predetermined period of time;

a restriction on playing a common media entity on two or more occasions within a predetermined period of time; or a restriction on playing two or more media entities of a common type within a predetermined period of time; and in response to determining that at least the first rule is invoked, selecting, by the first agent, a first action based at least in part on the first media content or the first rule; and executing, by at least the first computer system, the first action.

6. The method of claim 5, further comprising:

determining, by the first agent, an intended action of one of the creator or the first listener based at least in part on the at first set of words, and wherein determining that at least the first rule is invoked comprises:

determining, by the first agent, that the intended action of the one of the creator or the first listener would violate at least the first rule.

7. The method of claim 5, further comprising:

receiving, by the first computer system, data from the second computer system; and generating, by the first computer system, at least one of the first rule or a second rule of the set of rules based at least in part on the data.

8. The method of claim 7, wherein the data comprises a first request to cause the first computer system to transmit the first media content to at least the third computer system, wherein the data is received from the second computer system at a second time, and wherein each of the first time and the second time are within the predetermined period of time.

9. The method of claim 5, wherein selecting the first action comprises:

determining, by the first agent, at least one attribute of the first media entity; and identifying, by the first agent, a second media entity based at least in part on the at least one attribute of the first media entity, and wherein executing the first action comprises:

causing, by at least the first computer system, at least the second media entity to be played by at least the third computer system.

10. The method of claim 5, wherein the predetermined type is an advertisement, and wherein determining that at least the first rule is invoked comprises:

determining, by at least the first agent, that the at least one advertisement was not played by the third computer system within the predetermined period of time, and wherein the second action comprises causing, by the first computer system, second media content to be played by at least the third computer system during the predetermined period of time, and wherein the second media content comprises at least one advertisement.

11. The method of claim 5, wherein selecting the first action comprises:

identifying, by the first agent, second media content associated with the first media program, and wherein executing the first action comprises:

causing, by the first computer system, the second media content to be played by at least the third computer system at a second time, wherein the second time follows the predetermined period of time.

12. The method of claim 5, wherein the first action comprises causing, by the first agent, a display of at least one user interface by the at least one of the second computer system or the third computer system, and wherein the at least one user interface comprises information regarding at least the first rule.

13. The method of claim 12, further comprising:

receiving, by the first computer system, data from the at least one of the second computer system or the third computer system, wherein the data is received by the first computer system at a second time, and wherein the second time follows the first time;

determining, by at least the first agent based at least in part on the data, that at least one of the first rule or a second rule of the set of rules is invoked; and in response to determining that the at least one of the first rule or the second rule is invoked, terminating, by at least the first agent, the media program.

14. The method of claim 5, wherein the first media content comprises at least one of:
- an advertisement;
- a news program;
- a sports program; or
- a weather report.

15. The method of claim 5, wherein the first communication channel is a two-directional communication channel between a conference computer system and the second computer system,
- wherein the conference computer system is connected to the first computer system,
- wherein the second communication channel is a one-directional communication channel between a broadcast computer system and the third computer system, and
- wherein the broadcast computer system is connected to the first computer system.

16. The method of claim 5, wherein the predetermined type is an advertisement.

17. The method of claim 5, wherein the common type comprises media entities on a common album, on a common playlist or by a common artist.

18. A method comprising:
- programming, by a first computer system, a first agent to monitor data received by the first computer system for compliance with each of a set of rules associated with one of a media program or the first computer system;
- receiving, by the first computer system, a first set of data captured by a second computer system associated with a creator of the media program, wherein the first set of data comprises audio data, wherein the first computer system is in communication with the second computer system and a plurality of computer systems, and wherein each of the plurality of computer systems is associated with a listener to the media program;
- determining, by the first agent, a first set of words expressed in the audio data;
- processing, by the first agent, the first set of data to identify a first action intended by the creator based at least in part on the first set of words expressed in the audio data;
- determining, by the first agent, that the first action would violate at least a first rule of the set of rules, wherein the first rule comprises:
  - a requirement to play media content of a first type at a first time; or
  - a restriction on playing media content of a second type at the first time; and
- in response to determining that the first action would violate at least the first rule,
  - selecting, by the first agent, a second action, wherein the second action would comply with each of the set of rules;
  - causing, by the first agent, the first computer system to execute the second action; and
  - transmitting, by the first computer system, data consistent with at least the second action to at least one of the second computer system or the plurality of computer systems.

19. The method of claim 18, wherein the first action intended by the creator comprises:
- causing a playing of first media content by the plurality of computer systems at the first time, wherein the first media content is not of the first type or wherein the first media content is of the second type, and
- wherein the second action comprises:
- causing a playing of second media content by the plurality of computer systems at the first time, wherein the second media content is of the first type or wherein the second media content is not of the second type.

20. The method of claim 18,
wherein the first type comprises an advertisement and the second type comprises a song.

\* \* \* \* \*